US00RE50825E

(19) United States
(12) Reissued Patent
Abels et al.

(10) Patent Number: US RE50,825 E
(45) Date of Reissued Patent: Mar. 17, 2026

(54) CONCEALED SPRINKLER

(71) Applicant: Tyco Fire Products LP, Lansdale, PA (US)

(72) Inventors: Bernhard Abels, Warwick, RI (US); Manuel R. Silva, Jr., Cranston, RI (US); Marcelo J. Chavez, Providence, RI (US)

(73) Assignee: Tyco Fire Products LP, Cranston, RI (US)

(21) Appl. No.: 17/903,662

(22) Filed: Sep. 6, 2022

Related U.S. Patent Documents

Reissue of:
(64) Patent No.: 9,931,528
Issued: Apr. 3, 2018
Appl. No.: 14/922,961
Filed: Oct. 26, 2015

U.S. Applications:
(63) Continuation of application No. 16/791,463, filed on Feb. 14, 2020, now Pat. No. Re. 49,231, which is an
(Continued)

(51) Int. Cl.
*A62C 37/00* (2006.01)
*A62C 31/02* (2006.01)
(Continued)

(52) U.S. Cl.
CPC ..... *A62C 35/68* (2013.01); *A62C 31/02* (2013.01); *A62C 37/11* (2013.01); *A62C 37/12* (2013.01); *B05B 1/02* (2013.01); *B05B 12/08* (2013.01)

(58) Field of Classification Search
CPC ..... A62C 35/68; A62C 31/02; A62C 37/11; A62C 37/12; B05B 1/02; B05B 12/08
(Continued)

(56) References Cited

U.S. PATENT DOCUMENTS 2,591,872 A 4/1952 Rider
3,195,647 A * 7/1965 Campbell ..... A62C 37/09 137/72
(Continued)

FOREIGN PATENT DOCUMENTS

CN 2766895 3/2006
CN 2770708 4/2006
(Continued)

OTHER PUBLICATIONS

International Search Report and Written Opinion for PCT/US07/085820 [mail date Sep. 15, 2008] (17 pages).
(Continued)

*Primary Examiner* — William V Gilbert
(74) *Attorney, Agent, or Firm* — Foley & Lardner LLP

(57) ABSTRACT

A concealed sprinkler including a body having a proximal portion and a distal portion. The distal portion includes an annular wall defining a chamber and an opening in communication with the chamber. A deflector assembly is disposed within the chamber. A trigger assembly having a lever assembly engaged with an inner surface of the annular wall supports the deflector assembly in the first position, the trigger assembly including and a thermally rated plate assembly having a lip portion to substantially circumscribe and substantially cover opening and chamber.

14 Claims, 38 Drawing Sheets

Related U.S. Application Data application for the reissue of Pat. No. 9,931,528, which is a continuation of application No. 14/087,712, filed on Nov. 22, 2013, now Pat. No. 9,974,989, which is a continuation of application No. 12/515,113, filed as application No. PCT/US2007/085820 on Nov. 28, 2007, now Pat. No. 8,646,539.

(60) Provisional application No. 60/861,239, filed on Nov. 28, 2006.

(51) Int. Cl.

| | |
|---|---|
| ***A62C 35/68*** | (2006.01) |
| ***A62C 37/11*** | (2006.01) |
| ***A62C 37/12*** | (2006.01) |
| ***B05B 1/02*** | (2006.01) |
| ***B05B 12/08*** | (2006.01) |

(58) Field of Classification Search
USPC ..... 169/37
See application file for complete search history.

(56) References Cited

U.S. PATENT DOCUMENTS

| | | | | |
|---|---|---|---|---|
| 3,714,989 | A | 2/1973 | Gloeckler | |
| 3,783,947 | A | 1/1974 | Dix et al. | |
| 3,998,273 | A | 12/1976 | Juliano | |
| 4,228,859 | A | 10/1980 | Hattori | |
| 4,280,562 | A | 7/1981 | Glinecke | |
| 4,596,289 | A | 6/1986 | Johnson | A62C 37/09 169/37 |
| 4,880,063 | A | 11/1989 | Leininger et al. | |
| 4,976,320 | A | 12/1990 | Polan | |
| 4,977,963 | A | 12/1990 | Simons | |
| 5,072,792 | A | 12/1991 | Simons et al. | |
| 5,083,616 | A * | 1/1992 | Polan | A62C 37/14 169/37 |
| 5,497,834 | A | 3/1996 | Onuki | |
| 5,727,737 | A | 3/1998 | Bosio et al. | |
| 6,044,912 | A | 4/2000 | Tsuji et al. | |
| 6,129,153 | A | 10/2000 | Joung | |
| 6,152,236 | A | 11/2000 | Retzloff et al. | |
| 6,308,784 | B1 * | 10/2001 | Mears | B05B 1/265 169/37 |
| 6,367,559 | B1 * | 4/2002 | Winebrenner | A62C 31/02 169/37 |
| 6,439,315 | B2 | 8/2002 | Onuki | |
| 6,520,265 | B2 | 2/2003 | Winebrenner | |
| 7,036,603 | B2 | 5/2006 | Thomas et al. | |
| 7,543,654 | B2 | 6/2009 | Koiwa | |
| 2002/0011527 | A1 | 1/2002 | Onuki | |
| 2006/0037761 | A1 | 2/2006 | Shim | |
| 2006/0102362 | A1 | 5/2006 | Polan | |
| 2009/0255693 | A1 | 10/2009 | Sato et al. | |
| 2010/0089597 | A1 | 4/2010 | Neeb et al. | |
| 2012/0285707 | A1 | 11/2012 | Kameishi et al. | |
| 2017/0319884 | A1 | 11/2017 | Oldham | |

FOREIGN PATENT DOCUMENTS

| | | | |
|---|---|---|---|
| CN | 2780255 | | 5/2006 |
| CN | 2865861 | | 2/2007 |
| JP | 8-66492 | * | 3/1996 |
| KR | 20040031585 | | 4/2004 |

OTHER PUBLICATIONS

Cote et al., Fire Protection Handbook, 18th edition, National Fire Protection Association, Second Printing, Mar. 2000 Massachusetts, Chapters 6-9 to 6-10, especially p. 6-146, col. 2, paragraph 1-2 (7 pages).

First Office Action issued in related co-pending Chinese Application No. 200780050062.1, Sep. 27, 2011 (11 pages).

IFW, U.S. Appl. No. 60/861,239, filed Nov. 28, 2006 [103 pages].

Supplementary European Search Report issued in corresponding European Patent Application No. 07871640.4, Nov. 30, 2010 (5 pages).

UL 199 Automatic Sprinklers for Fire-Protection Service—UL 199 (online) Underwriters Laboratories, Inc. Feb. 1, 2006 [Jan. 2, 2006], URL: http://web.archive.org/web/2006021010042/http://ulstandardsinfonet.ul.com/scopes/019 9.html (entire document especially p. 1).

International Preliminary Report on Patentability including the Sep. 15, 2008 Written Opinion for PCT/US07/85820, dated Jun. 3, 2009, 13 pages.

Supplementary European Search Report issued in corresponding European Application No. 97871640.4, dated Nov. 30, 2010; 5 pages.

Response to the Supplementary European Search Report in European Patent Application No. 07871640.4, dated Jul. 8, 2011, 26 pages.

Examination Report issued in related co-pending European Patent Application No. 07871640.4, dated Mar. 7, 2012, 4 pages.

First Office Action issued in related co-pending Chinese Application No. 200780050062.1, dated Sep. 27, 2011, 11 pages.

Response to Sep. 27, 2011 First Office Action filed in related co-pending Chinese Application No. 200780050062.1, dated Mar. 28, 2012, 24 pages.

Examination Report for related co-pending New Zealand Application No. 576735, dated Dec. 24, 2010, 3 pages.

Response to Dec. 24, 2010 Examiner's Report filed in related co-pending New Zealand Application No. 576735, dated Mar. 26, 2012, 104 pages.

Examination Report and Notice of Acceptance of Complete Specification showing the acceptance of New Zealand Application No. 576735, dated Apr. 17, 2012, 1 page.

Official Decision of Grant issued in related co-pending Russian Patent Application No. 2009124464, dated Dec. 29, 2011, 36 pages.

U.S. Appl. No. 60/861,239, filed Nov. 28, 2006, 105 pages.

* cited by examiner

CONCEALED SPRINKLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY DATA AND INCORPORATION BY REFERENCE

*More than one reissue application of U.S. Pat. No. 9,931,528 has been filed. This application is a continuation reissue of U.S. patent application Ser. No. 16/791,463, filed Feb. 14, 2020, which is an application for reissue of U.S. Pat. No. 9,931,528.* This application is *also an application for reissue of U.S. Pat. No. 9,931,528, filed as U.S. patent application Ser. No. 14/922,961 on Oct. 26, 2015, which is a* Continuation Application of U.S. patent application Ser. No. 14/087,712 filed Nov. 22, 2013 which is a Continuation Application of U.S. patent application Ser. No. 12/515,113 filed Dec. 3, 2009, (now U.S. Pat. No. 8,646,539 issued Feb. 25, 2014) which is a 35 U.S.C. 371 application of International Application No. PCT/US2007/085820, filed Nov. 28, 2007, which claims the benefit of priority to U.S. Provisional Patent Application No. 60/861,239, filed Nov. 28, 2006, each of which is incorporated by reference in their entirety.

TECHNICAL FIELD

The present invention relates generally to fire protection devices and more specifically to concealed fire protection sprinklers used preferably, for example, in institutional or commercial applications or alternatively in a residential setting.

BACKGROUND ART

Concealed-type fire protection sprinklers, which discharge a fire fighting fluid such as a water, gas or other chemical agent, can be designed to protect a variety of occupancies, both commercial and residential. In addition, the concealed-type sprinkler can be mounted in a pendant style configuration from a ceiling system or alternatively, the sprinkler can be configured as a sidewall sprinkler for mounting along a wall surface. Generally, the concealing feature of these sprinklers obscures the internal components from view. Thus, a concealed-type sprinkler is useful in residential occupancies for at least aesthetic reasons. One type of commercial occupancy in which a concealed-type sprinkler is employed is an institutional occupancy which includes, for example, correctional, detention, and mental health care facilities. Concealed-type sprinklers for institutional applications are preferably configured to have a tamper resistant thermally sensitive release mechanism to reduce the opportunity for occupants to injure themselves or others with the internal components of the sprinkler.

Industry accepted design criteria exists to minimize the hazard that concealed-type sprinklers may pose. For example, design criteria provides that an concealed sprinkler should be configured with a thermally sensitive trigger or release mechanism that can break away from the body of the sprinkler when a load of eighty pounds or more is suspended from the mechanism. Such criteria minimizes that the potential for someone to use the sprinkler as a device from which to hang themselves or others. Some known concealed sprinklers use a cover to conceal the internal components of the sprinkler in order to prevent unauthorized tampering with the sprinkler and its components. For example, U.S. Pat. No. 6,152,236 is directed to a combined trigger and concealing device for a sprinkler head to conceal components contained within the interior of the sprinkler body. The body and concealing device are further shown disposed within the recess of an escutcheon. The circular concealing device includes two overlapping fusible plates joined by a fusible bonding material which fails in the presence of a sufficient level of heat. In order to conceal the interior of the sprinkler body and provide a pathway for heat transfer to reach the interior of the concealing device, the concealing device is located a preselected distance below the bottom of the sprinkler body and a preselected radial distance within a boundary of the interior of the body. The concealing device therefore defines an annulus or gap between the device and the sprinkler body which is as much as 1/16 inches wide and 1/8 inch high. The concealing device also acts as a component of a trigger device by maintaining a pair of actuating pins in a biased position to hold an adjustment plate in place for supporting a closure member. The concealing device includes a pair of apertures disposed about a central opening to engage the actuating pins. The central opening provides access to an adjustment screw which applies a sealing pressure on the closure member.

It is believed that in one known sprinkler that uses a pair of actuating pins and a concealing device spaced from the bottom of the sprinkler, the gap between the concealing device and the sprinkler body provides access in which a wire or string can be threaded about the actuating pins to hold their relative positions. With the pins held in place, the concealing device can be removed without actuating the sprinkler thereby providing unauthorized access to the internal components of the sprinkler. Other known sprinklers having a cover engaged with a component internal to the sprinkler body in order to conceal the body interior of the sprinkler body are shown and described in U.S. Pat. Nos. 3,783,947, 6,520,865, and 6,367,559. Each of the these patents describe a cover or fusible plate assembly for a sprinkler body that includes a central opening for a tool or other object to access the interior of the body and adjust an internal component. In addition, each of the covers are shown as being within the perimeter of the interior of the sprinkler body and flush with or below the opening at the bottom of the sprinkler body.

Another concealed sprinkler is shown and described in U.S. Pat. No. 4,596,289 in which a cover member and valve closure means completely conceals the interior of the sprinkler body. However, the cover device is not completely supported in place by the sprinkler body or its internal components but instead engages a separate housing surrounding the body to support the outer tabs or projections of the cover.

DISCLOSURE OF INVENTION

The present invention is directed to a sprinkler having a trigger assembly that includes a cover plate assembly. The cover plate assembly is preferably configured to be disposed about the discharge end of a sprinkler body so as to minimize the pathways and access points to the internal components of the sprinkler. The cover plate assembly is preferably configured to engage the sprinkler body or its internal components to further present a substantially continuous surface area without designed access openings to the interior of the sprinkler. Accordingly, the cover plate assembly preferably provides means for sealing an internal chamber of the sprinkler body so as to prevent or substantially minimize unauthorized tampering with the sprinkler and its internal components. With the cover plate assembly preferably incorporated into the trigger assembly, the cover plate assembly preferably actuates the sprinkler upon being removed, dislocated or separated from its position about the discharge end of the sprinkler body. The cover plate assembly is further preferably configured to have a break-away connection with the sprinkler body, so as to separate from the sprinkler under the weight of a hanging load of eighty pounds or more. More preferably, the sprinkler body and cover plate assembly are located within a recess or housing of a surrounding escutcheon which can facilitate mounting the sprinkler and further seal off access to the internal chamber of the sprinkler body and the components contained therein.

One preferred embodiment of the sprinkler includes a body having a proximal portion and a distal portion. The body defines an internal passageway having an inlet and an outlet extending along a longitudinal axis. The distal portion includes an annular wall having an outer surface and an inner surface to further define a chamber distal of the outlet and in communication with the passageway. A portion of the annular wall further defines a distal opening at the distal end of the sprinkler body in communication with the chamber. The sprinkler further includes a deflector assembly coupled to the body. The deflector assembly preferably has a deflector plate disposed within the chamber, and the deflector plate has a first position distal of the outlet and a second position distal of the first position. In addition, the sprinkler has a closure assembly including a closure element engaged with the deflector plate such that when the deflector plate is in the first position the closure element is disposed within the outlet of the passageway. The preferred sprinkler also includes a trigger assembly having a thermally rated cover plate assembly and a lever assembly engaged with an inner surface of the annular wall to support the deflector assembly in the first position. The plate assembly preferably includes at least a first plate member including a lip portion. The plate assembly is further preferably engaged with the lever assembly such that the lip portion substantially circumscribes the portion of the annular wall defining the distal opening. The lip portion is further preferably axially spaced from another portion of the distal edge so as to define a gap height therebetween. Disposed between the distal edge and the lip portion is more preferably disposed a ring member for further sealing off access to the annular channel. The ring member is preferably made from a polymer material that can serve as an insulator between the cover plate assembly and the sprinkler body so as to improve the thermal responsiveness of the cover plate assembly. Even more preferably, the ring member is configured to center the cover plate assembly about the sprinkler body and further maintain the planar surface of the cover plate assembly substantially perpendicular to the longitudinal axis of the sprinkler body.

Another preferred embodiment of the sprinkler provides a body having a proximal portion and a distal portion. The body defines an internal passageway having an inlet and an outlet extending along a longitudinal axis, and the distal portion includes an annular wall having an outer surface and an inner surface to further define a chamber distal of the outlet and in communication with the passageway. A first portion of the annular wall preferably defines a distal opening at the distal end of the sprinkler body in communication with the chamber and a second portion of the annular wall preferably defines a shelf along the inner surface proximal of the distal opening. The sprinkler preferably further includes a deflector assembly coupled to the body. The body preferably has a deflector plate disposed within the chamber. The deflector plate preferably has a first position distal of the outlet and a second position distal of the first position. The preferred sprinkler further includes a closure assembly having a closure element engaged with the deflector plate such that when the deflector plate is in the first position, the closure element is disposed within the outlet of the passageway. The sprinkler further has a trigger assembly that preferably includes a lever assembly having a first end and a second end to respectively engage the shelf and a bridge element to support the deflector in the first position. A thermally rated plate assembly is preferably provided having at least a first plate member including a lip portion framing the first plate member. The lip portion substantially circumscribes the portion of the annular wall defining the distal opening.

Yet another preferred embodiment of the sprinkler provides a body extending along a longitudinal axis having a proximal portion and an enlarged distal portion, the distal portion including an annular wall having a proximal edge and a distal edge with an outer and an inner surface extending therebetween to define a chamber for housing a deflector assembly. A portion of the distal edge forms an opening at the distal end of the body in communication with the chamber. A cover plate is also provided, the cover plate preferably has a lip portion, the cover plate disposed beneath the body so as to substantially cover the distal opening, and the lip portion overlaps a portion of the distal edge forming the opening. The sprinkler further includes a housing having an inner surface defining a receptacle with a central through hole. A portion of the inner surface of the housing preferably engages the proximal edge of the annular wall so as to substantially enclose the chamber. Preferably, the housing is an escutcheon for surrounding the sprinkler body and flush mounting to a ceiling or wall. The body preferably extends through the through hole such that the enlarged distal portion is preferably seated within the receptacle, and an annular channel or gap is further preferably defined between the annular wall and the inner surface of the housing.

Another preferred embodiment of the sprinkler includes a body having a proximal portion defining an opening and a distal portion defining an outlet. The body defines an internal passageway between the inlet and the outlet to further define a first diameter. The distal portion of the body preferably includes an annular wall having an outer surface and an inner surface to further define a chamber distal of the outlet. The chamber preferably defines a second diameter greater than the first diameter. The preferred sprinkler also includes a deflector assembly having a deflector plate distal of the outlet disposed within the chamber. In addition, a closure assembly is included preferably having a closure element, a bridge assembly engaged with the closure element, a thermally responsive plate assembly, and at least one lever member having a first end engaged with the plate assembly and second end engaged with the distal portion of the body so as to engage the bridge assembly such that the closure element is disposed adjacent the outlet of the body to maintain a static fluid pressure up to about 500 pounds per square inch (psi).

Another sprinkler according to the present invention preferably includes a sprinkler body, the sprinkler body having a proximal portion including an proximal opening and a distal portion including an outlet. The body defines an internal passageway between the inlet and the outlet along a longitudinal axis, and the distal portion includes a chamber and a deflector assembly disposed within the chamber. The chamber further defines a distal opening. The sprinkler further preferably includes a thermally rated trigger assembly having a lever assembly and means for preventing access to the chamber.

In yet another preferred embodiment, a sprinkler preferably includes a sprinkler body having a proximal portion including an proximal opening and a distal portion including an outlet. The body further defines an internal passageway between the inlet and the outlet along a longitudinal axis, and the distal portion preferably includes a chamber defining a distal opening. A deflector assembly is preferably disposed within the chamber. A thermally rated trigger assembly preferably includes a lever assembly and a cover plate assembly disposed about the distal opening so as to substantially enclose the chamber. The cover plate assembly preferably engages the lever assembly to define a surface substantially perpendicular to the longitudinal axis, the surface defining a surface profile including a gap in communication with the chamber having a maximum gap width no greater than about 0.005 inches (0.127 millimeters).

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
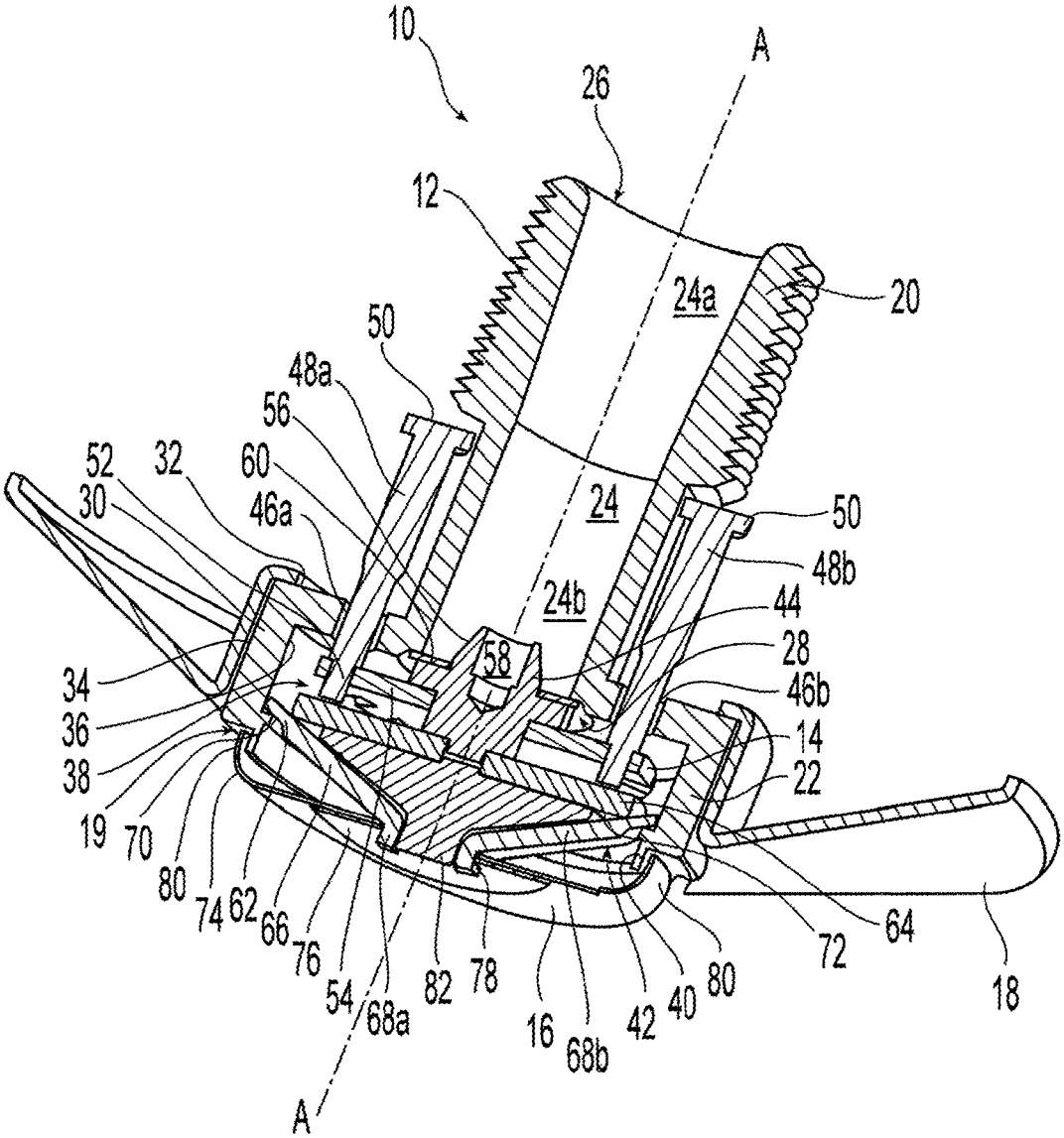
FIG. 1 is a cross-sectional view of a first embodiment of a preferred sprinkler.
Figure 7:
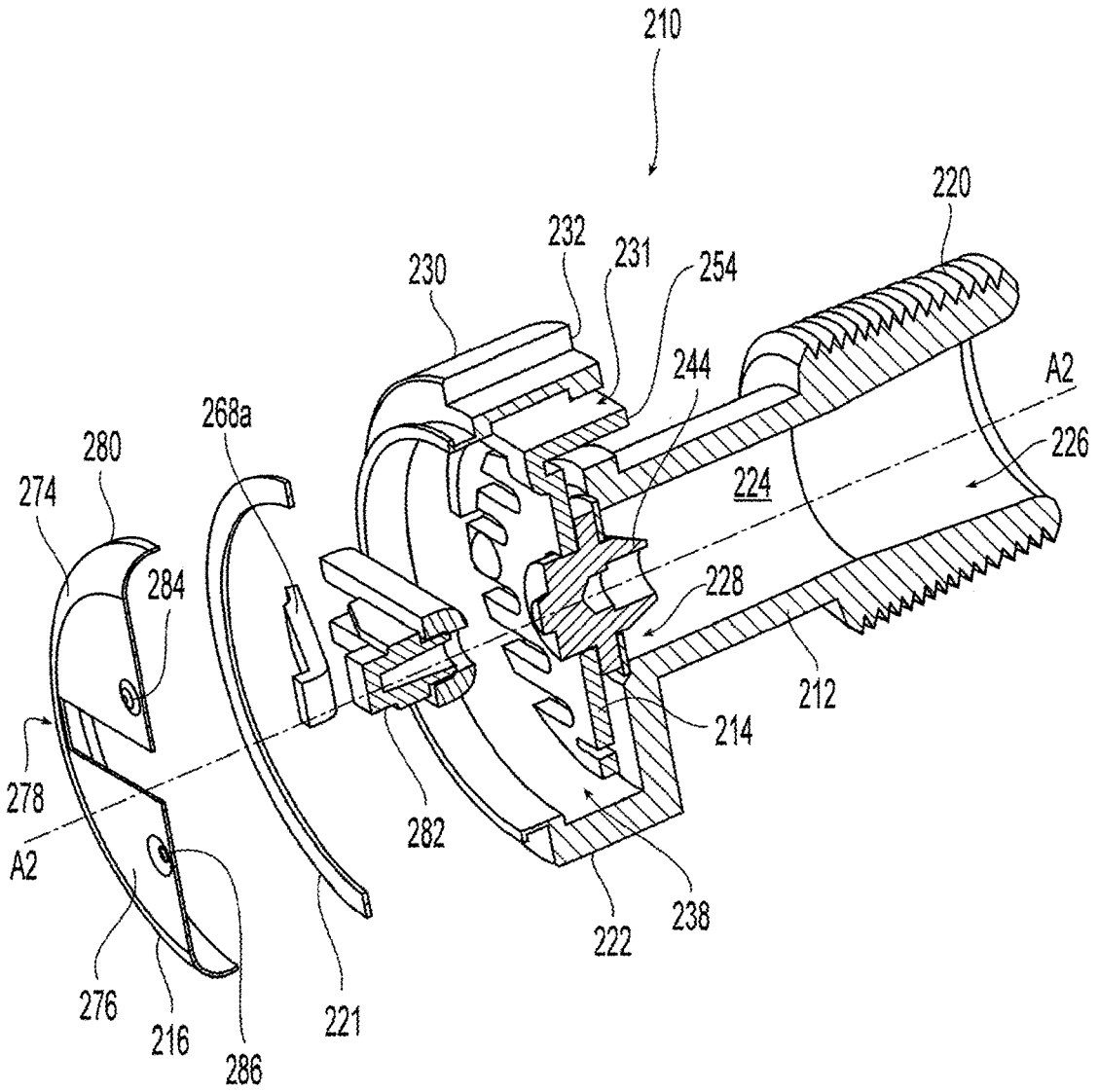
FIG. 7 is a cross-sectional view of an embodiment of a sidewall concealed sprinkler.
Figure 7A:
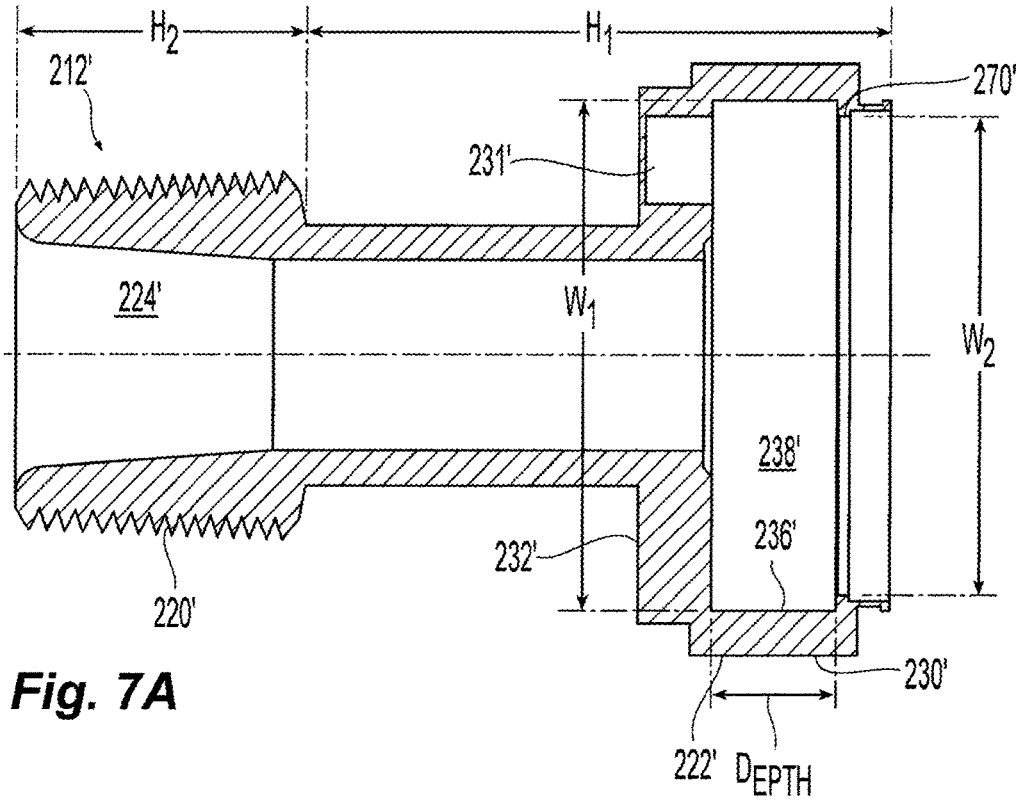
FIG. 7A is a body for use in the sidewall sprinkler of FIG. 7.

Shown in FIG. 1 is a first illustrative embodiment of a preferred sprinkler 10. The sprinkler 10 is preferably configured as a concealed-type sprinkler. The sprinkler 10 can be configured for commercial applications, including institutional applications as well as other commercial applications as defined by the requirements of Underwriters Laboratories, Inc. ("UL") Standard 199 (2005), entitled, "Automatic Sprinklers for Fire-Protection Service," ("UL Standard 199 (2005)") which is incorporated by reference in its entirety. Further, in the alternative, the sprinkler 10 can be configured for residential applications as defined by the requirements of UL Standard 1626 (2004), entitled "Residential Sprinklers for Fire Protection Service," each of which is further defined by the applicable installation requirements of National Fire Protection Association (NFPA) Standards: NFPA-13 (2007) entitled, "Standards for the Installation of Sprinkler Systems"; NFPA-13D (2007)

entitled, "Standards for the Installation of Sprinkler Systems in One- and Two-Family Dwellings and Mobile Homes; and NFPA-13R (2007) entitled, "Standards for the Installation of Sprinkler Systems In Residential Occupancies up to and Including Four Stories in Height." The sprinkler 10 can be configured for pendant style mounting with a pendant style deflector as shown, for example, in FIG. 1, or alternatively, the sprinkler 10 can be configured for sidewall or substantially horizontal mounting with a sidewall deflector as shown, for example, in FIGS. 7-7A. The sprinkler 10 generally includes a body 12, a deflector assembly 14, and a cover plate assembly 16. The sprinkler 10 is further preferably disposed within a mounting element 18 for mounting to a ceiling structure such as, for example, a ceiling tile, dry wall ceiling or other structure forming the mounting surface. The mounting element 18 is preferably an escutcheon 18 having a proximal end face for engaging the ceiling construct. The mounting element 18 preferably tapers from the proximal end face to distal end face which is preferably located proximate to and more preferably substantially flush with a distal end of the body.

The sprinkler body 12 has a proximal portion 20 and a distal portion 22. The outer surface of the proximal portion 20 preferably includes a threaded end fitting for coupling the sprinkler 10 to a branch line of a sprinkler system containing a fire fighting fluid, for example, a liquid such as water, a pressurized gas such as compressed air, or a combination thereof, such as a foam. An inner surface portion of the body 12 further defines an internal passageway 24 extending between an inlet 26 and an outlet 28 along a longitudinal axis A-A. The inlet 26 is preferably in communication with tapering portion 24a of the passageway 24. The tapering passageway 24 is further preferably in communication with a portion 24b having a constant diameter and terminating at the outlet 28. The passageway 24, inlet 26 and outlet 28 further preferably define a sprinkler constant or K-factor ranging from about 3 gallons per minute per pounds per square inch raised to the one-half power $(gpm/(psi))^{1/2}$ to about 5.8 $(gpm/(psi))^{1/2}$ and is preferably about 5.6 $(gpm/(psi))^{1/2}$.

The distal portion 22 preferably includes an annular wall 30 having a proximal edge 32 contiguous and more preferably integral with the proximal portion 20. The annular wall 30 includes an outer surface 34 and an inner surface 36 to further define a chamber 38 distal of the outlet 28. The body 12 is preferably constructed such that the chamber 38 is in communication with the passageway 24. The annular wall 30 further includes a distal edge 40 defining a distal opening 42 preferably at the distal end of the body 12 in communication with the chamber 38. The annular wall 30 preferably defines a first wall thickness, and the distal edge of the annular wall 40 defines a wall thickness that is preferably less than the first wall thickness. The sprinkler body 12 generally defines substantially circular cross-sections in a plane perpendicular to the longitudinal axis A-A; however, it should be understood that the body 12 can define other geometrical cross-sections such as, for example, oval or rectangular provide the body 12 can deliver the desired flow and pressure of fluid.

The chamber 38 is preferably configured for housing internal components of the sprinkler 10. More specifically, the chamber 38 is preferably configured for housing the deflector assembly 14 and a closure element 44. The deflector assembly 14 is coupled to the body 12 and is more preferably suspended in a telescoping manner from the proximal edge 32. More specifically, the proximal edge 32 preferably includes a pair of through holes 46a, 46b in communication with the chamber 38. The deflector assembly 14 preferably includes a pair of arms 48a, 48b engaged in the through holes 46a, 46b. The arms 48a, 48b each preferably include an enlarged proximal end 50 for engaging the proximal edge 32 of the annular wall 30 so as to limit the distal and axial travel of the arms 48a, 48b in the through holes 46a, 46b. The proximal edge 32 can include additional openings to provide space for housing additional components within the chamber 38, for example, the proximal edge 32 can include two substantially semi-circular openings disposed about the proximal portion 20 of the body 12. The additional openings can further provide a sprinkler assembler/installer access or view to the chamber 38.

Coupled to the distal end 52 of each arm 48a, 48b of the deflector assembly 14 is a deflector plate 54. The arms 48a, 48b preferably locate the deflector plate 54 at a first position within the chamber 38 distally adjacent the outlet 28. The deflector plate 54 further preferably includes a central hole with a closure element or assembly 44 engaged therein. With the deflector plate 54 located at its first position, the closure element 44 is preferably located in the outlet of the passageway 28 to prevent the flow of a fluid (liquid or gas) from the outlet of the passageway 24b. The closure element 44 preferably includes a closure button 56 having a preferably frustroconical tip with a partial bore 58. The partial bore 58 is further preferably threaded for engagement with a tool used in the assembly of the sprinkler 10. Disposed about the frustroconical tip and engaged with a flange 57 of the closure button 56 is a biasing element 60 to bias the closure assembly 44 in the direction of the distal opening 42. Preferably, the biasing element 60 includes a Belleville spring disc having a spring force ranging from about 50 lbs. (222 Newtons) to about 120 lbs. (534 Newtons). With the closure element 44 in its sealing position, the frustroconical tip is preferably disposed within the passageway 24 and the biasing element 60 engages a preferably counter sunk surface forming the outlet 28 to the distal portion 24b of the passageway 24.

Figure 9:
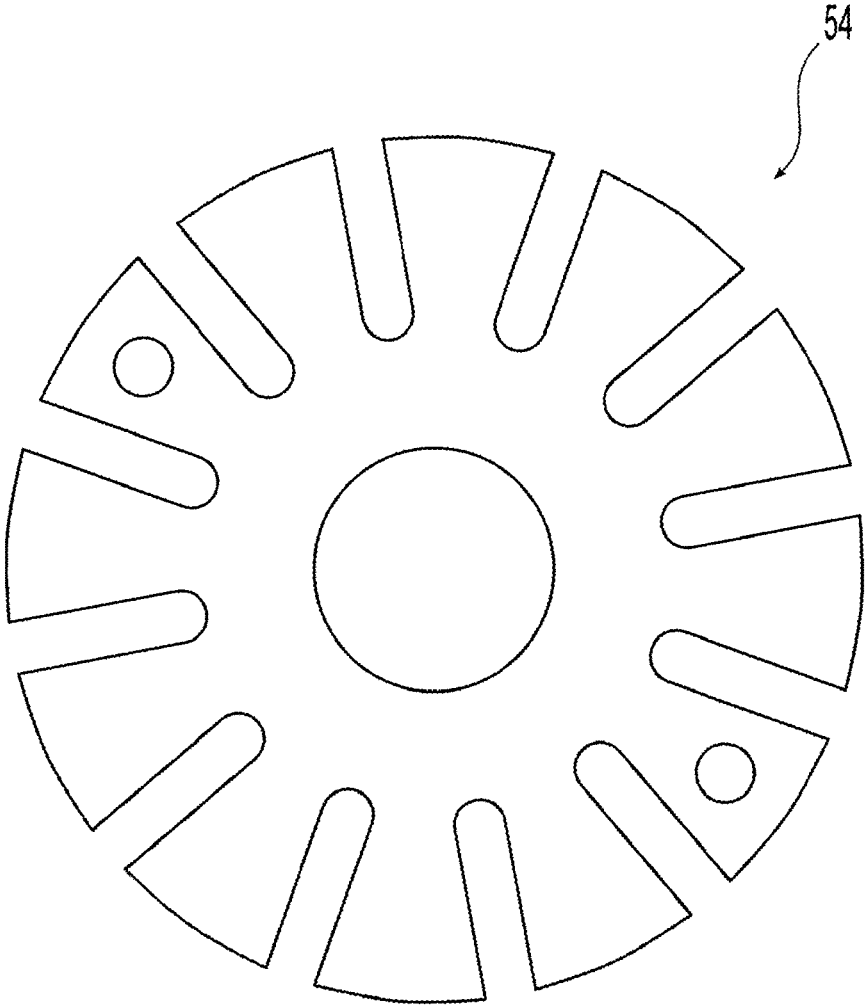
FIG. 9 is a plan view of a pendant deflector plate for use with the sprinkler of FIG. 1.

The axial travel of the arms 48a, 48b locates the deflector plate 54 to at least a second position distal of its first position and preferably distal of the distal opening 42. With the deflector plate in its second position, the closure element 44 is preferably spaced from the outlet 28 so as to permit any fluid (liquid or gas) supplied to the body 12 of the sprinkler 10 to discharge from the outlet 28. Liquid discharged from the outlet 28 can impact the axially displaced deflector plate 54 for distribution about an area beneath the sprinkler. To facilitate a distribution of fire fighting fluid in an area being protected by the sprinkler 10, the deflector plate can include a pattern of closed or open ended slits, slots, through holes, openings, cut-outs or any combination thereof to satisfy any one of a vertical or horizontal fluid distribution test. Preferably the sprinkler body 12 and deflector assembly 14 can be configured for standard coverage or extended coverage as defined by, for example, NFPA-13 (2007). The deflector plate 54 is preferably a pendant style deflector plate as generally shown for example in FIG. 9.

The sprinkler 10 is preferably a thermally actuated sprinkler so as to permit the passage of fluid from the outlet 28 in the presence of a sufficient amount of heat. Accordingly, the sprinkler 10 includes a trigger assembly 62. The trigger assembly 62 preferably includes a bridge element 64 and a lever assembly 66. The bridge element 64 preferably includes a surface for supporting the deflector assembly 14 in its first position and the closure element 44 in its sealed position engaged with the outlet 28. More preferably, the bridge element 64 includes a substantially planar upper surface to engage a portion of the closure element 44 which is preferably fixed within the central through hole of the deflector plate 54.

To locate the deflector assembly 14 in the first position and the closure element in the sealed position, the bridge element 64 is appropriately axially located within the chamber 38. Accordingly the lever assembly 66, by a preferably pivoted engagement with the inner surface 36 of the annular wall 34, is configured to support the bridge element 64 in the desired location within the chamber 38. In one preferred embodiment, the lever assembly 66 includes a pair of lever members 68a, 68b diametrically disposed about the central axis A-A. The lever members 68a, 68b preferably include one end for engaging the inner surface 36 and another end for engaging the cover plate assembly 16. To facilitate the pivoted engagement between the annular wall 34 and the levers 68a, 68b, the inner surface 36 preferably defines an annular shelf 70, and the engaging end of the lever member 68a, 68b preferably includes a flat for frictional engagement with the shelf 70. The engagement of the lever members 68a, 68b with the cover plate assembly 16 preferably angle the lever member 68a, 68b relative to one another to form a frame for directly and indirectly supporting the bridge element 64, closure element 44 and deflector assembly 14.

To support itself about the lever members 68a, 68b, the bridge element 64 is preferably configured to define a channel 72 to receive the end portion of the lever member 68a, 68b so as to be straddled about the diametrically opposed ends of the lever members. Accordingly, the bridge element 64 is preferably trenched, grooved, and/or bracketed to resemble a U-shaped in cross-section. Alternatively, the bridge element can be a substantially single planar member for planar contact engagement with the components of the deflector and lever assemblies 14, 66. Where the material defining the cross-section has an aspect ratio equivalent to the material height or thickness over its width or length, the ratio is substantially less than one so as to define a small volume and minimize the space requirements of the bridge element 64 within the chamber 38. The bridge element 64 can define a length so as to bridge the lever members 68a, 68b at a location that locates the deflector assembly 14 in its first position and further locates the closure element 44 in its sealing position. More specifically, the length of the bridge element defines the point of contact on the lever members 68a, 68b for transferring the load of biasing element 60 and further transferring any applied static fluid load in the passageway 24 to the trigger assembly 62. Upon actuation of the sprinkler 10, the lever members 68a, 68b preferably pivot about the points of engagement with the shelf 70 to axially displace the bridge element 64 so as to permit the axial translation of the deflector assembly 14 and the closure element 44.

The angular relation of the lever members 68a, 68b relative to one another or another reference line, such as the longitudinal axis A-A of the sprinkler 10, is preferably defined by the engagement of lever members 68a, 68b with the cover plate assembly 16. Preferably, the lever members 68a, 68b define in between an included angle of about 136 degrees (136°) and accordingly each lever member defines an angle β of about sixty-eight degrees (68°) with the respect to the longitudinal axis A-A as seen, for example, in FIG. 1C. However, any suitable angle can be formed between the lever members provided the lever members 68a, 68b can support the cover plate assembly 16 and the closure element 44. The cover plate assembly 16 is also configured to provide means for concealing the components of the sprinkler 10 container within the chamber 38 such as, for example, the deflector plate 54 or the lever members 68a, 68b. The cover plate assembly 16 preferably includes a first plate member 74 and a second plate member 76 coupled to the first plate member 74. The first plate member 74 preferably includes a substantially planar surface portion that is sized so as to substantially cover the distal opening 42 of the body 12. An out of plane, raised or lip portion 80 of the first plate member 74 is contiguous and more preferably integral with the planar surface portion. The raised or lip portion 80 preferably defines a substantially circular perimeter of the plate member 74. Alternatively, the lip portion 80 can define a perimeter of an alternate geometry such as, for example, oval, rectangular or polygonal.

Figure 1A:
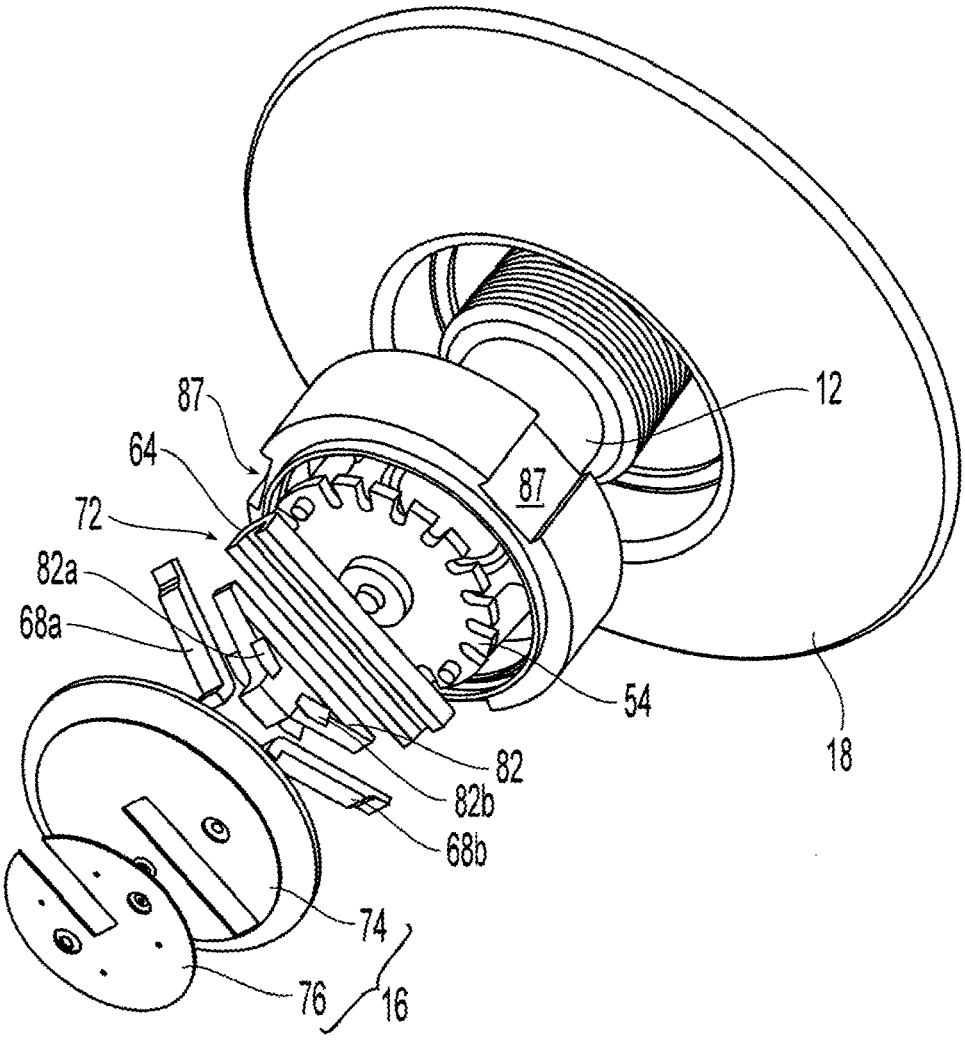
FIG. 1A is an exploded view of the sprinkler of FIG. 1.
Figure 1B:
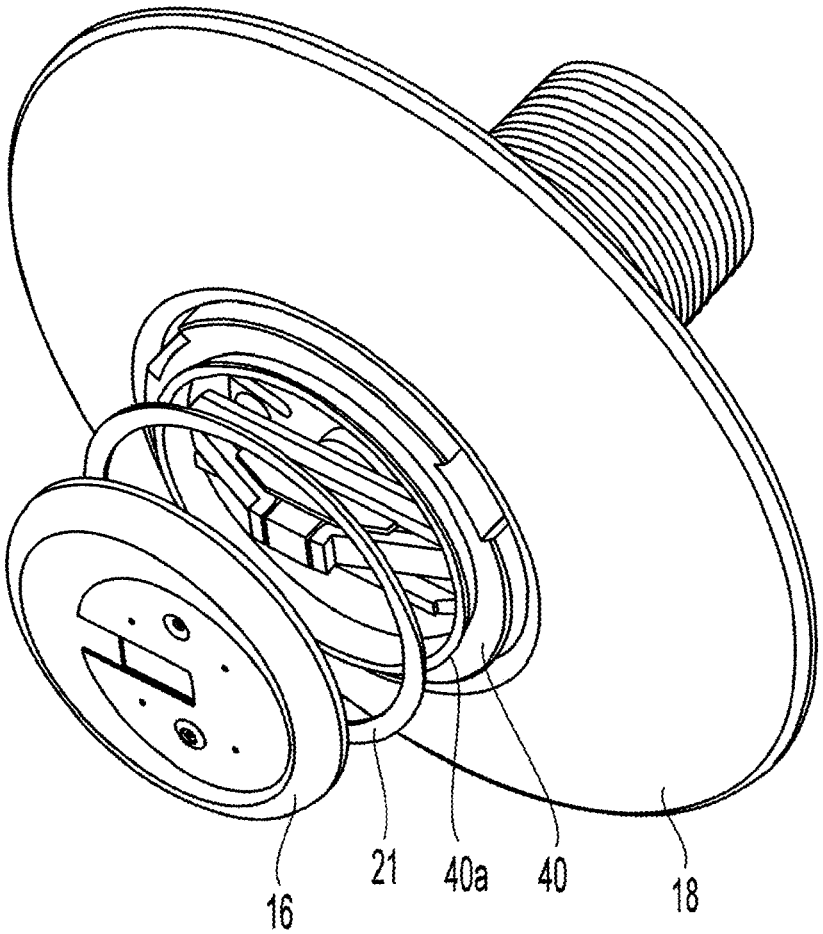
FIG. 1B is an exploded view of an alternate embodiment of the sprinkler of FIG. 1.

Preferably formed between the distal edge 40 and the remainder of the annular wall 30 is a step transition or shoulder. Preferably spaced distally from the shoulder is the lip portion 80 to define an axial space having a height h in between as seen, for example, in FIG. 1C. Referring back to FIG. 1, the lip portion 80 further has a diameter of a sufficient length so as to further define a circumference larger than the circumference of the distal edge 40 of the annular wall 30 forming the distal opening 42. Thus, where the engagement of the lever members 68a, 68b with the cover plate assembly 16 locates the first plate member 74 distally adjacent the distal opening of the body 12, the lip portion 80 preferably overlaps and circumscribes the distal edge 40. The overlap of the lip portion 80 provides a parallel wall in combination with the distal edge 40 of the annular wall 30 to further limit radial access to the chamber 38. More preferably, the lip portion 80 presents a continuous outer surface to circumscribe the distal edge 40 of the body 12. Alternatively, the lip portion 80 may include periodic gaps or slots of a sufficient frequency to define the lip portion and prevent radial access to the chamber 38. Accordingly, the preferred embodiment of the first plate member 74 and the cover plate assembly 16 further enhances the concealed nature of the sprinkler 10 by further limiting access to the chamber 38. To fill in or otherwise minimize the axial space h in between the shoulder of the annular wall 30 and the lip portion 80, a ring 21 is preferably disposed within the axial space, as more specifically shown in FIG. 1E thereby further eliminating a void into which a foreign object may be inserted to tamper with the sprinkler 10. Shown in FIG. 1B is an illustrative embodiment of the ring 21. The ring 21 can act as a flat washer orienting the cover plate assembly 16 such that the surface of the assembly concealing the chamber 38 is substantially orthogonal to the longitudinal axis A-A. The ring 21 is preferably made of a polymer material such as, for example, Teflon, polyethylene, polypropylene or more preferably nylon. The polymer preferably provides the ring 21 with insulation properties such that the ring 21 can behave as an insulator between the cover plate assembly 16 and the remainder of the sprinkler 10. By substantially insulating the cover plate assembly 16, heat from a fire event can impact the cover plate assembly 16 without significant heat transfer to other portions of the sprinkler 10 thereby facilitating appropriate thermal response by the cover plate assembly 16 in the presence of a heat or fire event.

Figure 1C:
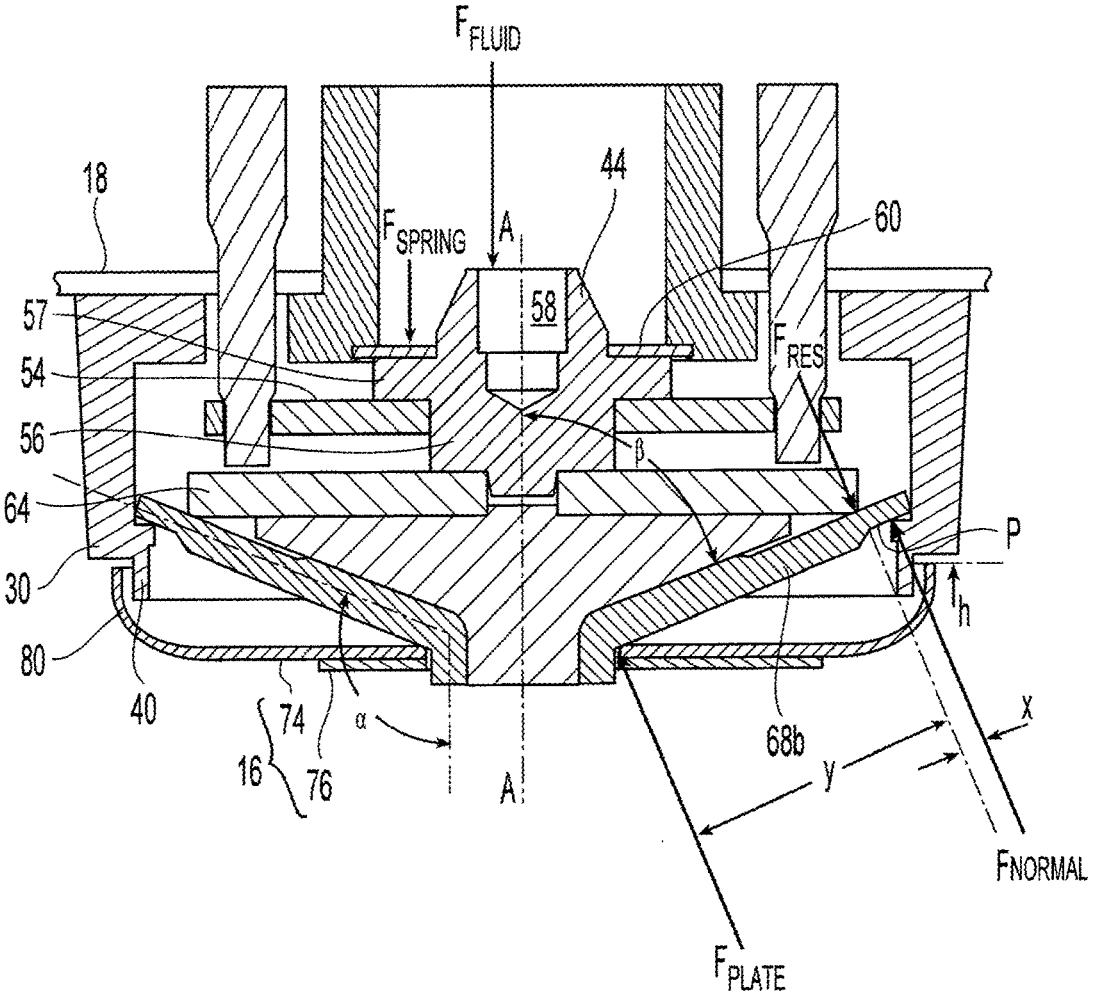
FIG. 1C is a detailed cross-sectional view of the sprinkler of FIG. 1
Figure 1D:
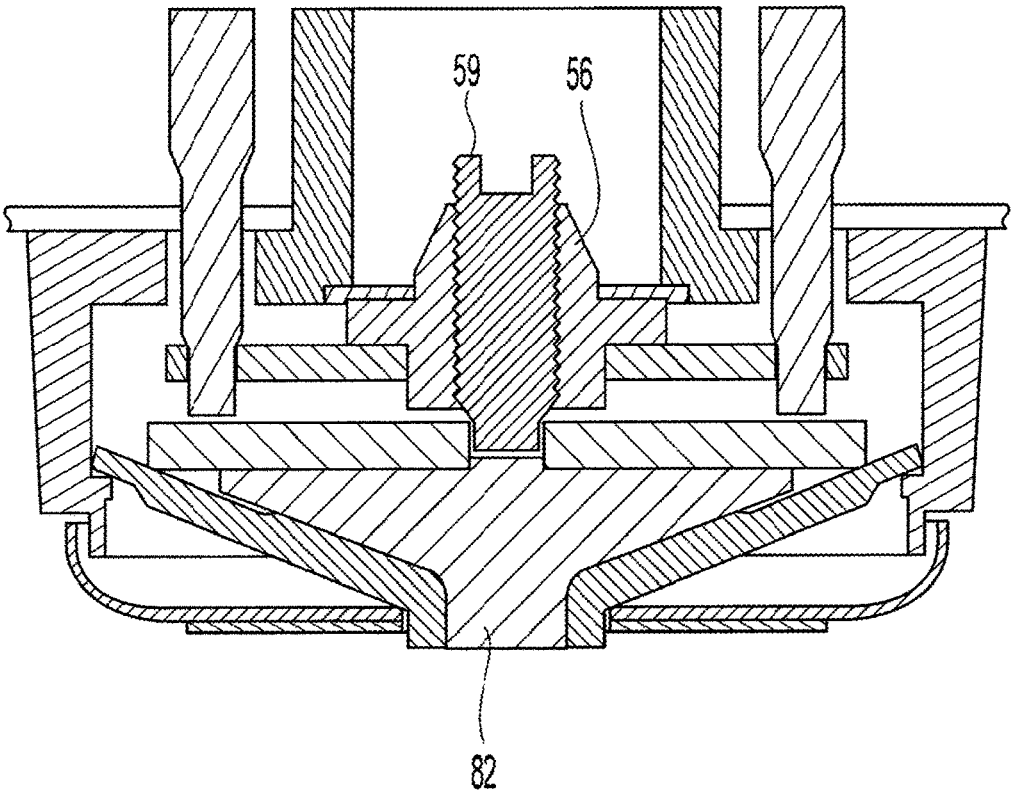
FIG. 1D is another embodiment of the sprinkler of FIG. 1.
Figure 1E:
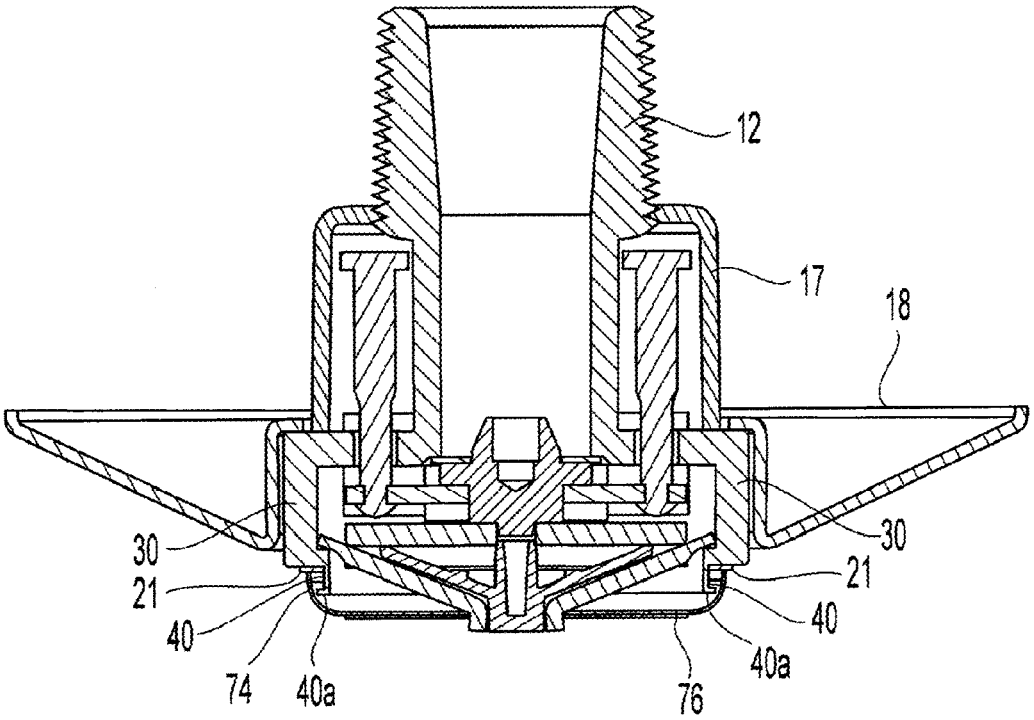
FIG. 1E is yet another embodiment of the sprinkler of FIG. 1.

To further enhance the concealing function of the lip portion 80 and the first and second plate members 74, 76 of the cover plate assembly 16, the distal edge 40 can include additional features that cooperate with the lip portion 80 and deter tampering with the internal components of the sprinkler 10 housed within the chamber 38. For example, along the outer surface of the wall forming the distal edge 40 can be an annular shelf 40a extending radially toward the lip portion 80 to further occupy the space therebetween, as seen in FIG. 1E. The exterior annular shelf 40a would preferably present a barrier to an string, wire or other long flexible instrument which may be manipulated in between the first plate member 74 and the distal edge 40.

Figure 2:
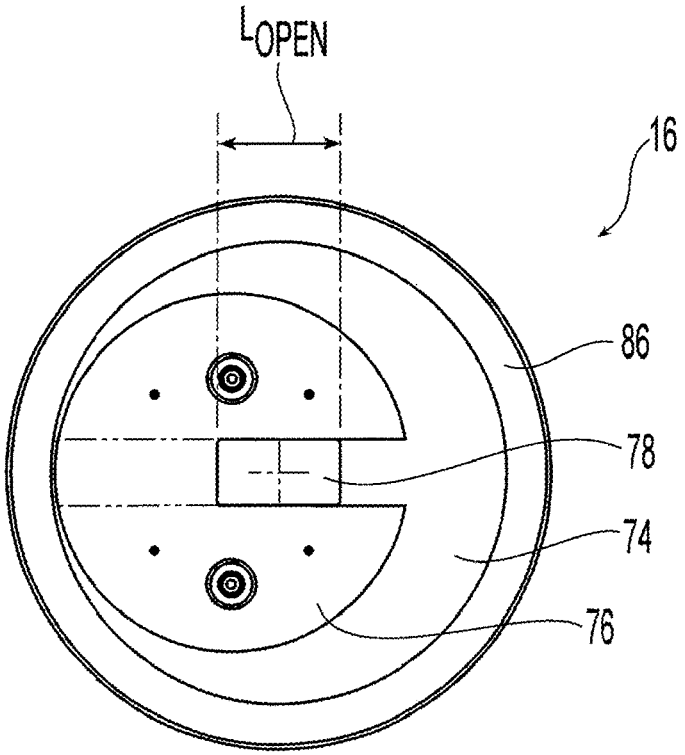
FIG. 2 is a plan end view of a cover plate assembly for use with the sprinkler of FIG. 1.
Figure 2A:
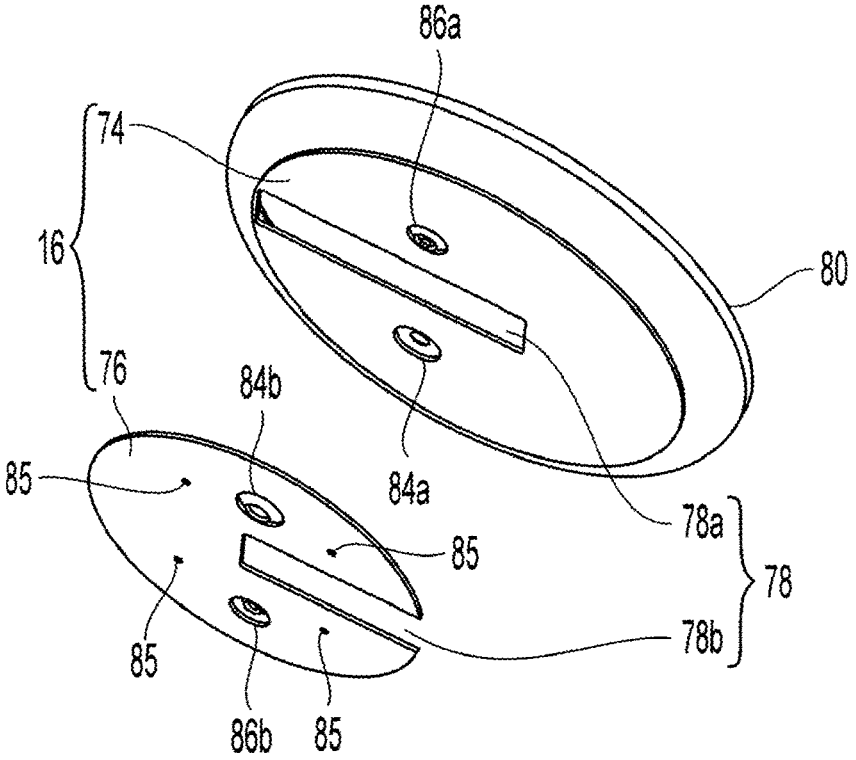
FIG. 2A is an exploded view of the cover plate assembly of FIG. 2.

The second plate member 76 is preferably coupled to the first plate member to further define one or more cover plate assembly openings 78 which engage the ends of the lever members 68a, 68b. More specifically, shown in the exploded views of FIGS. 1, 2 and 2A is the cover plate assembly 16. The first plate member 74 includes an opening 78a, and the second plate member 76 includes a plate opening 78b. In one preferred assembly, the opening 78a of the first plate member 74 is an elongated closed formed opening, and the opening 78b of the second plate member is an open ended slot. Upon the assembly and overlap of the first and second plate members 74, 76, the respective opening and slot 78a, 78b cooperate to form the preferred closed form elongated single opening 78 as seen in FIG. 1. The first and second plate members 74, 76 can include additional or alternatively dimensioned open or closed formed openings, cut-outs, slots, slits, voids, perforations or depressions.

Referring again to FIG. 1, the opening 78 is preferably dimensioned such that ends of the levers 68a, 68b engage the axial ends of the opening 78 so as to locate the lever members 68a, 68b within the chamber 38 to support the deflector and closure assemblies as described above. Although, the openings of the cover plate assembly 16 are shown as substantially rectangular, other geometries are possible such as, for example, oval or another polygonal shape provide the opening can be engaged with the ends of the lever member in a substantially close fit arrangement. Preferably, the plate engaging ends of the lever members 68a, 68b are configured so as to engage the plate assembly opening 78 in a substantially normal direction to the surface of the plate assembly 14. Thus, the end portion of the lever members preferably define an obtuse included angle $\alpha$ ranging from about 105° to about 115°, is preferably about 112° and is more preferably about 108°, with the remainder of the lever members 68a, 68b, as seen in FIG. 1C. Moreover, the opening 78 is preferably located centrally to the cover plate assembly, thereby angling the lever members 68a, 68b relative to one another to form the supporting frame for the bridge element 64 and the deflector and closure assemblies as described above. More preferably, the opening 78 is located about the center of the cover plate assembly 16 and intersecting the longitudinal axis A-A such that the ends of the lever members 68a, 68b are located within the axial flow path defined by the outlet 28 of the passageway 24.

The ends of the lever members 68a, 68b preferably occupy only a portion of the entire area of the opening 78, for example, 30 to 50 percent of the entire available space defined by the opening 78. Thus to fully occupy the opening 78, provide the close fit between components and maintain the concealed nature of the complete sprinkler assembly, the lever assembly 14 further includes a retaining member or plug 82 to horizontally space the ends of the lever member 68a, 68b into close engagement with the ends of the opening 78. The central plug 82 can be embodied as a small resilient member for installation into the plate assembly opening 78 after locating the plate assembly 16 about the distal portion of the body 12. Alternatively, the plug 82 can be embodied as an enlarged wedge shaped spacer or retaining bar located between the lever members 68a, 68b prior to locating the plate assembly 16 about the distal portion of the body 12.

The second plate member 76 is preferably thermally coupled to the first plate member 74. The first and second plate members 74, 76 are preferably coupled together by a fusible thermally sensitive material such as, for example, a eutectic solder material rated to melt in the presence of sufficient heat generated by, for example, a fire event. Accordingly, the trigger assembly 62 preferably incorporates or includes the cover plate assembly 16 as a thermally rated link device to thereby define the thermal rating of the sprinkler. Preferably, the cover plate assembly 16 is configured to define a thermal rating for the sprinkler 10 ranging between 140° F. and 212° F.; more preferably, the sprinkler 10 is thermally rated for 165° F. In addition, the cover plate assembly 16 can be configured as a standard response or a fast response link device. Preferably, the solder material and the link device define an response time index (RTI) of less than 50 $(m\text{-}s)^{1/2}$.

Referring again to FIGS. 2 and 2A, disposed between the first plate member 74 and the second plate member 76 is the solder material. The area to be soldered is preferably equivalent to the area defined by the surface area of the second plate member 76 to be joined to the first plate member 74. Accordingly, for a preferred second plate member 76, as shown for example in FIG. 2A, the areas to be soldered is about 0.4 square inches ($in.^2$) to about 0.5 $in^2$ and is preferably about 0.45 $in.^2$. In order to ensure that the solder coupling between the plate members is of an appropriate thickness, at least one of the plate members, preferably the smaller second plate member 76, includes one or more dimple members 85 that project into the space between the plate members 74, 76 at a preferred dimple height of about 0.0010 inches to about 0.0015 inches. The dimple members 85 act as a spacer between the plates as the solder material fills the interstitial space to control the thickness of the solder preferably to height equivalent to the dimple height. Accordingly, the preferred plate assembly 16 defines a weld area to height ratio ranging from about 300:1 to about 450:1. The thickness of the solder can define the thermal responsiveness of the solder and therefore define the thermal responsiveness of the cover plate assembly or link 16 and the sprinkler 10. Moreover, the height of the solder in the axial direction, i.e., the thickness can further define the bonding strength of the solder. Should the solder height be too low, there may be too much of an alloy present due to the heat generated in applying the solder such that the solder does not retain its expected thermal responsiveness. Conversely, if the solder height is too high then the solder connection may not be sufficiently strong enough in shear, i.e., the direction orthogonal to the longitudinal axis, to resist the force of the lever members 68a, 68b and maintain the first and second plate members coupled to one another.

To further ensure that the surfaces of the plate members 74, 76 are correctly oriented relative to one another so as to properly define the one or more cover plate assembly openings 78, each of the first and second plate members 74, 76 preferably includes a depression or opening 84a, 84b and a corresponding projection 86a, 86b for respectively containing therebetween the thermally sensitive material. The cooperation between the depressions 84 and the projections 86 ensures that the second plate member 76 is properly oriented and engaged with the first plate member 74 to define the plate opening 78 for engagement with the ends of the lever assembly. More preferably, the depressions 84 and the projections 86 are offset relative to the center point of each plate member 74,76 to further ensure that the appropriate mating faces are engaged. Alternatively, other mating features can be incorporated respectively into the first and second plate members 74, 76 to ensure proper orientation and engagement of the plate members.

Figure 2B:
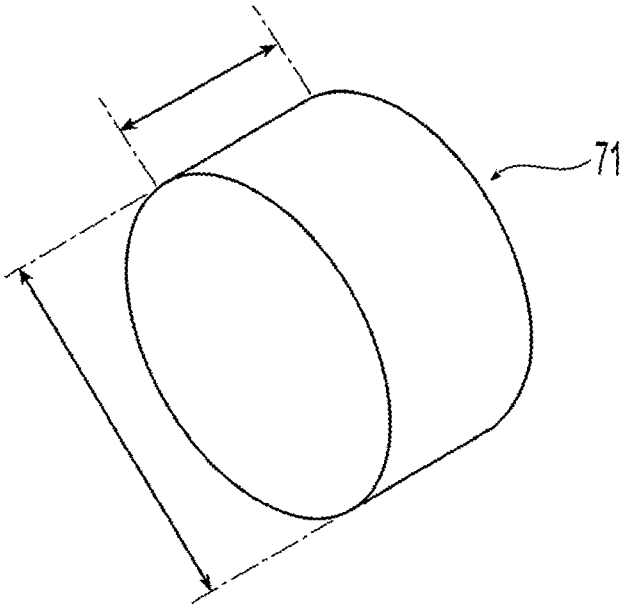
FIG. 2B is a perform solder pellet for use in the cover plate assembly of FIG. 2.

The first and second plate members 74, 76 of the assembly 16 are preferably copper, and in their preferred assembly, the plates 74, 76 are cleaned and de-oxidized. With an appropriate flux applied to their mating surfaces, the plates are pressed together and a preformed pellet 71 of sufficient volume is disposed within each cavity formed by the engaged depressions 84 and projections 86. The assembly is heated to distribute the solder material between the first and second plate members 74, 76, filling the space therebetween. The assembly is preferably heated to produce a solder fillet around the perimeter of the second plate member 76. A preferred preformed solder pellet 71 is shown for example in FIG. 2B. The solder pellet 71 is preferably a material of Indalloy 158 from INDIUM CORP. or equivalent solder having a preferred composition of 50% Bi, 26.7% Pb, 13.3 Sn, and 10% Cd.

Upon exposure to a sufficient level of heat, the thermally sensitive material between the plates melts thereby allowing the first and second plate members 74, 76 to separate, and allow the lever assembly to pivot and actuate the sprinkler 10. The first plate member 74 preferably defines a larger surface area than the second plate member 76. Where each of the first and second plate members 74, 76 or their assembly is substantially circular, the second plate member 76 is preferably located eccentrically relative to the first plate member 74 such that the center points of the first and second plate members 74, 76 are coaxially aligned along an axis skewed relative to the longitudinal axis A-A. Alternatively, each of the first and second plate members 74, 76 can define a center point, which can further be coaxially aligned in the cover plate assembly 16 and substantially parallel to the longitudinal axis A-A. Further alternatively, the cover plate assembly 16, can define a geometry other than substantially circular, such as, for example, oval, rectangular or polygonal.

The thermal performance of the cover plate assembly 16 as a thermal link device can be further defined by the material and thickness of the material forming the individual plate members 74, 76 of the assembly 16. Preferably, the thickness of the first and second plate members 74, 76 is such that the cover plate assembly 16 presents a sufficiently rigid and durable structure. However, the plate members 74, 76 should not be so thick so as to adversely effect the desired and preferably predictable thermal performance of the cover plate assembly 16. Preferably, each of the first and second plate members 74, 76 are constructed from a copper material ranging in thickness from about 0.007 inches and 0.01 inches, preferably ranging from about 0.0070 inches to about 0.0080 inches and is preferably about 0.0075 inches thick. Alternatively, the first and second plate member 74, 76 can be made of other thermally responsive materials such as nickel preferably having a thickness of about 0.007 inches. Moreover, the first and second plate members can be constructed of any material of any thickness provided the assembly of the first and second plate members provides adequate thermal responsiveness.

Preferably, all the exposed surfaces of the cover plate assembly 16 are coated to protect the assembly against corrosion from the elements of the surround environment in which the sprinkler 10 may be placed. Corrosion could adversely effect the thermal performance of the cover plate assembly 16 and inhibit its capability to serve as an effective link device in the trigger assembly 62. Preferably, the edge surfaces defining the thickness of the assembly 16 are at a minimum double coated to ensure proper protection. These edge surfaces, for example at the periphery of the first plate member 74 or at the edges defining the opening 78, are thin and therefore do not present a large surface area to which a coating may adhere. In particular, the cover plate assembly 16 is covered with a two part coating including a self-etching primer and a polyurethane coating. Such a two-part coating is well known in the art. Alternatively, the cover plate assembly 16 can be coated with a polyester coating which is preferably configured as a powder applied paint. Further in the alternative, a protective coating may be applied in which the coating is embodied in an epoxy coating. Other coatings know in the art may also be utilized.

More preferably, the cover plate assembly 16 is covered with a paint coating to satisfy one or more standards and test protocols, such as for example, the operation and corrosion test standards under UL Standard 199 (2005), which is incorporated by reference in its entirety. The preferred coating includes a prime coat, preferably a fast drying pretreatment type, 2 package, acid catalyzed vinyl washcoat such as, for example, INDUSTRIAL WASH PRIMER CC-A2 from SHERWIN WILLIAMS as described in Sherwin William Chemical Coating data sheet CC-A2 (11/06) available at Internet URL:<http://www.paintdocs.com/webmsds/webPDF.jsp?SITEID=STORECAT&prodno=035777435052&doctype=PDS&lang=E>. The preferred coating further includes a top coat of a corrosion inhibiting epoxy polyamide coating such as, for example, MIL-GUARD-53022 CORROSION INHIBITING L & C FREE EXPDXY PRIMER from SIMCO COATINGS INC., as described in Simco Mil Spec Paint data sheet Mil-P-53022 available at Internet URL:<http://www.simcocoatings.com/mil-p-53022b.html>. The coating is preferably applied to a thickness of ranging from about 0.0005 inches to about 0.002 inches.

Figure 11:
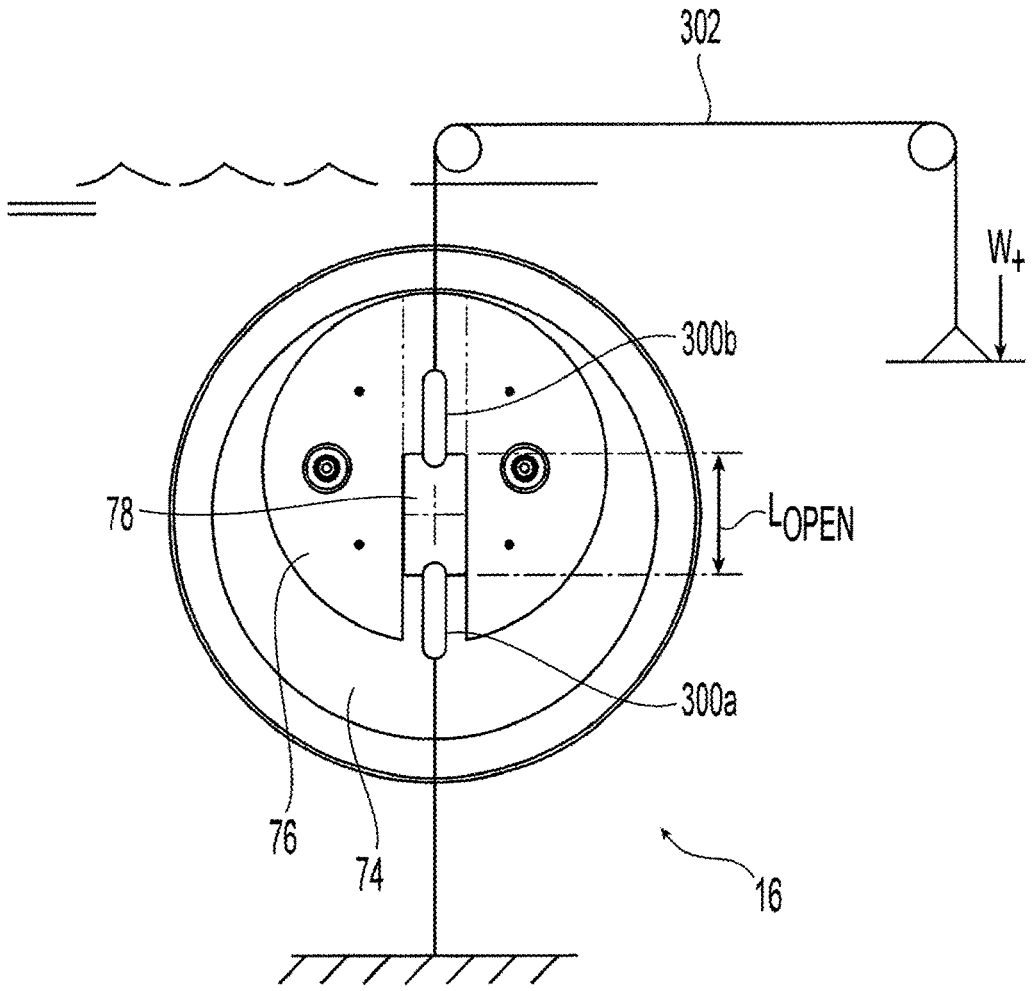
FIG. 11 is an illustrative schematic for testing a cover plate assembly for use in the sprinkler of FIG. 1F.

Accordingly, the preferred coating combination provides a means to provide corrosion protection to the plate assembly 16 without interference to the link responsiveness, operation or separability of the plate members 74, 76. With regard to the ability of the plate members 74, 76 to separate upon proper thermal response, i.e., melting of the solder in the presence of a sufficient heat source, the coating preferably allows the plate members 74, 76 to separate when subject to a separation force of less than 6 lbs-force and preferably separate at 3 lbs-force. To test the separability of a coated plate assembly, the assembly is placed in the test stand schematically shown in FIG. 11 to simulate operation of the link 16, as described below when installed in the sprinkler 10. More specifically, a plate assembly 16 heated to within 20 degrees Fahrenheit of its operational temperature is placed in a heated bath with the first plate member 76 anchored, preferably at an edge forming the opening 78 by a hook 300a. The second plate member 74 is engaged by a hook or anchor 300b preferably at an edge forming the opening 78. The hook 300b is connected to a pulley system under an adjustable load $W_t$. The bath is incrementally heated, preferably at a rate of one degree Fahrenheit per minute (1° F./min) to its nominal operational temperature of 165° F. With the bath and link 16 at the operational temperature, the load is increased at one-half pound increments up to six pounds. The link assembly 16 successfully satisfies the test upon complete separation of the plate members 74, 76 when subjected to a load of less than six pounds and preferably at three pounds.

With regard to corrosion testing, a preferred coated assembly 16 and sprinkler 10 further satisfied the 10-Day Corrosion Test as provided by UL Standard 199 (2005) which is incorporated by reference in its entirety. Under the specified 10-Day test, the external parts of the sprinkler 10 withstood an exposure to salt spray, hydrogen sulfide and carbon dioxide-sulfur dioxide atmospheres when subjected to (i) a twenty percent salt spray test; (ii) a moist hydrogen sulfide air mixture test; and (iii) a moist carbon dioxide-sulfur dioxide air mixture. During the exposure tests, the passageway of the sprinkler 24 was filled with de-ionized water and the inlet of the sprinkler 10 is sealed by a plastic cap in accordance with the test procedures. After the sprinkler 10 was subjected to the exposure test, is then satisfied test for operation, responsiveness and sensitivity under the UL Standard 199 procedures for the oven heat test, sensitivity oven tests and the room heat test as specifically detailed and required in Section 41 of UL 199 (2005) and the sections referenced therein.

The assembled sprinkler 10 is preferably pressure rated to maintain a static fluid pressure of about 500 pounds per square inch (psi). Referring, for example, to FIG. 1C, in one preferred method of assembling the sprinkler 10, the body 12 is positioned in an upright position to allow gravity to position the closure and deflector assemblies 44, 14 into their initial sealed and first positions. More preferably, a threaded tool is inserted into the passageway 24, and threaded into engagement with the partial bore 58 of the button. A force is applied to the tool toward the proximal portion 20 of the body 12 which further brings the frustroconical tip of the closure button 56 into the passageway 24 and further compresses the biasing element 60 in between the flange 57 of the button 56 and the distal portion 22 of the body 12 forming the outlet 28 such that the biasing element 60 is substantially flat. The flange 57 is preferably dimensioned to be greater than the diameter of the outlet 28 in order to prevent collapse of the spring disc 60 into the passageway 24. With the closure element 44 partially engaged in the passageway 24b and the deflector plate 54 in the retracted first position, the bridge element 64 can be lowered and its preferred central hole can be placed into engagement with the upward projection of the closure element 44, thereby exposing the channel 72 of the bridge element 64. The ends of the lever members 68a, 68b can then be positioned in the channel 72 and further preferably wedged into a pivotable engagement with the annular shelf 70 formed along the inner surface 36 of the annular wall 30 with the walls of the bridge element 64 defining the channel 72 supporting the ends of the lever members 68a, 68b.

The opposite end of the lever members 68a, 68b are then preferably brought into position for engagement with the cover plate assembly 16. The first and second plates are preferably arranged and thermally coupled together, as previously described, to form the preferably substantially circular cover plate assembly 16 with the central opening 78. The lever members 68a, 68b are spaced apart by the retaining member 82. The retaining member 82 is preferably generally triangular in shape with two substantially converging surfaces configured to cradle the lever members 68a, 68b. Each of the converging surfaces preferably include tabs 82a, 82b to further cradle and support the lever members 68a, 68b against the retaining member 82. Extending between the converging surfaces is a planar surface for engagement with the channel 72 of the bridge element 64. With the planar surface of the retaining member 82 disposed between the lever members in the channel 72, the lever members 68a, 68b are brought into engagement with the converging surfaces of the retaining member 82. The cover assembly 16 is disposed over the distal end of the body 12 such that the opening 78 is then brought into close tolerance engagement about the lever members 68a, 68b and the retaining member 82. Preferably, the gap clearance between the lever members, the plug and the edges forming the opening 78 is about 0.005 inches. The threaded tool is preferably disengaged from the partial bore 58 of the button 56 and the spring disc is released to bias the closure element 44 and the bridge element 64 in the distal direction of the sprinkler 10. The bias force of the spring disc 60 compresses the lever assembly 66 into further close engagement with the and the shelf 70 and the opening 78 of the cover plate assembly 16 to provide a close fit and secure arrangement of parts for the trigger assembly 62 and the sprinkler 10.

Figure 3:
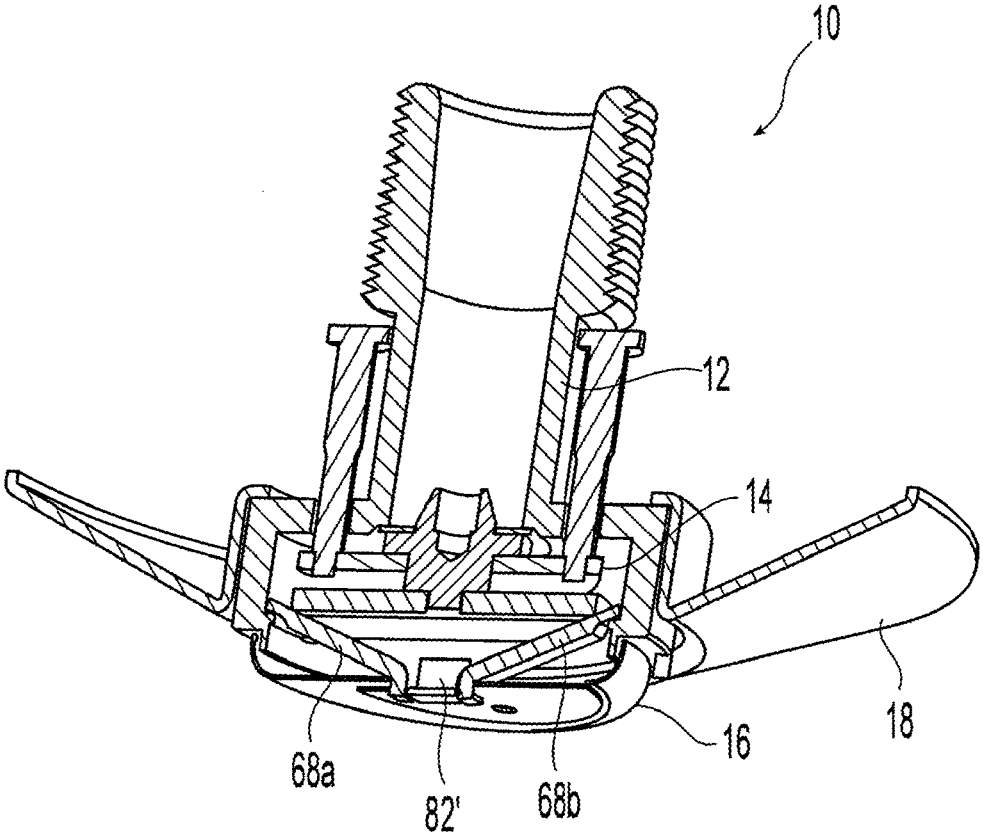
FIG. 3 is a cross-sectional view of the sprinkler of FIG. 1 with an alternate embodiment of a lever assembly.
Figure 3A:
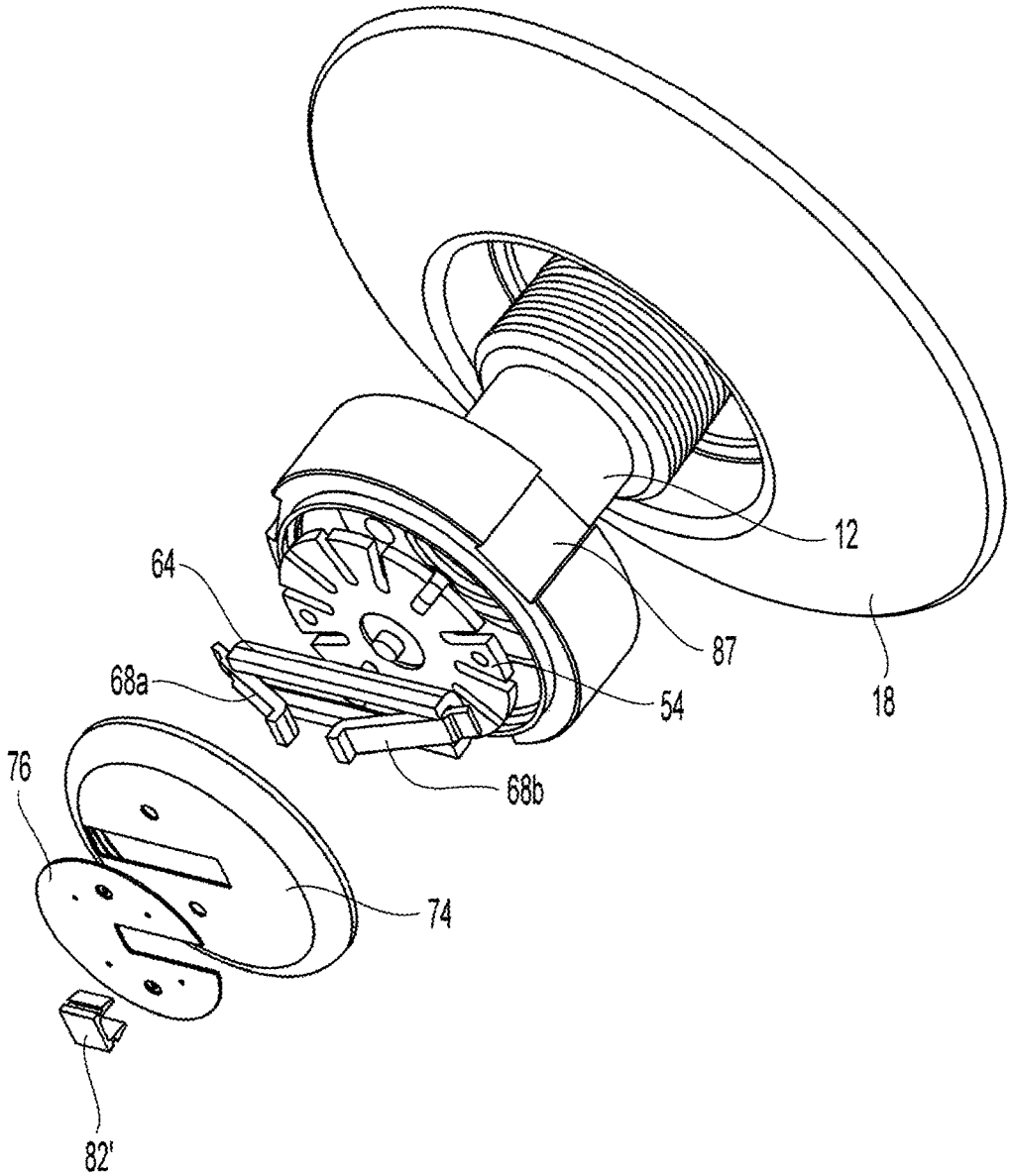
FIG. 3A is an exploded view of the sprinkler of FIG. 3.

In an alternative method, the ends of the lever members 68a, 68b are held close together without the use of a retaining member 82. Instead, the cover plate assembly 16 is disposed over the distal end of the body 12, and the opening 78 is brought into engagement with the lever members 68a, 68b. With the ends of the lever members 68a, 68b disposed in the central opening 78, a central plug 82' is inserted between the lever ends to bring the opening 78 and the ends of the lever members 68a, 68b into the close fit engagement. The plug 82' shown in the alternative embodiment of the sprinkler 10, shown in FIGS. 3-3A is preferably a resilient two prong member for wedged engagement into the opening 78 adjacent the ends of the lever 68a, 68b. The prongs of the plug 82' are preferably configured with one or more surfaces to engage the internal surfaces of the first plate member 74 and prevent removal of the plug 82' from the opening 78.

Figure 4:
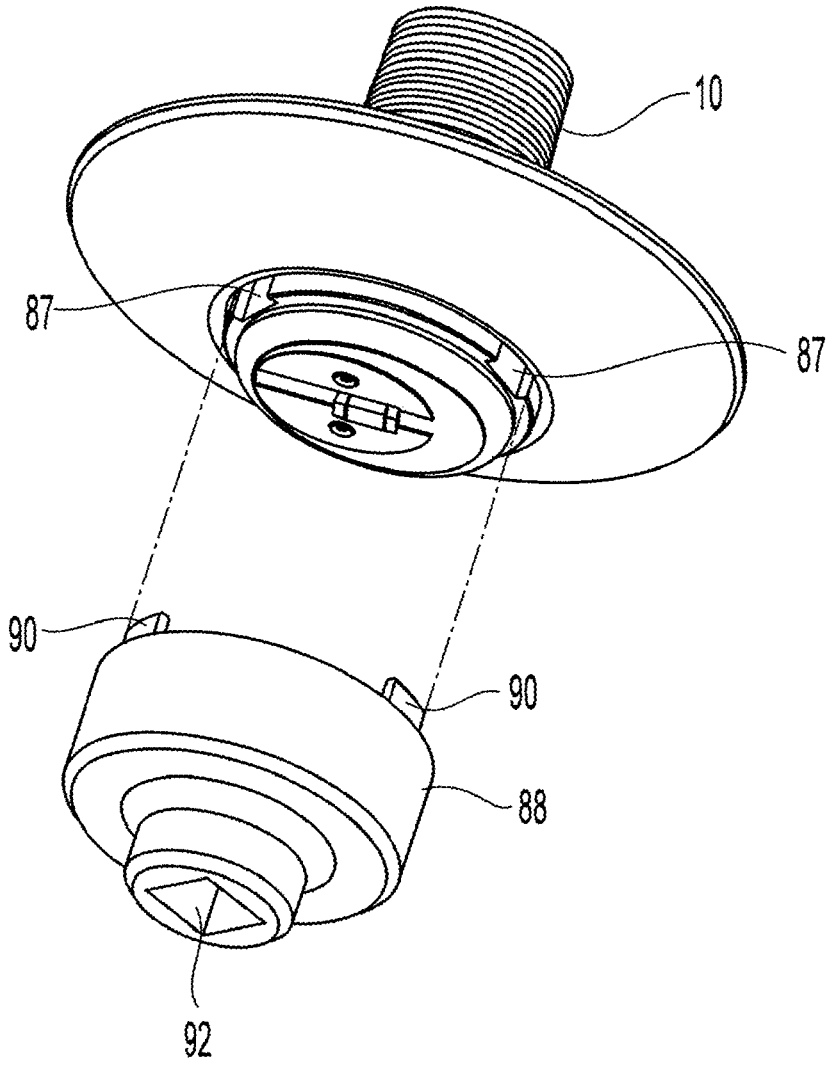
FIG. 4 is an exploded perspective view of a sprinkler and a tool for use with the sprinkler.

As described above, the sprinkler 10 is preferably disposed within a mounting element or escutcheon 18 for flush mount installation against a ceiling surface. To install the sprinkler 10, the sprinkler 10 is preferably threaded into an appropriately sized tee-type or other pipe fitting that is preferably mounted along a branch supply line of a sprinkler system. To facilitate installation of the sprinkler 10, the outer surface of the 34 of the annular wall 30 preferably includes one or more tool engaging surfaces 87, as seen for example in FIG. 4, radially disposed about the outer surface 34. Preferably, the tool engaging surfaces 87 form the maximum gap width between the outer surface 34 of the annular wall 30 and the inner surface of the escutcheon 18. The maximum gap width preferably is about 0.065 inches. A tool 88 having a plurality of planar projections 90 is preferably provided for engagement with the tool engagements surfaces 87. The projections 90 of the tool 88 can engage the surfaces 87 to thread the sprinkler 10 into an installed position or alternatively to unthread the sprinkler for removal. The tool 88 can further include a socket 92 for receiving a tool extension member, such as a socket handle for operating the tool 88 at a distance. For example, the tool 88 can be used with an extension member to install the sprinkler through an opening in a ceiling in which the opening is too small for an operator's hands to maneuver through.

Figure 4A:
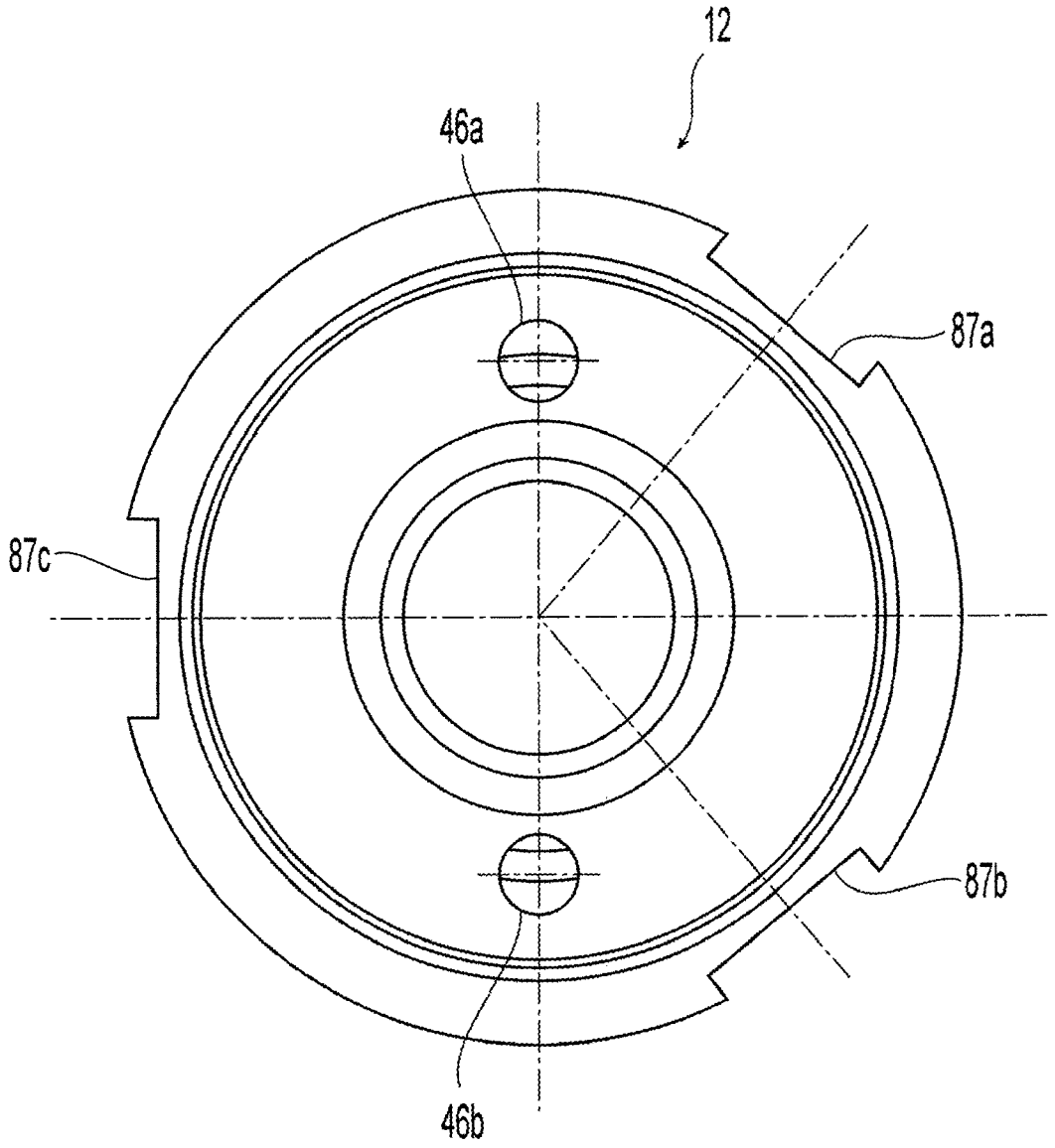
FIG. 4A the end face of a body used in the sprinkler of FIG. 1F.

In a preferred body of the sprinkler 10, shown for example in FIG. 4A, the tool engagement surfaces 87a, 87b, 87c are preferably radially spaced so as to be able to orient the arms 48a, 48b upon installation. Specifically, each the central axes of two engagement surfaces 87a, 87b passing through the center point of the sprinkler discharge end face are located forty degrees (40°) relative to the axis along which the through holes 46a, 46b are spaced such that the central axes are angularly spaced by 100°. The central axis of the third engagement face passes through the center point of the sprinkler end face perpendicular to the axis along which the through holes 46a, 46b are spaced so as to locate the third engagement face 87c at an angle of about 130° relative to each of the first and second engagement surfaces 87a, 87b. Because of the orientation of the engagement surfaces 87a, 87b, 87c are oriented relative to the through holes 46a, 46b, the tool can be used, upon installation of the sprinkler 10 orient or align the deflector assembly arms 48a, 48b relative to, for example, the branch or feed line of the sprinkler 10. Moreover, due to the angular relation of the engagement surfaces and the prongs on the tool, the tool 88 can only engage the end face of the sprinkler 10 in a single manner.

The completely assembled and installed sprinkler 10 is preferably configured to maintain a static pressure of fluid of about 500 pounds per square inch (psi). More specifically, the arrangement of the lever assembly 66 is configured to maintain the deflector assembly 14 in the first position and the closure element 44 in the sealed position within the outlet 28 under a static fluid pressure load of up to 500 pounds per square inch (psi). Therefore, provided the lever members 68a, 68b are restrained from pivoting about their engagement points with the inner surface 36 of the annular wall 30, the arrangement of the lever members 68a, 68b provides a frame structure sufficient to independently maintain the initial and sealed positions of the deflector assembly 14 and the closure assembly 44. Shown in FIG. 1C, is a cross-sectional view of the lever and cover plate assemblies 66, 16 overlaid by a static force diagram showing the manner in which the forces about the lever assembly 16 support the closure assembly 44 in the sealed position. More specifically shown is a fluid force $F_{fluid}$ and spring force $F_{spring}$ respectively applied in a distal direction by a fluid (gas or liquid) and a preferred Belleville spring disc 60. The fluid force $F_{fluid}$ and a spring force $F_{spring}$ can be distributed about the bridge element 64 and the further characterized by distributed resolved forces $F_{res}$ applied at each end of the bridge element 64 acting in a distal direction, as shown for example, upon the lever member 68b. Preferably the resolved force $F_{res}$ is preferably determined by:

$$F_{res}=[(F_{fluid}+F_{spring})/2]*\sin\beta$$

where $F_{fluid}$ is equal to the pressure of fluid multiplied by the area at the inlet 26, i.e. $F_{fluid}$=Pressure*[(Π/4)*Dia.$^2$], and β is the angle formed between the longitudinal axis A-A and the lever member 68b.

In addition to the resultant force $F_{res}$, a normal force $F_{normal}$ acts on the lever member 68b, for example, by the friction engagement of the lever member 68b with the shelf 70 at the point P. These forces tend to bias and pivot the lever member about the point of engagement P, which results into a bias force transferred by the lever members 68a, 68b against the plate members 74, 76 of the cover plate assembly 16 at the edges forming the plate assembly opening 78. In order for the lever member 68b to support the bridge element 64 and hold the closure element 44 in its sealing position, the lever member 68b must be a static member. Accordingly, in response to the outward biasing force, the plate assembly 16 exerts an equal and opposite reaction force $F_{plate}$ applied to the end of the lever member 68b. More specifically, the lever member 68b is static in its sealing configuration, and thus, the moments M about the point P at which the lever member 68b engages the shelf 70 must sum to zero. Looking at the location of the forces acting on the lever member 68b while in its static position engaged with the shelf 70 and the plate assembly 16, a moment equation can be derived and the plate assembly reaction force $F_{plate}$ can be solved for as follows. From static mechanics, $M_P$=F*d where M is moment about a point P, F is an applied force, and d is the orthogonal distance between the direction of the force F to the point P. For the lever member 68b in FIG. 1C, the moment equation can be written as:

$$\Sigma M_P=F_{Normal}*d1+F_{Res}*d2+F_{Plate}*d3 \text{ where}$$

d1, d2, d3 are respectively the orthogonal distances from the direction of the respective forces $F_{Normal}$, $F_{res}$, and $F_{Plate}$ to to the engagement point P preferably at the shelf 70, where further d1=0 d2=x d3=y

In the static situation where the lever members 68a, 68b are supporting the bridge and closure elements 64, 44 the total moment $\Sigma M_P$ for each lever member about the engagement point P equals zero and the reaction force required of the plate assembly can be determined as follows;

$$\Sigma M_P=0=F_{Normal}*0+F_{Res}*x+F_{Plate}*y$$

$$0=F_{Res}*x+F_{Plate}*y$$

applying a sign convention in which a force acting clockwise about a point P is negative and then solving for $F_{Plate}$ $$0=F_{Res}*x+(-F_{Plate})*y$$

$$F_{Plate}*y=F_{Res}*x$$

$$F_{Plate}=F_{Res}*x/y$$

Preferably for the sprinkler 10, the bridge element 64, lever assembly 66 and plate assembly 16 are configured and assembled to locate and direct the forces $F_{Normal}$, $F_{res}$, and $F_{Plate}$ such that the $F_{res}$ is applied in a direction orthogonally spaced at a distance x from the point P of about 0.05 inches, preferably 0.044 inches, and that the plate assembly or link force $F_{Plate}$ is applied in a direction orthogonally spaced at a distance y from the point P of about 0.4 inches and more preferably about 0.412 inches. Thus, where for example, the sprinkler 10 is uninstalled, no fluid force, i.e., $F_{fluid}$=0 and the only force transmitted to the link assembly 66 is the biasing spring force $F_{spring}$ of about eighty pound force (80 lbs.) from the spring disc and the angle β is about 68°, the resolved force at one lever member $F_{res}$ is thus [(80 lbs)/2]* sin(68) or about 37 lbs. and the plate assembly reaction force $F_{Plate}$ is $$F_{Plate}=37 \text{ lbs.}*0.044 \text{ in.}/0.412 \text{ in.}$$

$$F_{Plate}\approx 4 \text{ lbs.}$$

Where the sprinkler 10 is installed having an inlet diameter Dia of about 0.441 inches and under a fluid (liquid or gas) working pressure of up to about 175 psi., adding the 4 lbs. of reaction for force due to the spring with the reaction force due to the working fluid pressure, the plate assembly reaction force $F_{Plate}$ is $$F_{Plate}=[F_{fluid}*\sin 68]*0.044 \text{ in.}/0.412 \text{ in}+4 \text{ lbs.}$$

$$F_{Plate}=[175 \text{ psi.}*(\Pi/4)*(0.441 \text{ in.})^2)/2*\sin 68]*0.044 \text{ in.}/0.412 \text{ in.}+4 \text{ lbs.}$$

$$F_{Plate}\approx 1.3 \text{ lbs.}+4 \text{ lbs.}$$

$$F_{Plate}\approx 5.3 \text{ lbs.}$$

Thus for two levers, the total plate assembly reaction force $F_{PlateTotal}$=2*5.3≈10.6 lbs. in response to a total force $F_{Total}$ applied to the sprinkler, $F_{fluid}$ and $F_{spring}$ respectively being about 80 lbs. and 26 lbs. or a total of about 106 lbs.

Thus, the sprinkler 10 and its cover plate assembly 16 is preferably configured to define a load to reaction force $F_{PlateTotal}$ ratio ($F_{Total}$:$F_{Plate\ Total}$), where $F_{Total}$=$F_{Fluid}$+$F_{Spring}$, ranging from about 5:1 to about 20:1, preferably from about 8:1 to about 12:1 and more preferably about 10:1. Accordingly, because the lever and cover plate assemblies 66, 16 are configured to effectively support the closure element 44 in its sealing position a separate screw member is not needed to engage the closure element 44 to seal the passageway, and thus the cover plate assembly 16 can present a substantially contiguous sealing face to prevent access to the chamber 38 of the sprinkler body 12. Moreover, because the closure element 44 is preferably sealed by the frame formed by the lever assembly 66 in conjunction with the cover plate assembly 16, attempts to dislodge either the cover plate assembly 16 or the lever assembly 66 while the sprinkler 10 is installed would likely actuate the sprinkler.

In another alternate embodiment of the sprinkler 10, a load screw is applied to closure element at the time of sprinkler assembly, however no access is provided to the load screw via the cover plate assembly 16 or by its engagement with the body 12. More specifically shown in FIG. 1D, a load screw 59 is disposed within the bore 58 of button 56. The bore 58 preferably defines a threaded through bore through which the load screw 59 can extend. The load screw 59 further preferably engages the planar surface of the bridge element 64 and more preferably extends through the bridge element to a point spaced from the planar surface of the retaining member 82. Further threaded engagement of the screw 59 against the bridge element 64 preferably threads the button 56 into further sealed engagement with the outlet 28. Use of the load screw 59 provides means for loading the sprinkler 10 and more specifically the trigger assembly in a controlled and more preferably an adjustable manner.

Accordingly, it should be understood that the cover plate assembly 16 can be disposed about the distal edge 40 of the sprinkler body 12 to effectively conceal and prevent access to the interior of the chamber 38 and at the same time engage the body 12 or an internal component of the sprinkler 10 to form a desired trigger assembly 62. Although, the lever assembly 66 is a preferred embodiment for coupling the trigger assembly to the closure element 44, other assembly configurations are possible provide the concealing and triggering functions are fulfilled.

Referring again to FIG. 1, with the sprinkler body 12 installed and the proximal side of the escutcheon 18 mounted flush against a ceiling or wall, the sprinkler assembly 10 presents a concealed institutional type sprinkler having minimally sized gaps, opening, voids or access points into which few foreign objects may be inserted without operating the sprinkler. In particular, traversing the profile of the sprinkler 10 from one point along the outer perimeter of the escutcheon 18 across the cover plate assembly 16 to a diametrically opposed point along the perimeter of the escutcheon, the profile presents a substantially contiguous surface and no radial access point to the chamber 38 and the internal components of the sprinkler 10. Moreover, the openings 46a, 46b formed about the proximal edge 32 and the distal opening 42 formed by the distal edge 40 of the annular wall 30 cannot be easily accessed to gain entry to the chamber 38. The lower radial portion forming the through hole of the escutcheon 18 preferably engages the proximal edge 32 to seal off access to the openings 46a, 46b and any other opening disposed along the proximal edge 32. At the distal opening 42, the lip portion 80 of the cover plate assembly preferably substantially and more preferably completely surrounds or circumscribes the distal edge 40 thereby eliminating radial access to the distal opening 42. To further seal the sprinkler 10 a tubular member 17 may be threaded about the body 12 proximal the escutcheon 18, as seen for example in FIG. 1E. Accordingly, the engagement of the lever assembly 66 and the cover plate assembly 16 together present a substantially contiguous surface area to conceal the interior of the chamber 38. Voids or open areas between the components such as the plate members 74, 76 and the lever members 68 are minimized preferably such that the ratio of open area to concealing surface area at the distal end face of the sprinkler 10 is preferably ranges from about 0.001:1 to about 0.010:1 and is more preferably about 0.005:1. For example, where the cover plate assembly 16 presents a total surface area of about 1.15 in.$^2$ and the opening 78 with the lever members disposed therein define an open space area of about 0.006 in.$^2$, the ratio of open area to concealed surface area is about 0.005:1.

In service, a fluid (liquid or gas) pressure ranging from about 7 psi. to about 175 psi. is applied at the closure element 44 of the sprinkler 10. Higher pressures could be applied provided the cover plate assembly 16 and lever assembly 66 were appropriately sized and configured. The installed sprinkler 10 preferably operates by thermally activation of the trigger assembly 62. Operation of the trigger assembly 62 permits displacement of the deflector assembly 14 and the closure assembly 44 thereby allowing fluid, and preferably liquid, supplied to the inlet of the body 12 to be discharged from the outlet 28 of the passageway 24 and distributed upon impact with the deflector plate 54. More specifically, in the presence of a sufficient level of heat, the thermally sensitive material coupling the first and second plates 74, 76 of the cover plate assembly melts. Unable to resists the biasing force exerted by the pivot of the lever members 68a, 68b, the second plate member 76 separates from the first plate member 74. With the second plate member 76 displaced or removed, the cover plate assembly opening 78 is enlarged to the exposed first plate opening 78a. As a result, the first plate member 74 is freed from the snap fit engagement with the lever assembly 62, and therefore first plate member 74 is separable from the distal portion 22 of the body 12. Without the restraint of engagement with the first and second plate members 74, 76, the lever members 68a, 68b are free to continue to pivot about their engagement point with the shelf 70 formed along the inner surface 36 of the annular wall 30. The pivot of the lever members 68a, 68b further preferably frees the lever members from engagement with the bridge element 64, and the lever members can be separated from the sprinkler assembly. Without the rigid support of the lever members 68a, 68b and the bridge element 64, the deflector plate assembly 14 and the closure element 44 are axially translated to the second position under the load of the fluid pressure, and fluid is permitted to flow through the passageway 24 for discharge out the outlet 28. Due to the arrangement of the lever assembly 66 with the cover plate assembly 16, attempts to tamper with the sprinkler 10 while under static load, so as to improperly remove the cover plate assembly 16 or expose the internal components of the chamber, can result in displacement of the lever members 68a, 68b causing the sprinkler 10 to operate.

Figure 1F:
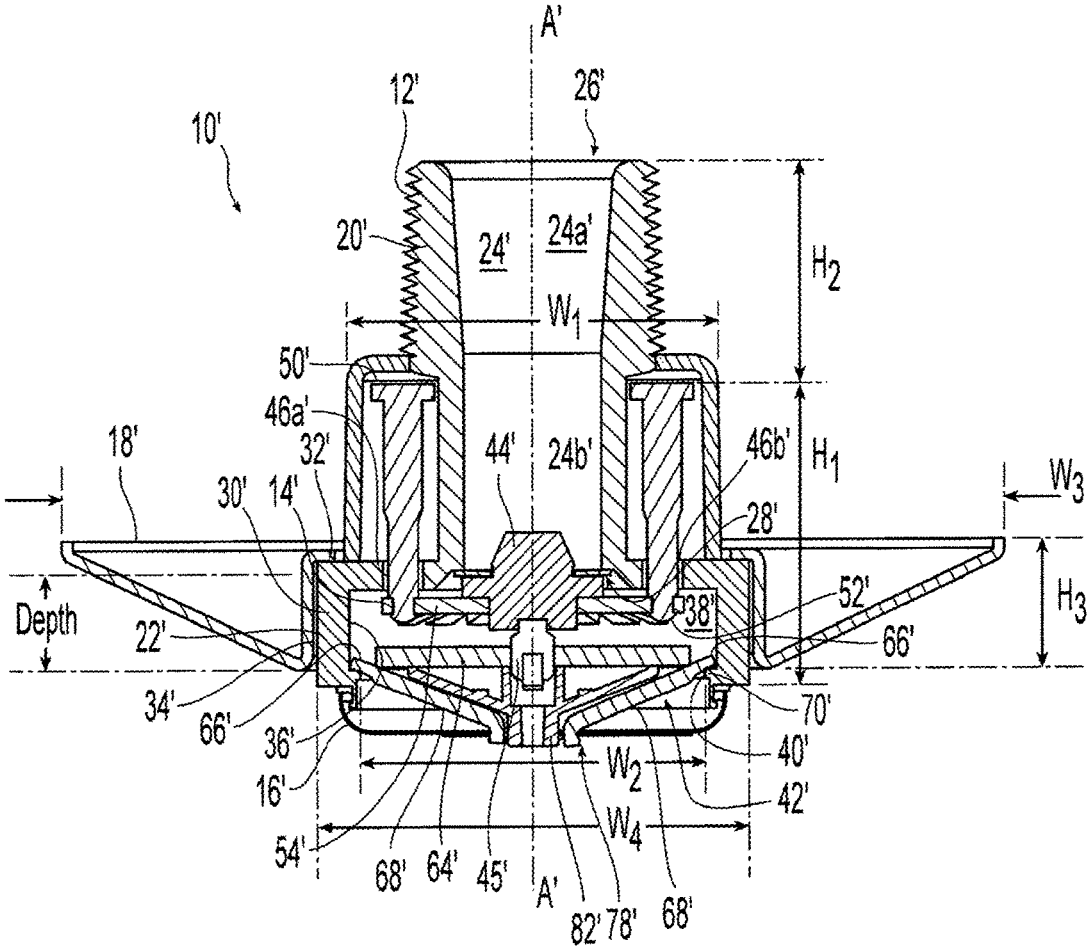
FIG. 1F is another embodiment of the sprinkler of FIG. 1

The trigger assembly 62 and the cover plate assembly 16 can be further altered to provided different embodiments of the sprinkler 10. Described below are varying configurations of the cover plate assembly opening 78 and arrangements of the bridge element 64 and lever assembly 66. Accordingly, where possible or not otherwise expressly excluded, the variations to the sprinkler body 12, deflector assembly 14, the escutcheon 18, lever assembly 66, closure assembly 44, cover plate assembly 16, other components and subcomponents, the various special relations, manner of assembly, and the manner of operation described are applicable to each of the various embodiments described throughout. Common terms are used throughout where applicable. Shown for example in FIG. 1F, is a preferred sprinkler 10' having a body 12', a deflector assembly 14' and a cover plate assembly 16'. The sprinkler 10' is further preferably disposed within a mounting element such as, for example, an escutcheon 18' preferably defining a maximum diameter $W_3$ of about three inches and a height $H_3$ of about 0.4 inches. Similar to the previously described embodiment of the preferred sprinkler, the body 12' includes a proximal portion 20' and a distal portion 22'. The body 12' further defines a passageway 24' extending along a longitudinal axis A'-A' between an inlet 26' and an outlet 28'. The inlet 26' is preferably in communication with tapering portion 24a' of the passageway 24'. The tapering passageway 24a' is further preferably in communication with a portion 24b' having a constant diameter and terminating at the outlet 28'. The passageway 24', inlet 26' and outlet 28' further preferably define a sprinkler constant or K-factor ranging from about 3 gpm/(psi)$^{1/2}$ to about 5.8 gpm/(psi)$^{1/2}$ and is preferably about 5.6 gpm/(psi)$^{1/2}$.

The distal portion 22' preferably includes an annular wall 30' having a proximal edge 32' contiguous and more preferably integral with the proximal portion 20'. The annular wall 30' includes an outer surface 34' and an inner surface 36' to further define a chamber 38' distal of the outlet 28'. The outer surface 34' preferably defines a maximum diameter of about $W_4$ of about 1.375 to provide a close fit within the escutcheon 18'. The body 12' is preferably constructed such that the chamber 38' is in communication with the passageway 24'. The annular wall 30' further includes a proximal edge 32' and a distal edge 40' defining a distal opening 42' in communication with the chamber 38'. The annular wall 30' preferably defines a first wall thickness, and the distal edge of the annular wall 40' defines a second wall thickness that is preferably less than the first wall thickness. Moreover, the annular wall 30' further preferably defines a first diameter $W_1$ of the chamber 38' of ranging from about 1.160 inches to about 1.175 inches and more preferably from about 1.162 to about 1.172 inches. The inner surface 36' proximate the distal edge 40' includes a shelf 70' for engagement with the one end of each of the lever members 68'. The shelf 70' defines an internal diameter $W_2$ of the chamber 38' ranging from about 1.09 inches to about 1.15 and more preferably ranges from about 1.098 to about 1.102 inches. The chamber 38' further preferably defines a chamber height $D_{epth}$ proximal of the shelf 70' to the outlet 28' ranging from about 0.305 inches to about 0.315 and more preferably from about 0.308 inches to about 0.312 inches.

The chamber 38' is preferably configured for housing internal components of the sprinkler 10' such as, for example, the deflector assembly 14' and the closure element or assembly 44'. The deflector assembly 14' is coupled to the body 12' and is more preferably suspended in a telescoping manner from the proximal edge 32'. More specifically, the proximal edge 32' preferably includes a pair of through holes 46a', 46b' in communication with the chamber 38'. Each of the through holes 46a', 46b' have a diameter ranging in size from about 0.125 in. to about 0.150 in. and more preferably ranging from about 0.1285 in. to about 0.1325 in. The deflector assembly 14' preferably includes a pair of arms 48a', 48b' engaged in the through holes 46a', 46b'. Shown in FIG. 1P, is a preferred arm 48', having an enlarged proximal end 50' and an overall axial length of about 0.75 inches, and more preferably about 0.775 inches, for engaging the proximal edge 32' of the annular wall 30' so as to limit the distal and axial travel of the arms 48a', 48b' in the through holes 46a', 46b'. In addition, the arm 48' is configured to limit radial movement within the through hole 46a', 46b' at proximal end 50'; accordingly, the diameter of the arm 48' varies along its length. Preferably, the arm 48' has a diameter of about 0.067 inches at its distal end 52', a diameter of 0.095 inches at an intermediate portion 53', and a diameter of about 0.123 inches at a proximal portion 55' between the intermediate portion 53' and the enlarged portion 50'.

Coupled to the distal end 52' of each arm 48a', 48b' of the deflector assembly 14' is a deflector plate 54'. The arms 48a', 48b' preferably locates the deflector plate 54' at a first position within the chamber 38' distally adjacent the outlet 28'. The deflector plate 54' further preferably includes a central hole, and engaged therein is the closure element or assembly 44'. With the deflector plate 54' located at its first position, the closure element 44' is preferably located in the outlet of the passageway 28' to prevent the flow of a fluid (liquid or gas) from the outlet of the passageway 24b'. The closure element 44' preferably includes a closure button 56', shown in greater detail in FIGS. 1G-1I, having a preferably frustroconical tip with a partial bore 58'. Disposed about the frustroconical tip and engaged with a flange of the closure button 56' is a biasing element 60', preferably a Belleville spring disc having a spring force ranging from about 50 lbs. (222 Newtons) to about 120 lbs. (534 Newtons). The preferred button 56' preferably includes a flange diameter $W_4$ of about 0.45 inches and height $H_{Button}$ of about 0.305 inches. The truncated conical portion of the button 56' is defined by a neck portion diameter $W_2$ of about 0.25 inches, a base portion diameter $W_1$ of about 0.26 inches and a narrower top portion diameter $W_3$ of about 0.17 inches. With the closure element 144 in its sealing position, the frustroconical tip is preferably disposed within the passageway 124 and the biasing element 160 engages a preferably counter sunk surface forming the outlet 128 to the distal portion 124b of the passageway 124.

Figure 1G:
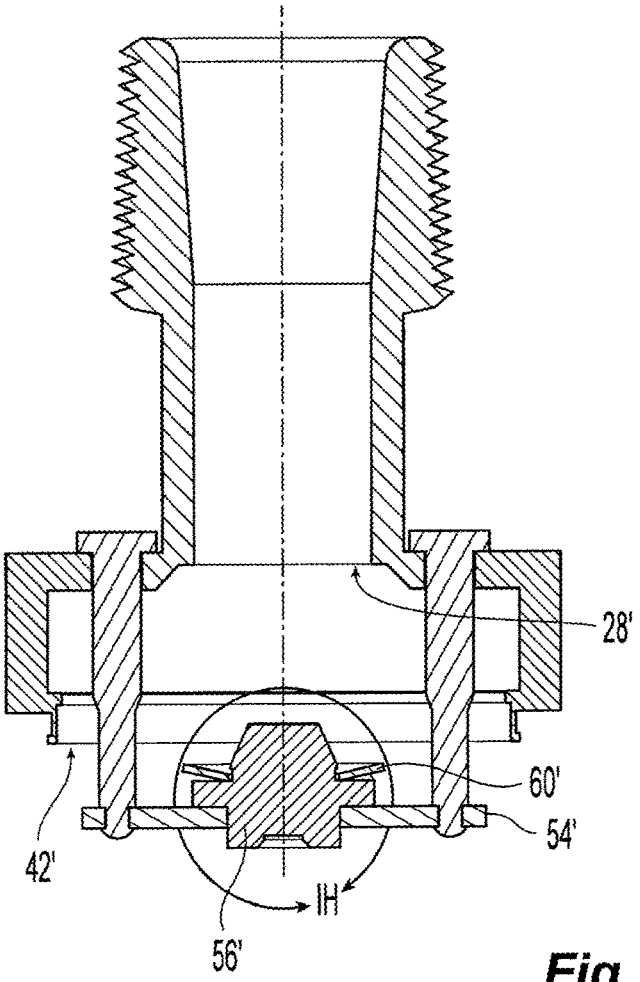
FIG. 1G is the sprinkler of FIG. 1F with its deflector assembly in a second position.
Figure 1H:
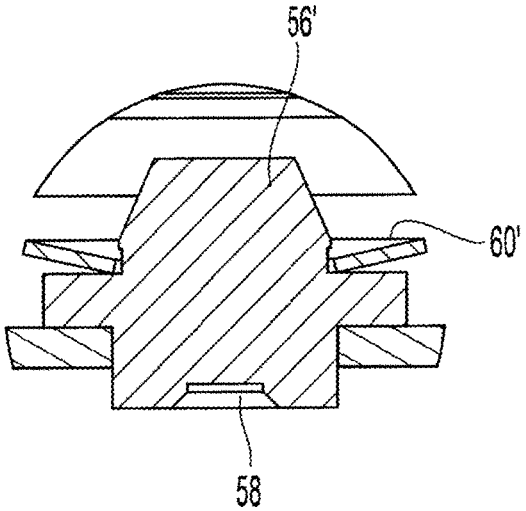
FIG. 1H is a detailed cross-sectional view of the closure assembly shown in FIG. 1G.
Figure 1I:
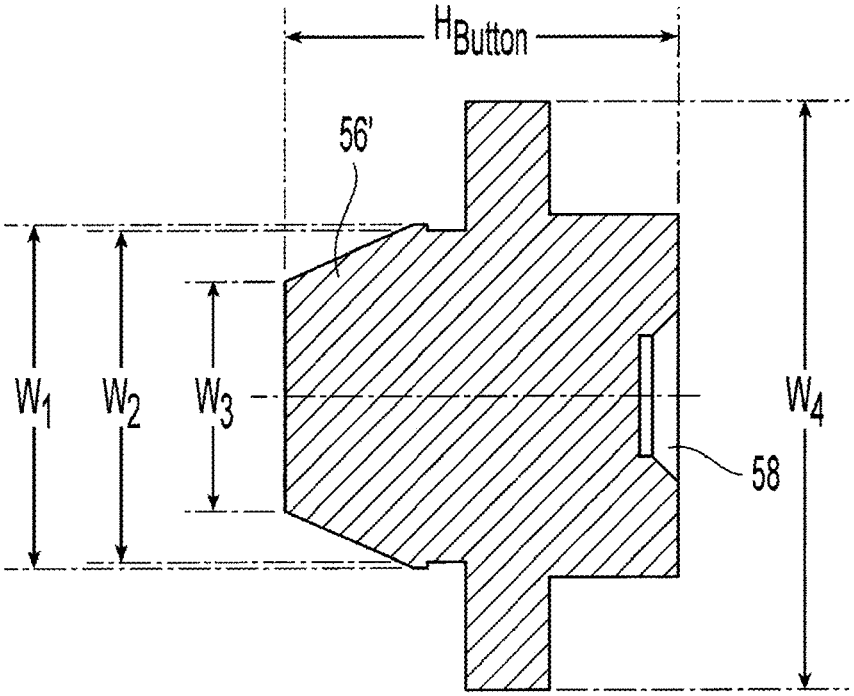
FIG. 1I is a detailed cross-sectional view of the closure button in the closure assembly of FIG. 1G.
Figure 1K:
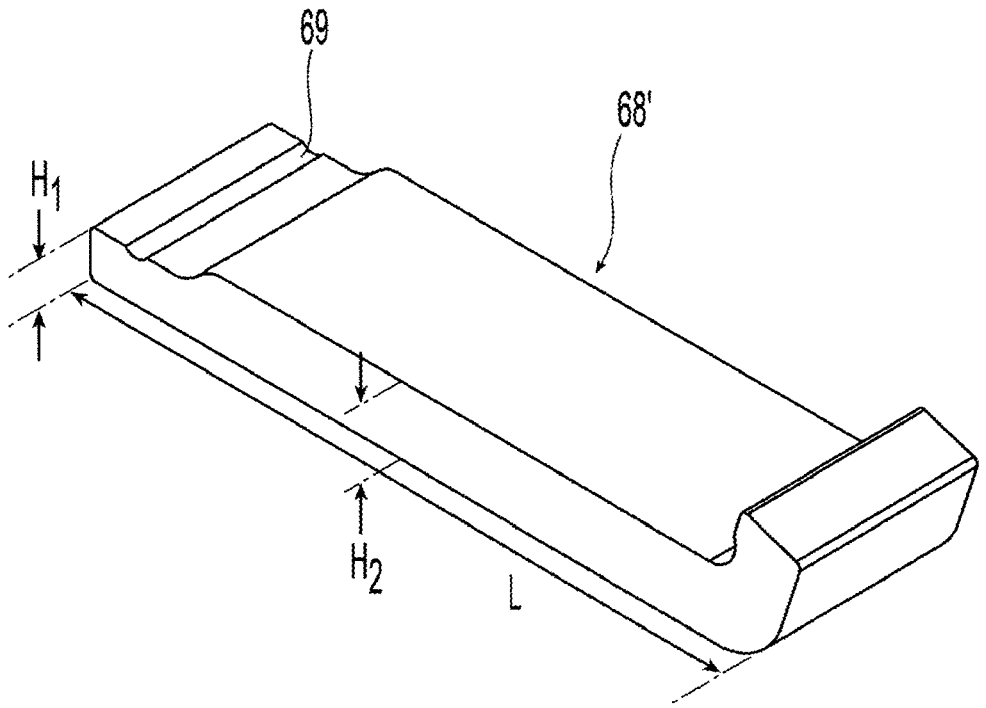
FIG. 1K is an isometric view of a lever member used in the sprinkler of FIG. 1F.

The axial travel of the arms 48a', 48b' locates the deflector plate 54', as shown more specifically in FIG. 1G, to at least a second position distal of its first position and preferably distal of the distal opening 42'. With the deflector plate 54' in its second position spaced from the first position, the closure element 44' is preferably spaced from the outlet 28' so as to permit any fluid (liquid or gas) supplied to the body 12' of the sprinkler 10' to discharge from the outlet 28'. Liquid discharge from the outlet 28' can impact the axially displaced deflector plate 54' and therefore be distributed about an area beneath the sprinkler. To facilitate a distribution of fire fighting fluid in an area being protected by the sprinkler 10', the deflector plate can include a pattern of closed or open ended slits, slots, through holes, openings, cut-outs or any combination thereof to satisfy any one of a vertical or horizontal fluid distribution test. Preferably the sprinkler body 12' and deflector assembly 14' can be configured for standard coverage or extended coverage.

Figure 1L:
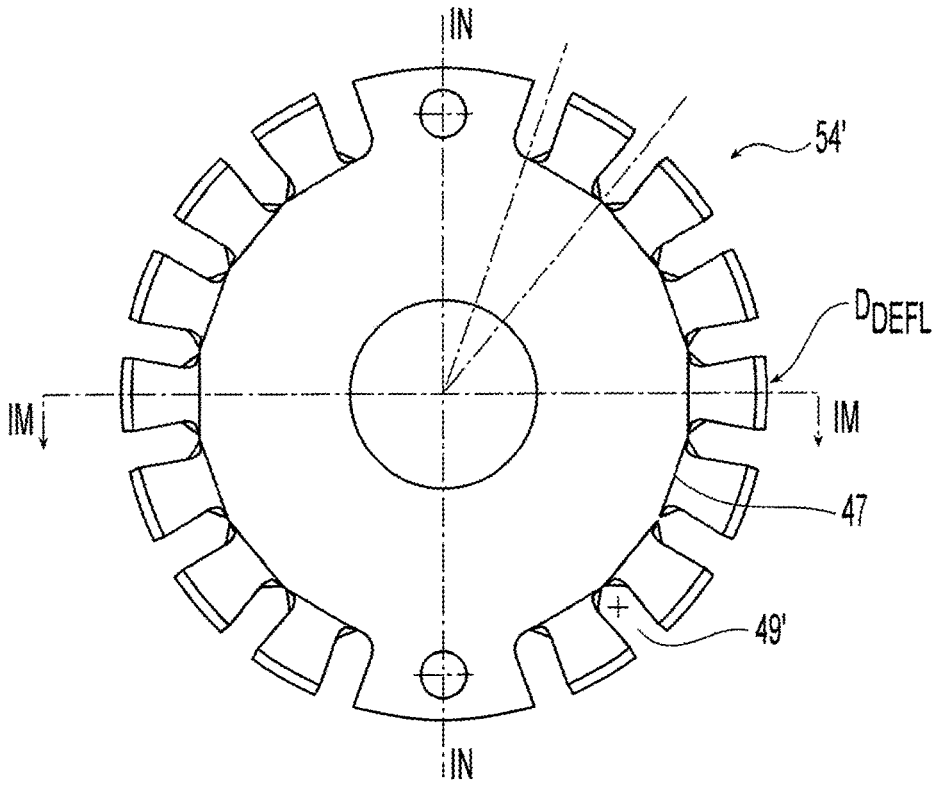
FIG. 1L is a plan view of a deflector used in the sprinkler of FIG. 1F.
Figure 1M:
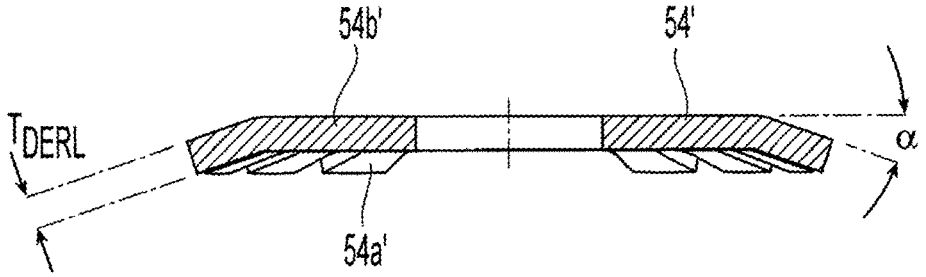
FIG. 1M is a cross-sectional view of the deflector of FIG. 1L.
Figure 1N:
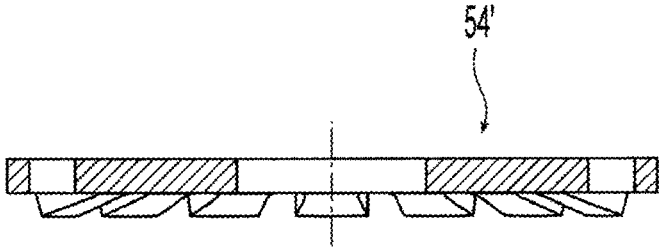
FIG. 1N is another cross-sectional view of the deflector of FIG. 1L.

Shown in FIG. 1L-1N is a preferred deflector plate 54' shaped for standard coverage when installed in the sprinkler 10'. The deflector 54' preferably defines a diameter $D_{DEFL}$ of about 1 inch and more preferably 0.96 inches $T_{DEFL}$ and a thickness of about 0.5 inches. The deflector includes a pattern of preferably open ended slots radially distributed about the peripheral edge of the deflector 54'. The deflector further includes a central hole 51' for receipt of the closing element 44' or closing butting 56'. Preferably, eight slots are equi-radially disposed to each side of an axis IN-IN running perpendicular to the axis IM-IM, and the sixteen slots are preferably geometrically identical. A preferred slot has a width of about 0.060 inches and extends to a slot depth to a slot terminal end located such that the center point of the preferred semi-circular slot terminal end is at a distance of about 0.4 inches from the center of the deflector 54'. The deflector 54' further includes a pair of diametrically opposed through holes aligned along the axis IN-IN for engagement with the distal ends 52' of the arms 48a', 48b'. The centers of the through holes are preferably located so as to define a spacing therebetween of about 0.826 inches about the center point of the deflector 54'. The peripheral portion of the deflector 54' is bent to define a bend line 47 about the center point of the deflector 54'. The bend line 47 is substantially coincident with the terminal end of the slots. More preferably, the bend line 47 substantially defines a diameter of about 0.730 about the center of the deflector 54'. The bend in the deflector 54' defines a substantially concave surface 54a' and an opposite substantially convex surface 54b' as more specifically shown in FIG. 1M. The deflector 54' is preferably installed such that the convex surface 54b' faces the outlet 28'. The bend line is configured such that the tines extending between the slots preferably define an angle $\alpha$ of about nineteen degrees with the plane defined by the axes IM-IM and IN-IN.

Figure 1O:
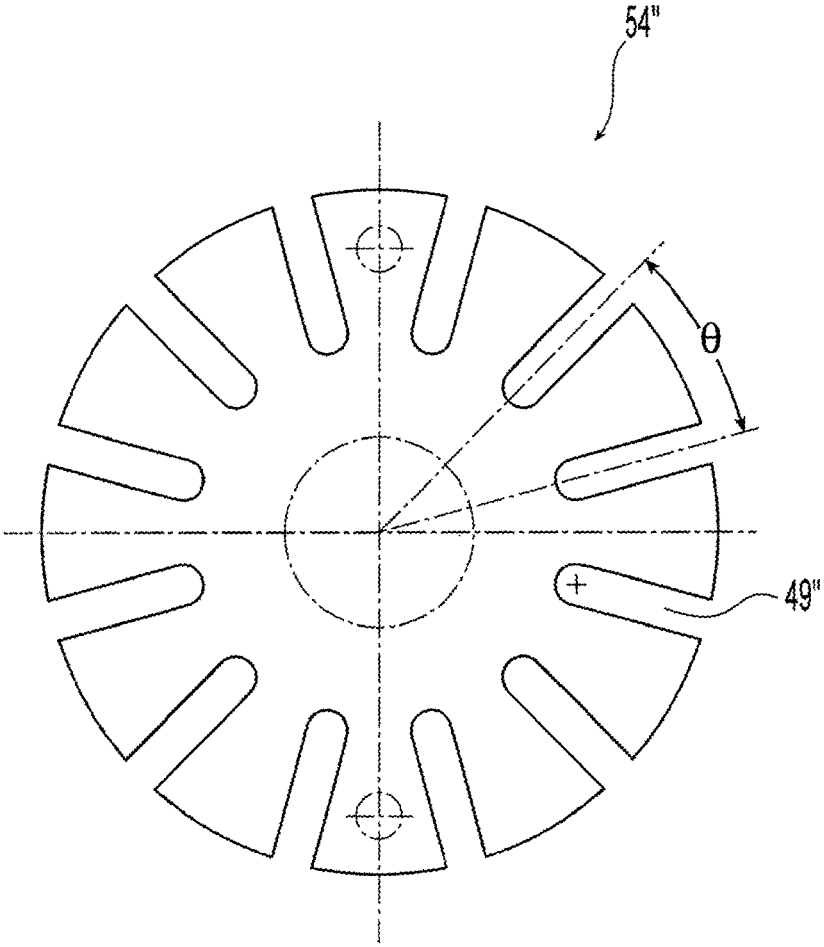
FIG. 1O is a plan view of another deflector used in the sprinkler of FIG. 1F.
Figure 1P:
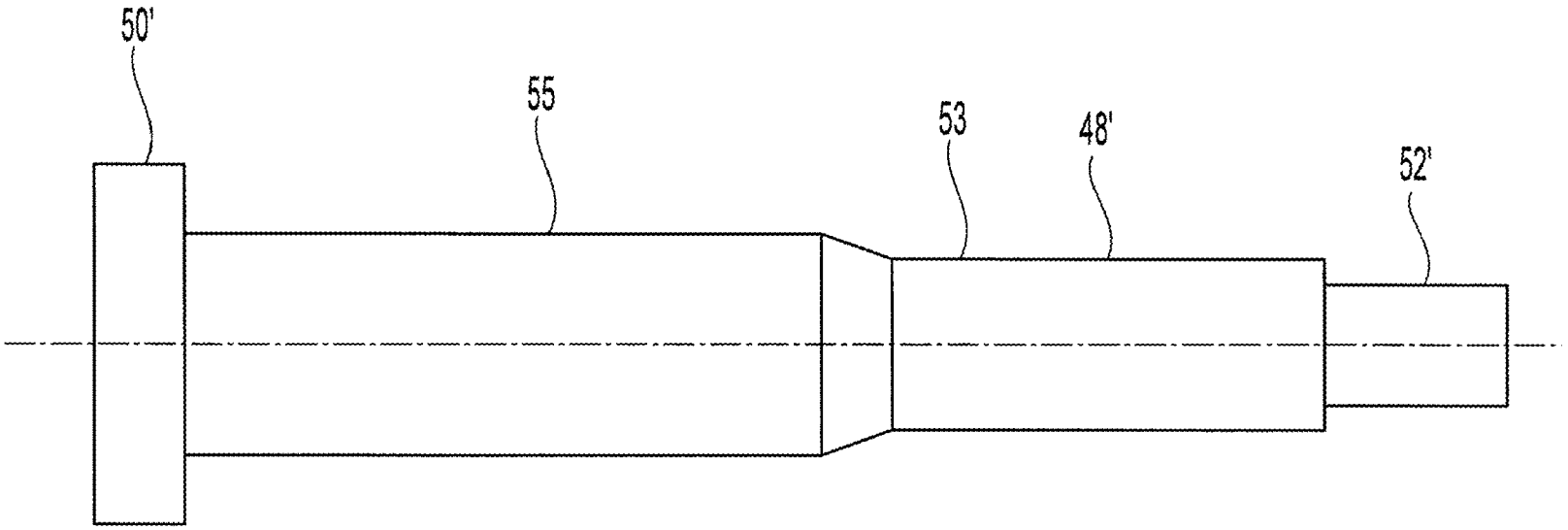
FIG. 1P is a preferred arm member for use in the sprinkler of FIG. 1F.

In an alternate embodiment, shown for example in FIG. 1O, the deflector 54' can be configured for extended coverage. More preferably, the deflector 54' is preferably a substantially flat or planar member defining a diameter of about 1.0 inch. The deflector 54" includes a pattern of preferably open ended slots radially distributed about the peripheral edge of the deflector 54". More specifically, twelve open ended slots are equi-radially distributed about a central hole, which is configured for receipt of the closing element 44' or closing button 56'. Preferably, the slots are preferably geometrically identical, each having a width ranging of about 0.060 inches and extending to a slot depth such that the center point of the preferably semi-circular slot terminal end is at a distance of about 0.3 inches from the center of the deflector. The slots are preferably angularly spaced by an angle of about 30°. The deflector 54" further includes a pair of diametrically opposed through holes for engagement with the distal ends of the arms 48a', 48b'. The centers of the through holes are preferably located so as to define a spacing of about 0.826 inches about the center point of the deflector 54".

Referring again to FIG. 1F, the sprinkler 10' is preferably a thermally actuated sprinkler so as to permit the passage of fluid from the outlet 28' in the presence of a sufficient amount of heat. Accordingly, the sprinkler 10' includes a trigger assembly 62'. The trigger assembly 62' preferably includes a bridge element 64' and a lever assembly 66'. The bridge element 64' preferably includes a surface for supporting the deflector assembly 14' in its first position and the closure element 44' in its sealed position engaged with the outlet 28'. More preferably, the bridge element 64' is coupled to the closure element 44' preferably by a set screw 45' threaded in a planar portion of the bridge 64' and threaded into the partial bore of the closure button 56'.

To locate the deflector assembly 14' in the first position and the closure element in the sealed position, the bridge element 64' is appropriately axially located within the chamber 38'. To appropriately locate the bridge element 64', the bridge element 64' is preferably supported by the lever assembly 66', which is further preferably in pivoted engagement with the shelf 70'. The lever assembly 66' includes a pair of single lever members 68a', 68b'. A preferred lever member 68', shown for example in FIG. 1K, has a length L of about 0.5 inches and more preferably 0.492 inches. The lever 68' includes one end portion for engaging the shelf 70' and another end portion for engaging the cover plate assembly 16'. The end portion of the lever member 68' for frictional engagement with the shelf 70' preferably has a thickness $H_1$ ranging from about 0.03 inches to about 0.04, preferably from about 0.034 to about 0.036, and further preferably includes a flat having a radius portion 69 for direct engagement with the shelf 70'. The engagement of the radiused portion 69 portion with the shelf 70' further stabilizes the lever member 68 during assembly, so as to minimize scratches to the cover plate assembly around the opening 78'. The remainder of the lever member 68 preferably has a thickness ranging from about 0.045 inches to about 0.055 inches, and preferably from about 0.051 inches to about 0.055 inches with the end portion that extends through the opening 78' having a thickness preferably of about 0.047 inches.

The engagement of the lever members 68a', 68b' with the cover plate assembly 16' forms an angled frame member for directly and indirectly supporting the bridge element 64', closure element 44' and deflector assembly 14'. The bridge element 64' defines a channel 72' to receive the end portion of the lever member 68' so as to be straddled about the end of the lever member 68'. Upon actuation of the sprinkler 10', the lever members 68a', 68b' pivots about the point of engagement with the shelf 70', and thereby axially displacing the bridge element 64' so as to permit the axial translation of the deflector assembly 14' and the closure element 44'.

The relative angular relation of the lever member 68' relative to the cover plate assembly 16' is preferably defined by the lever members' engagement with the cover plate assembly 16'. Disposed between the lever members 68a', 68b' is a retaining member or plug 82' having a recess for holding or housing the set screw 45' which is engaged with the bore 58' of the button 56'. During assembly and with the internal components in place, the set screw 45' is accessed from the distal end of the sprinkler for loading and setting of the closure assembly 44' in the sealed position. The set screw 45' is accessed via the opening 78' in the plate assembly 16'. The opening 78' is in communication with the passageway of the plug 82' which leads to the set screw 45' and its tool engagement end. The width of the passageway of the plug 82' is preferably about 0.07 inches and more preferably about 0.069 inches, and the recess of the plug '82 housing the set screw 45' is preferably about 0.140 inches in diameter. Threading of the set screw advances the set screw 45' axially through the threaded opening in the bridge 64' to abut the button bore 58' and load the sprinkler 10'.

The cover plate assembly 16' preferably includes a first plate member 74' and a second plate member 76' coupled to the first plate member 74' to further form a trigger assembly as previously described. The second plate member 76' is preferably coupled to the first plate member 74' to further preferably define the cover plate assembly opening 78' which further preferably engages the ends of the lever member 68' in a close fit relation with the plug 82'. The opening 78' preferably defines an opening length of about 0.277 inches. The first plate member 74' preferably include as substantially planar surface portion sized so as to substantially cover the distal opening 42' of the body 12'. An out of plane, raised or lip portion 80' of the first plate member 74' is contiguous and more preferably integral with the planar surface portion. The raised or lip portion 80' preferably defines a substantially circular perimeter of the plate member 74'. The lip portion 80' further has a diameter of a sufficient length so as to further define a circumference larger than the circumference of the distal edge 40' of the annular wall 30' forming the distal opening 42'. Thus, the engagement of the lever member 68' with the cover plate assembly 16' preferably locates the first plate member 74' distally adjacent the distal opening 42' of the body 12', the lip portion 80' preferably overlaps and circumscribes the distal edge 40'. The sprinkler 10' can further include a ring member 21' configured substantially similar to the ring member 21' previously described. The assembly sprinkler 10' is preferably pressure rated to maintain a static fluid pressure of about 500 pounds per square inch (psi).

Figure 5:
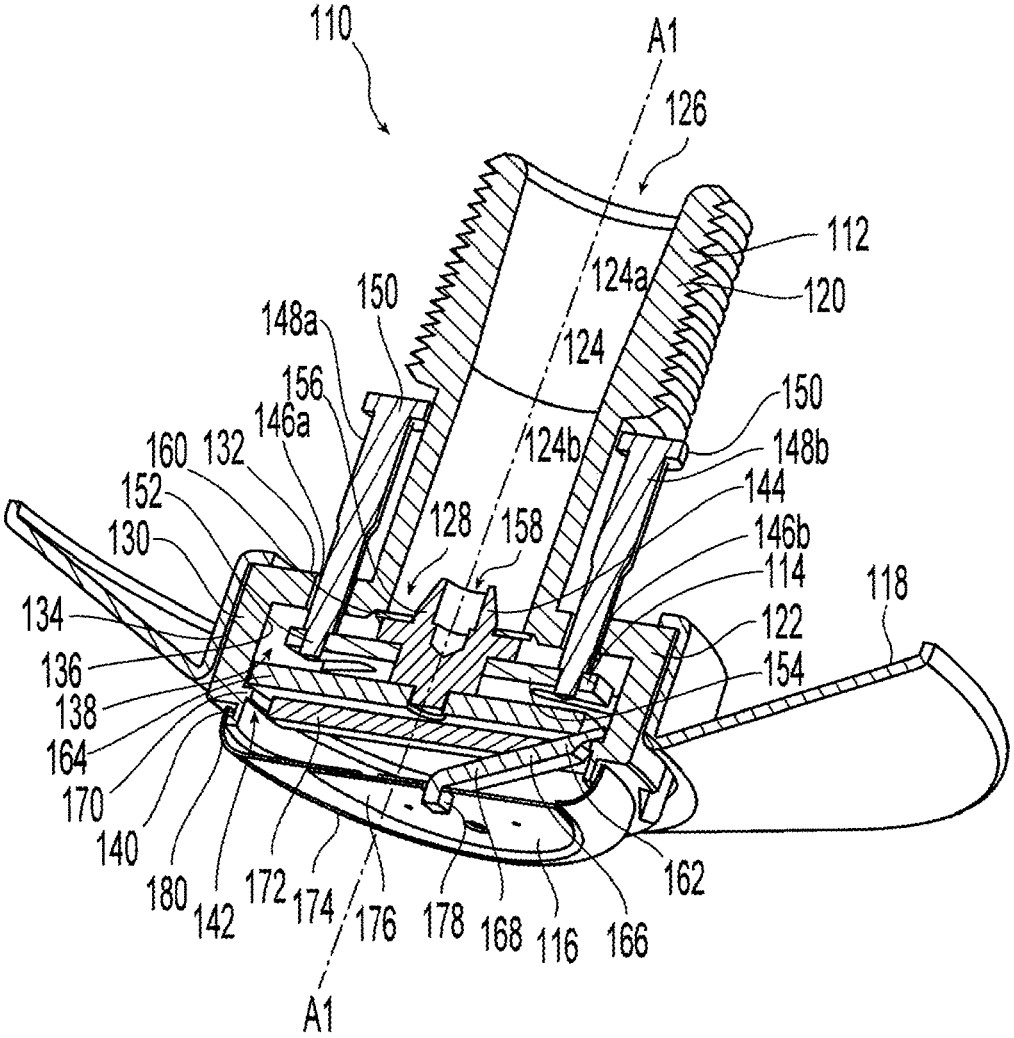
FIG. 5 is a cross-sectional view of another embodiment of the sprinkler.

Shown for example in FIG. 5 is another illustrative embodiment of the preferred sprinkler 110. The sprinkler 110 preferably generally includes a body 112, a deflector assembly 114 and a cover plate assembly 116. The sprinkler 100 is further preferably disposed within a mounting element such as, for example, an escutcheon 118. Similar to the previously described embodiment of the preferred sprinkler, the body 112 includes a proximal portion 120 and a distal portion 122. The body 112 further defines a passageway 124 extending along a longitudinal axis A1-A1 between an inlet 126 and an outlet 128. The inlet 126 is preferably in communication with tapering portion 124a of the passageway 124. The tapering passageway 124 is further preferably in communication with a portion 124b having a constant diameter and terminating at the outlet 128. The passageway 124, inlet 126 and outlet 128 further preferably define a sprinkler constant or K-factor ranging from about 3 gpm/$(psi)^{1/2}$ to about 5.8 gpm/$(psi)^{1/2}$ and is preferably about 5.6 gpm/$(psi)^{1/2}$.

The distal portion 122 preferably includes an annular wall 130 having a proximal edge 132 contiguous and more preferably integral with the proximal portion 120. The annular wall 130 includes an outer surface 134 and an inner surface 136 to further define a chamber 138 distal of the outlet 128. The body 112 is preferably constructed such that the chamber 138 is in communication with the passageway 124. The annular wall 130 further includes a distal edge 140 defining a distal opening 142 in communication with the chamber 138. The annular wall 130 preferably defines a first wall thickness, and the distal edge of the annular wall 140 defines a wall thickness that is preferably less than the first wall thickness.

The chamber 138 is preferably configured for housing internal components of the sprinkler 110 such as, for example, the deflector assembly 114 and the closure element 144. The deflector assembly is coupled to the body 112 and is more preferably suspended in a telescoping manner from the proximal edge 132. More specifically, the proximal edge 132 preferably includes a pair of through holes 146a, 146b in communication with the chamber 138. The deflector assembly 114 preferably includes a pair of arms 148a, 148b engaged in the through holes 146a, 146b. The arms 148a, 148b each preferably include an enlarged proximal end 150 for engaging the proximal edge 132 of the annular wall 130 so as to limit the distal and axial travel of the arms 148a, 148b in the through holes 146a, 146b. The proximal edge 132 can include additional openings to provide a sprinkler assembler/installer access or view to the chamber 138, for example, the proximal edge 132 can include two substantially semi-circular openings disposed about the proximal portion 120 of the body 112.

Coupled to the distal end 152 of each arm 148a, 148b of the deflector assembly 114 is a deflector plate 154. The arms 148a, 148b preferably locates the deflector plate 154 at a first position within the chamber 138 distally adjacent the outlet 128. The deflector plate 154 further preferably includes a central hole, and engaged therein is the closure element 144. With the deflector plate 154 located at its first position, the closure element 144 is preferably located in the outlet of the passageway 128 to prevent the flow of a fluid (liquid or gas) from the outlet of the passageway 124b. The closure element 144 preferably includes a closure button 156 having a preferably frustroconical tip with a partial bore 158. Disposed about the frustroconical tip and engaged with a flange of the closure button 156 is a biasing element 160, preferably a Belleville spring disc having a spring force ranging from about 50 lbs. (222 Newtons) to about 120 lbs. (534 Newtons). With the closure element 144 in its sealing position, the frustroconical tip is preferably disposed within the passageway 124 and the biasing element 160 engages a preferably counter sunk surface forming the outlet 128 to the distal portion 124b of the passageway 124.

The axial travel of the arms 148a, 148b locates the deflector plate 154 to at least a second position distal of its first position and preferably distal of the distal opening 142. With the deflector plate in its second position spaced from the first position, the closure element 144 is preferably spaced from the outlet 128 so as to permit any fluid (liquid or gas) supplied to the body 112 of the sprinkler 110 to discharge from the outlet 128. Liquid discharge from the outlet 128 can impact the axially displaced deflector plate 154 and therefore be distributed about an area beneath the sprinkler. To facilitate a distribution of fire fighting fluid in an area being protected by the sprinkler 110, the deflector plate can include a pattern of closed or open ended slits, slots, through holes, openings, cut-outs or any combination thereof to satisfy any one of a vertical or horizontal fluid distribution test. Preferably the sprinkler body 112 and deflector assembly 114 can be configured for standard coverage or extended coverage.

The sprinkler 110 is preferably a thermally actuated sprinkler so as to permit the passage of fluid from the outlet 128 in the presence of a sufficient amount of heat. Accordingly, the sprinkler 110 includes a trigger assembly 162. The trigger assembly 162 preferably includes a bridge element 164 and a lever assembly 166. The bridge element 164 preferably includes a surface for supporting the deflector assembly 114 in its first position and the closure element 144 in its sealed position engaged with the outlet 128. More preferably, the bridge element 164 includes a substantially planar upper surface to engage a portion of the closure element 144 which is preferably fixed within the central through hole of the deflector plate 154.

To locate the deflector assembly 114 in the first position and the closure element in the sealed position, the bridge element 164 is appropriately axially located within the chamber 138. To appropriately locate the bridge element 164, the bridge element 164 is preferably cantilevered or supported at one end by an annular shelf 170 formed along the inner surface 136 of the annular wall 130, and the other end of the bridge element 164 is supported by the lever assembly 166, which is further preferably in pivoted engagement with the shelf 170. In one embodiment, the lever assembly 166 includes a singe lever member 168. The lever member 168 preferably includes one end for engaging the shelf 170 and another end for engaging the cover plate assembly 116. The end of the lever member 168 preferably includes a flat for frictional engagement with the shelf 170. The engagement of the lever member 168 with the cover plate assembly 116 forms an angled frame member for directly and indirectly supporting the bridge element 164, closure element 144 and deflector assembly 114. To support itself against the shelf 170, one end of the bridge element 164 forms a preferably right angle notch for engaging the shelf 170, and to support itself about the lever member 168, the bridge element 164 defines a channel 172 to receive the end portion of the lever member 168 so as to be straddled about the end of the lever member 168. The shelf 170 is located proximal of the distal opening 142 such that the bridge element 164 is located within the chamber at a position that supports the deflector assembly 114 in its first position and further locates the closure element 144 in its sealing position. Upon actuation of the sprinkler 110, the lever member 168 pivots about the point of engagement with the shelf 170, and thereby axially displacing the bridge element 164 so as to permit the axial translation of the deflector assembly 114 and the closure element 144.

The relative angular relation of the lever member 168 relative to the cover plate assembly 116 is preferably defined by the lever members' engagement with the cover plate assembly 116. More preferably, the angular relation is defined by engagement of one end of the lever member with the shelf 170 of the body 112 and the engagement of the other end of the lever member with the cover plate assembly 116. The cover plate assembly 116 is also configured to conceal the components of the sprinkler 110 container within the chamber 138 such as for example, the deflector plate 154 or the lever member 168. The cover plate assembly 116 preferably includes a first plate member 174 and a second plate member 176 coupled to the first plate member 174. The first plate member 174 preferably include as substantially planar surface portion sized so as to substantially cover the distal opening 142 of the body 112. An out of plane, raised or lip portion 180 of the first plate member 174 is contiguous and more preferably integral with the planar surface portion. The raised or lip portion 180 preferably defines a substantially circular perimeter of the plate member 174. The lip portion 180 further has a diameter of a sufficient length so as to further diameter a circumference larger than the circumference of the distal edge 140 of the annular wall 130 forming the distal opening 142. Thus, the engagement of the lever member 168 with the cover plate assembly 116 preferably locates the first plate member 174 distally adjacent the distal opening 142 of the body 112, the lip portion 180 preferably overlaps and circumscribes the distal edge 140. The overlap of the lip portion 180 provides a parallel wall in combination with the distal edge 140 of the annular wall 130 to further limit radial access to the chamber 138. More preferably, the lip portion 180 presents a continuous outer surface to circumscribe the distal edge 140 of the body 112. Alternatively, the lip portion 180 may include periodic gaps or slots of a sufficient frequency to define the lip portion and prevent radial access to the chamber 138. Accordingly, the preferred embodiment of the first plate member 174 and the cover plate assembly 116 further enhances the concealed nature of the sprinkler 110 by further limiting access to the chamber 138. The sprinkler 110 can further include a ring member 121 configured substantially similar to the ring member 21 previously described.

Figure 5A:
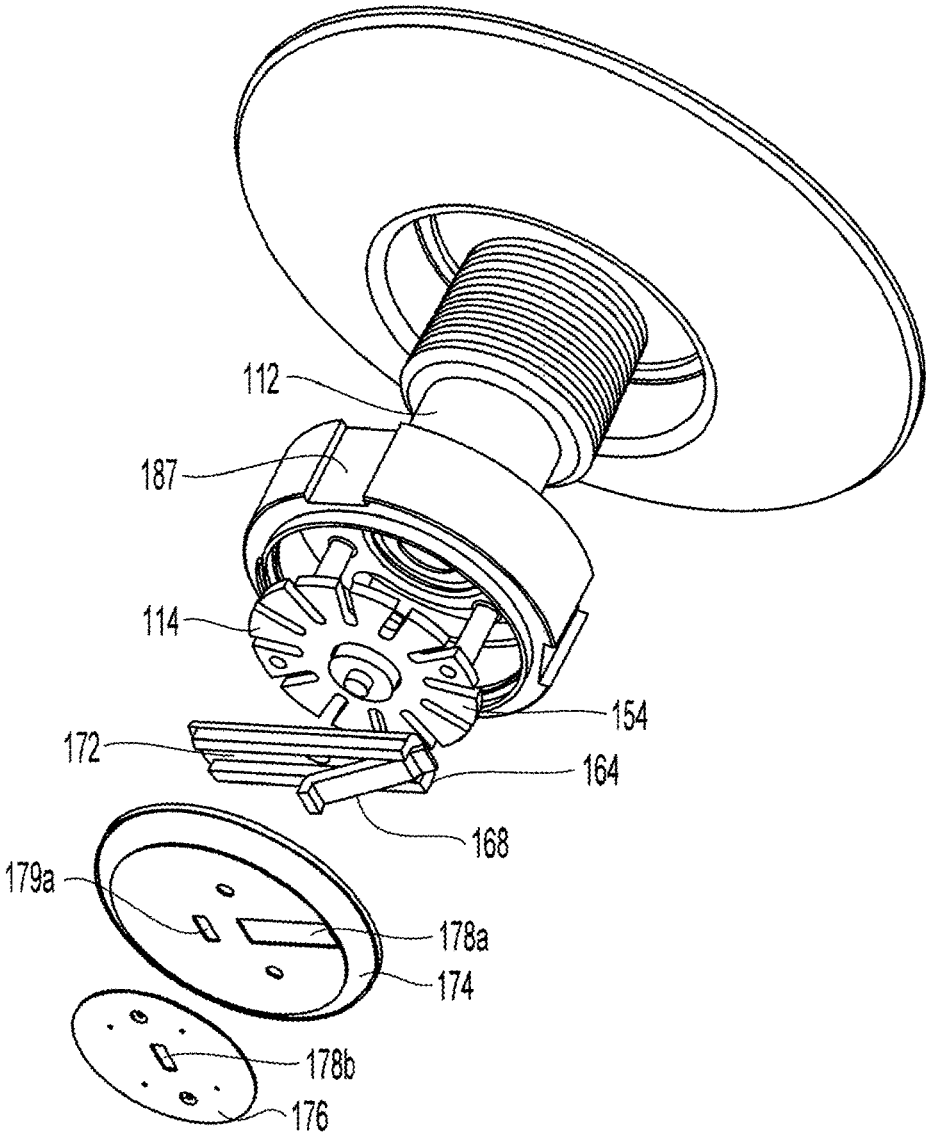
FIG. 5A is an exploded view of the sprinkler of FIG. 5.
Figure 5B:
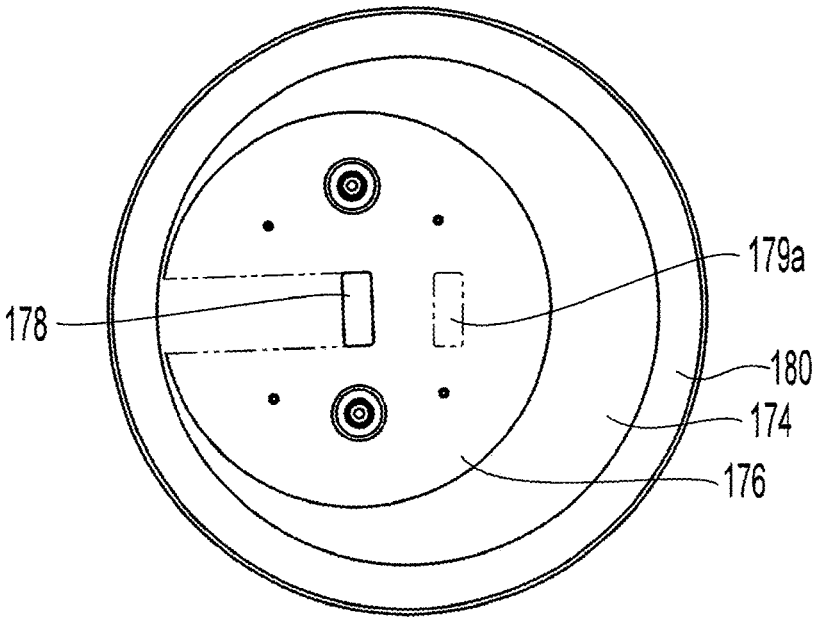
FIG. 5B is a plan end view of a cover plate assembly for use with the sprinkler of FIG. 5.
Figure 5C:
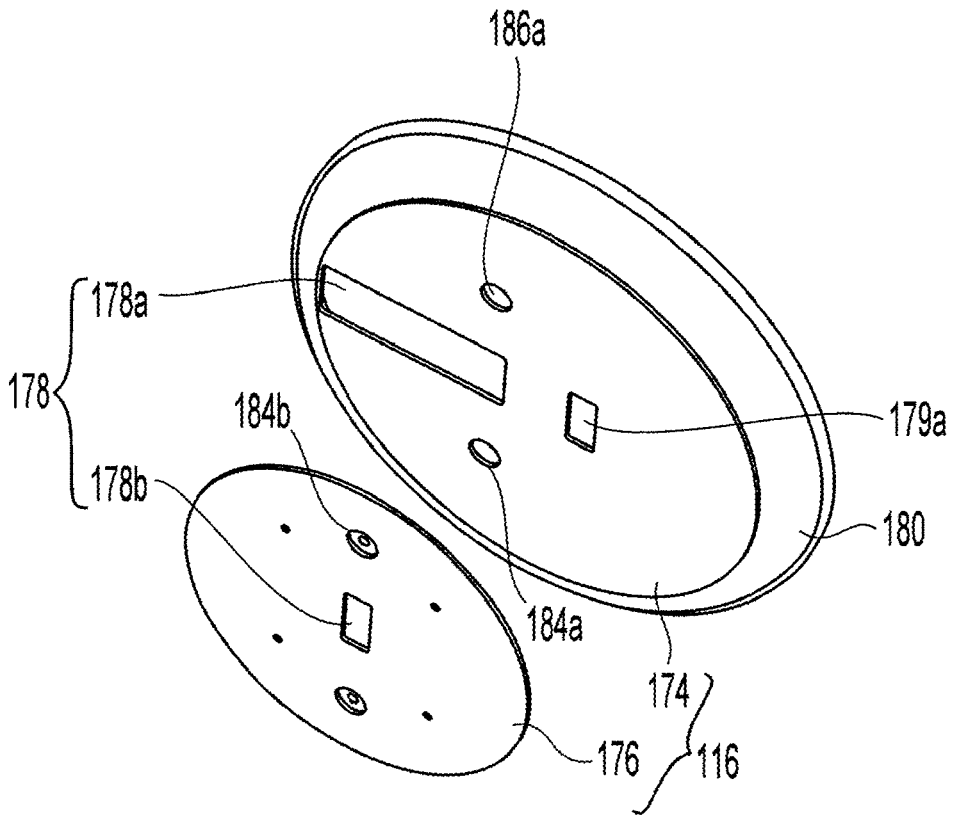
FIG. 5C is an exploded view of the cover plate assembly of FIG. 5B.

The second plate member 176 is preferably coupled to the first plate member 174 to further preferably define the cover plate assembly opening 178 which further preferably engages the end of the lever member 168 in a close fit relation. More specifically, shown in the exploded view of FIGS. 5A-5C is the cover plate assembly 116. The first plate member 174 includes an opening 178a, and the second plate member 176 includes a plate opening 178b. In one preferred assembly, the opening 178a of the first plate member 174 is an elongated closed formed opening, and the opening 178b of the second plate member is a shorter closed formed opening. Upon the assembly and overlap of the first and second plate members 174, 176, the respective openings 178a, 178b cooperate to form the preferred closed form single opening 178 as seen in FIG. 5. The single opening 178 is preferably dimensioned to receive the end of the lever member 168 in a closed fit arrangement. The first and second plate members 174, 176 can include additional or alternatively dimensioned open or closed formed openings, cutouts, slots, slits, voids, perforations or depressions. For example, the first plate member 174 can include a second opening 179a; however, more preferably, the engagement of the second plate member 176 with the first plate 174 conceals the second opening 179a of the first plate member 174.

Referring again to FIG. 5, the opening 178 is preferably dimensioned such that end of the lever 168 engages the opening 178 so as to locate the lever member within the chamber 138 to support the deflector and closure assemblies 114, 144 as described above. Preferably, the plate engaging end of the lever members 168 is configured so as to engage the plate assembly opening 178 in a substantially normal direction to the surface of the plate assembly 116. Thus, the end portion of the lever member preferably defines an obtuse included angle with the remainder of the lever member 168. Moreover, the opening 178 is preferably located substantially centrally to angle the lever member 168 and form the support frame for the bridge element 164 and the deflector and closure assemblies 114, 144 as described above. More preferably, the opening 178 is located about the center of the cover plate assembly 116 and intersecting the longitudinal axis A1-A1.

The second plate member 176 is preferably thermally coupled to the first plate member 178. The first and second plate members 174, 176 are preferably coupled together by a thermally sensitive material such as a solder material rated to melt in the presence of sufficient heat generated by, for example, a fire event. Accordingly, the trigger assembly 162 preferably incorporates or includes the cover plate assembly 116. Referring again to FIG. 5C, each of the first and second plate members 174, 176 includes a depression or opening 184a, 184b and a corresponding projection 186a, 186b for orienting the first and second plate members 174, 176 in a manner substantially similar as previously described with respect to the cover plate assembly 16 previously describe. Also as previously described, the plate member 174, 176 can include one or more dimples 185 for maintaining a preferred spacing between the plate members 174, 176 to form the desired solder thickness. Upon exposure to a sufficient level of heat, the thermally sensitive material melts thereby allowing the first and second plate members 174, 176 to separate. The plate assembly separation allows the lever assembly 166 to pivot and actuate the sprinkler 110 in manner of operation substantially similar as the manner of operation described above. The first plate member 174 preferably defines a larger surface area than the second plate member 176. Where each of the first and second plate members 174, 176 or their assembly is substantially circular, the second plate member 176 is preferably located eccentrically relative to the first plate member 174 such that the center points of the first and second plate members 174, 176 are coaxially aligned along an axis skewed relative to the longitudinal axis A1-A1. Alternatively, each of the first and second plate members 174, 176 can define a center point, which can further be coaxially aligned in the cover plate assembly 116 and substantially parallel to the longitudinal axis A1-A1.

The assembly sprinkler 110 is preferably pressure rated to maintain a static fluid pressure of about 500 pounds per square inch (psi). In one preferred method of assembling the sprinkler 110, the body 112 is positioned in an upright position to allow gravity to position the closure and deflector assemblies 144, 114 into their initial sealed and first positions. More preferably, a threaded tool engages the threaded partial bore 158 of the button 156 in a manner previously described with respect to the assembly of sprinkler 10 so as to pull the closure element 144 toward the proximal end 120 of the sprinkler 110 so as to substantially flatten the biasing element 160 against the portion of the body 112 forming the outlet 128. With the closure element partially engaged in the passageway 124b and the deflector plate 154 in the retracted first position, the bridge element 164 can be lowered and its preferred central hole can be placed into engagement with the upward projection of the closure element 144. One end of the bridge element 164 can engage the shelf 170 and the other end can be disposed about the end of the lever member 168. The lever member 168 can further be wedged into a pivotable engagement with the annular shelf 170 formed along the inner surface 136 of the annular wall 130. The opposite end of the lever member 168 is then preferably brought into position for engagement with the cover plate assembly 116. The first and second plates are preferably arranged and thermally coupled together to form the preferably substantially circular cover plate assembly 116 with the opening 178. The cover assembly 116 is disposed over the distal end of the body 112 such that the opening is then brought into close tolerance engagement about the lever member 168. Preferably, the gap clearance between the lever member and the edges forming the opening 178 is about 0.005 inches. It is believed that the single lever member 168 presents a simplified assembly over other embodiments and known sprinklers that use two lever members. The installation and manner of operating the sprinkler 110 is substantially similar to the installation and operation of sprinkler 10 previously described.

Figure 6:
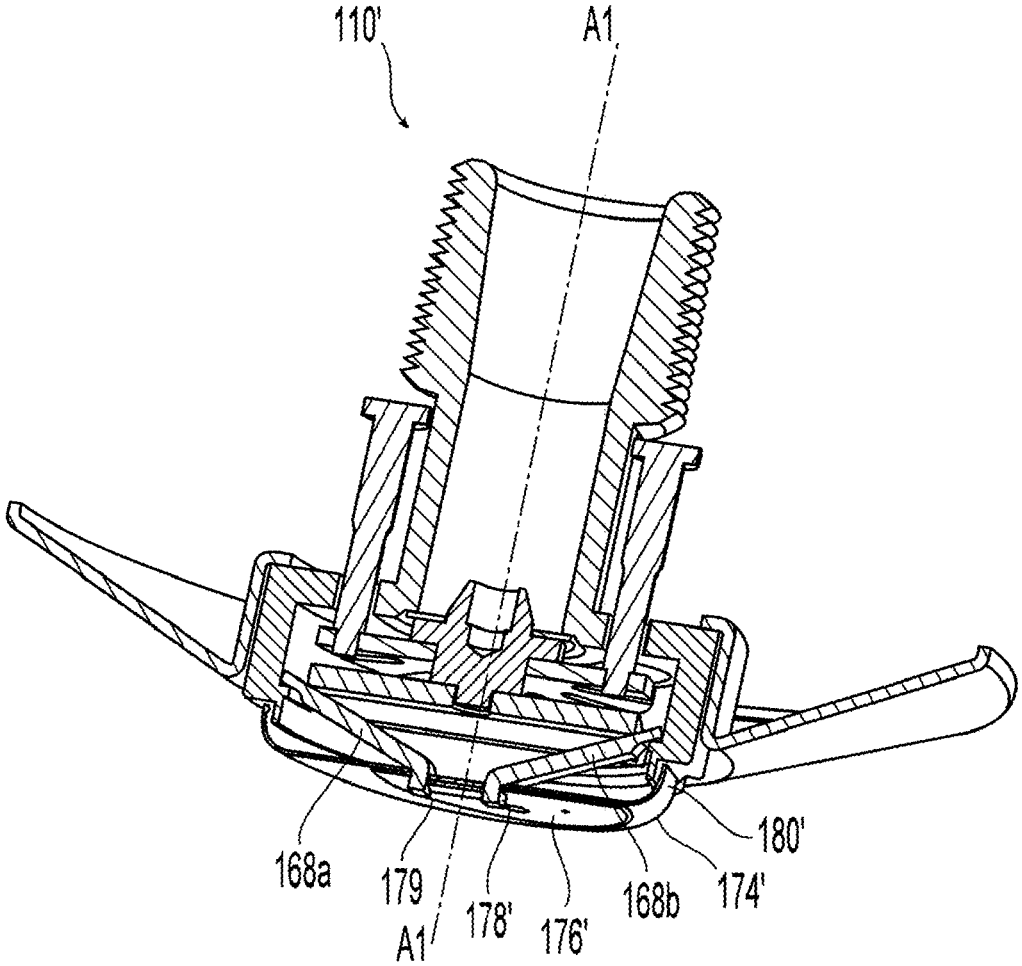
FIG. 6 is a cross-sectional view of an alternate embodiment of the sprinkler of FIG. 5 having alternate lever and cover plate assemblies.
Figure 6A:
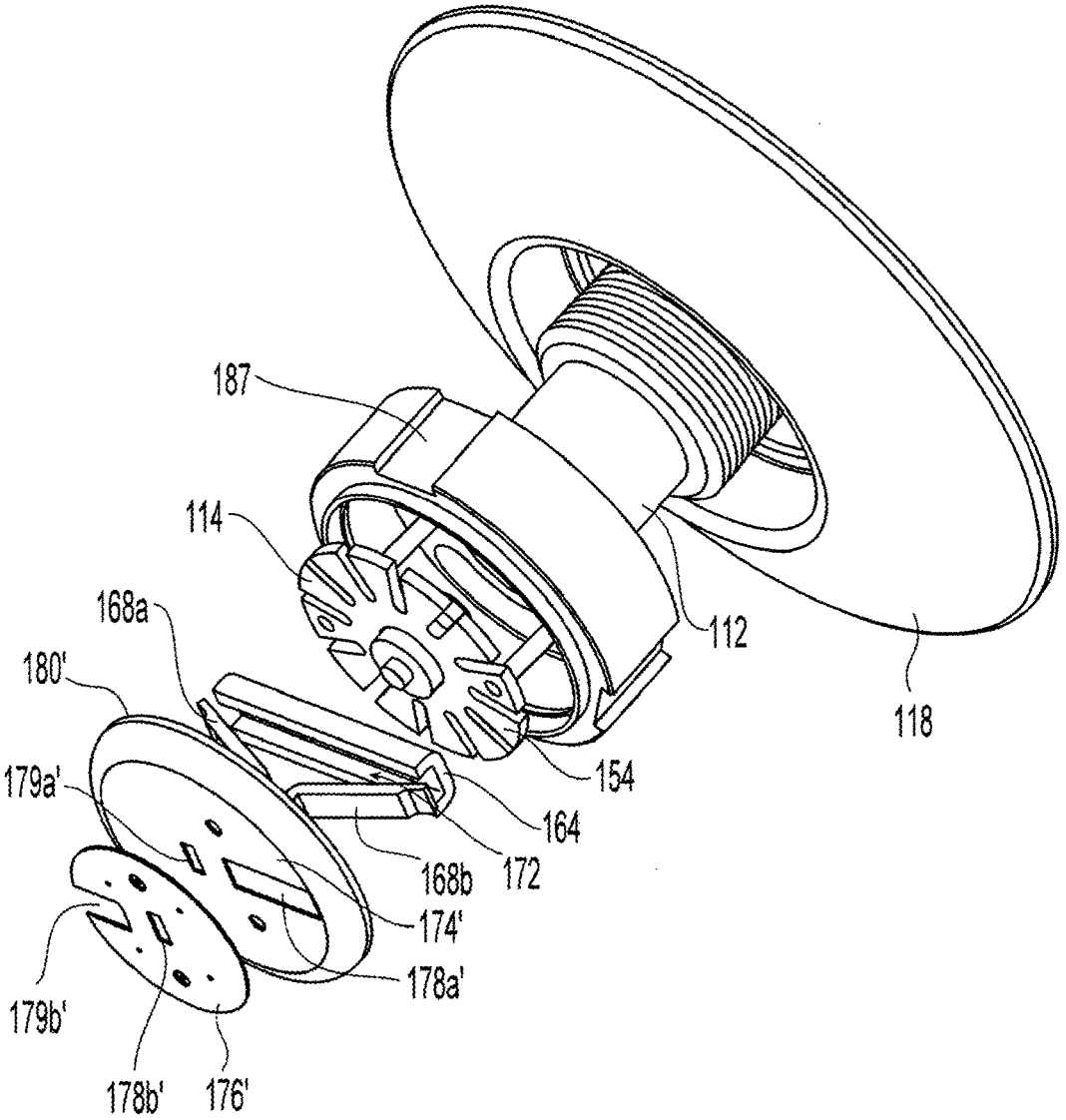
FIG. 6A is an exploded view of the sprinkler of FIG. 6.
Figure 6B:
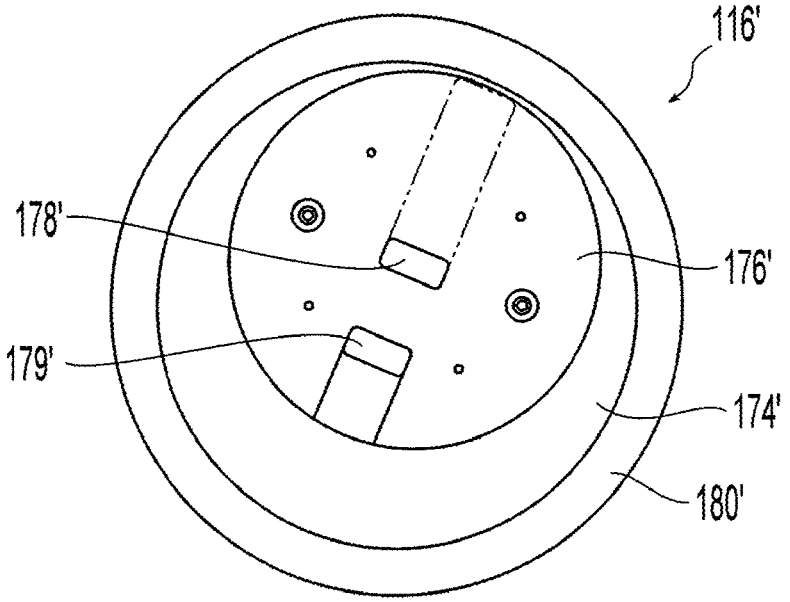
FIG. 6B is a plan end view of a cover plate assembly for use with the sprinkler of FIG. 6.
Figure 6C:
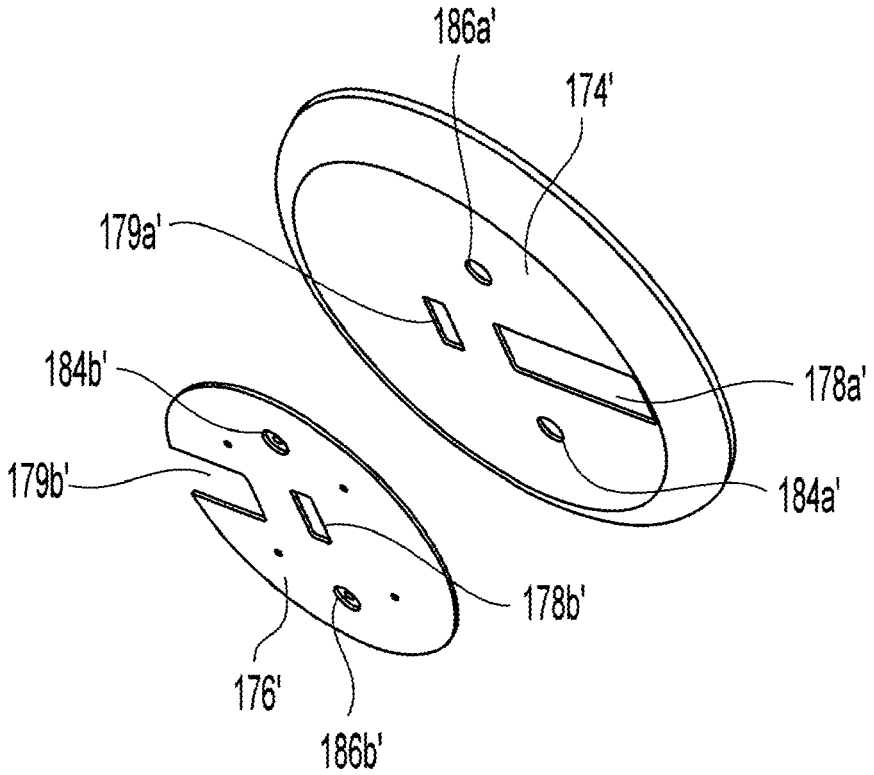
FIG. 6C is an exploded view of the cover plate assembly of FIG. 6B.

In an alternative embodiment of the preferred sprinkler as shown in FIGS. 6-6C, as sprinkler 110' having a trigger assembly 162' that includes a bridge element 174' supported by preferably two diametrically opposed lever members 168a, 168b disposed within the chamber 138. The bridge element 164 and the lever members 168a, 168b can be similarly constructed and similar to the bridge element 64 and lever members 68a, 68b as previously described with regard to the preferred sprinkler 10 shown in FIG. 1 and FIG. 1A.

In addition, as particularly shown in FIG. 6, the trigger assembly 162' also preferably includes an alternate embodiment of the cover plate assembly 116' that has two separate cover plate assembly openings 179', 178' for separate engagement with the ends of the two lever members 168a, 168b. As seen in FIGS. 6A-6C, the cover plate assembly 116' preferably includes the first plate member 174' and the second plate member 176'. The first plate member 174' includes a first plate opening 178a' and a second plate opening 179a'. The second plate member 176' preferably includes a first plate opening 178b and a second plate opening 179b'. In the preferred embodiment of the cover plate assembly 116', the first opening 178a' of the first plate member 174' is an elongated closed form opening and the second plate opening 179a' is a shorter closed form slot. In the second plate member 176', the first plate opening 178b' is preferably also a closed form slot substantially similar to that of the second opening 179a' of the first plate member 174'. The second plate opening 179b of the second plate member 176' is preferably configured as an elongated open ended slot. Upon the assembly and overlap of the first and second plate members 174', 176', the respective openings and slots 178a', 178b', 179a', 179b' cooperate to form two preferably separate and closed form slot openings 178', 179' as seen, for example, in FIG. 6B. As with the previously described cover plate assemblies, the first and second plate members 174', 176' can include additional or alternatively dimensioned open or closed formed openings, cut-outs, slots, slits, voids, perforations or depressions.

Referring again to FIG. 6, the openings 178', 179' are preferably dimensioned such that the ends of the levers 168a, 168b engage openings 178', 179' so as to locate the lever members 168a, 168b within the chamber 138 to support the deflector assembly 114 in the first position and the closure assembly 144 in its sealed position within the outlet 128. Preferably, the plate engaging ends of the lever members 168a, 168b are configured so as to engage the plate assembly openings 178', 179' in a substantially normal direction to the surface of the plate assembly 114. Thus, the end portions of the lever members 168a, 168b preferably define an obtuse included angle with the remainder of the lever member. Moreover, the openings 178', 179' are preferably located centrally to the cover plate assembly 116', thereby angling the lever members 168a, 168b relative to one another to form the supporting frame for the bridge element 164 and the deflector and closure assemblies. More preferably, the openings 178', 179' are located about the longitudinal axis A1-A1 such that the ends of the lever members 68a, 68b are located within the axial flow path defined by the outlet 128 of the passageway 124. The cover plate assembly opening 178', 179' are further preferably dimensioned to form a close engagement about the respective ends of the lever members 168a, 168b so as to minimize the gaps or voids presented on the outer surface of the cover plate assembly 116'.

As with the other preferred cover plate assemblies and in a manner as previously described, the second plate member 176' is preferably thermally coupled to the first plate member 178' by a thermally sensitive material such as a solder material rated to melt in the presence of sufficient heat generated by, for example, a fire event. Upon exposure to a sufficient level of heat, the thermally sensitive material melts thereby allowing the first and second plate members 174', 176' to separate, thus allowing the lever assembly 166' to pivot and actuate the sprinkler 110' in manner of operation as previously described.

In one preferred method of assembling the sprinkler 110', the body 112 is positioned in an upright position to allow gravity to position the closure and deflector assemblies 144, 114 into their initial sealed and first positions in a manner substantially similar to the assembly 10 previously described above. With the closure element partially engaged in the passageway 124b and the deflector plate 154 in the retracted first position, the bridge element 164 can be lowered and its preferred central hole can be placed into engagement with the upward projection of the closure element 144, thereby exposing the channel 172 of the bridge element 164. The ends of the lever members 168a, 168b can then be positioned in the channel 172 and preferably wedged into a pivotable engagement with the annular shelf 170 formed along the inner surface 136 of the annular wall 130. The opposite end of the lever members 168a, 168b are then preferably brought into position for engagement with the cover plate assembly 116'. The first and second plates are preferably arranged and thermally coupled together to form the preferably substantially circular cover plate assembly 116' with the separate openings 178', 179'. The cover assembly 116' is disposed over the distal end of the body 12 such that the openings 178', 179' are then brought into close tolerance engagement about the lever members 168a, 168b. Preferably, the gap clearance between the lever members, and the edges forming the openings 178', 179' is about 0.005 inches.

Each of the above described embodiments of the preferred sprinkler were configured for pendant installation. Alternatively, any of the above embodiments can be configured as a concealed sidewall sprinkler 210 as shown, for example, in FIG. 7. The sprinkler 210 generally includes a body 212, a deflector assembly 214, and a cover plate assembly 216. The sprinkler 210 is further preferably disposed within a mounting element 218 (not shown) for mounting to a wall structure. The mounting element 218 is preferably an escutcheon 218 as previously described having a proximal end face for engaging the wall structure. The mounting element 218 preferably tapers from the proximal end face to distal end face which is preferably located to a distal end of the body.

The sprinkler body 212 has a proximal portion 220 and a distal portion 222. The outer surface of the proximal portion 220 preferably includes a threaded end fitting for coupling the sprinkler 210 to a branch line of a sprinkler system containing a fire fighting fluid such as, for example, water or a pressurized gas such as compressed air. An inner surface portion of the body 212 further defines an internal passageway 224 extending between an inlet 226 and an outlet 228 along a longitudinal axis A2-A2. The inlet 226 is preferably in communication with tapering portion 224a of the passageway 224. The tapering passageway 224a is further preferably in communication with a portion 224b having a constant diameter and terminating at the outlet 228. The passageway 224, inlet 226 and outlet 228 further preferably define a sprinkler constant or K-factor ranging from about 3 gpm/(psi)$^{1/2}$ to about 5.8 gpm/(psi)$^{1/2}$ and is preferably about 5.6 gpm/(psi)$^{1/2}$.

The distal portion 222 preferably includes an annular wall 230 having a proximal edge 232 contiguous and more preferably integral with the proximal portion 220. The annular wall 230 includes an outer surface 234 and an inner surface 236 to further define a chamber 238 distal of the outlet 228. The body 212 is preferably constructed such that the chamber 238 is in communication with the passageway 224. The annular wall 230 further includes a distal edge 240 defining a distal opening 242 in communication with the chamber 238. The annular wall 230 preferably defines a first wall thickness, and the distal edge of the annular wall 240 defines a wall thickness that is preferably less than the first wall thickness.

The chamber 238 is preferably configured for housing internal components of the sprinkler 210. More specifically, the chamber 238 is preferably configured for housing the deflector assembly 214 and a closure element 244. The deflector assembly is coupled to the body 212 and is more preferably suspended in a telescoping manner from the proximal edge 232. More specifically, the proximal edge 232 preferably includes a pair of through holes 246a, 246b in communication with the chamber 238. The deflector assembly 214 preferably includes a pair of arms 248a, 248b engaged in the through holes 246a, 246b. The arms 248a, 248b each preferably include an enlarged proximal end 250 for engaging the proximal edge 232 of the annular wall 230 so as to limit the distal and axial travel of the arms 248a, 248b in to the through holes 246a, 246b. The proximal edge 232 can include additional openings to provide a sprinkler assembler/installer access or view to the chamber 238, for example, the proximal edge 232 can include one or more substantially semi-circular openings 231 disposed about the distal portion 222 of the body 212. More preferably, the semi-circular openings are configured to provide overflow space for a sidewall deflector 254.

Figure 10:
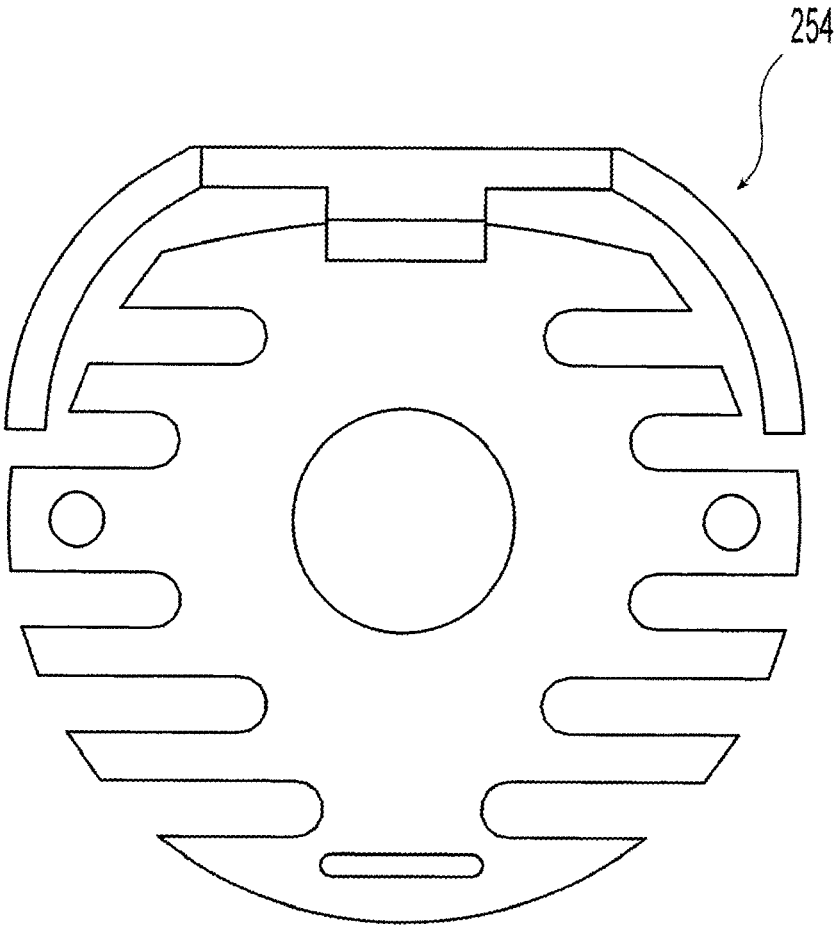
FIG. 10 is a sidewall deflector plate for use with the sprinkler of FIG. 7.
Figure 10A:
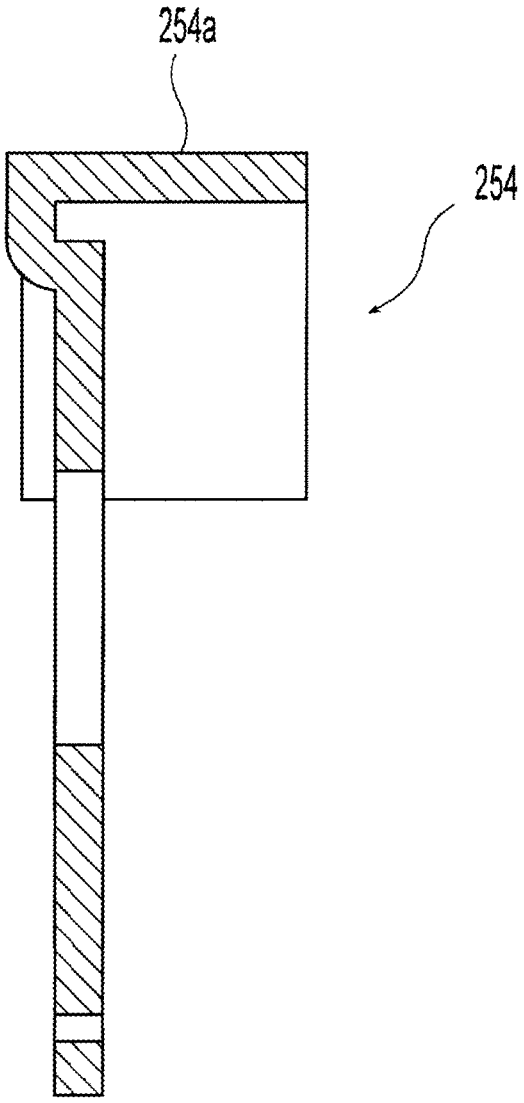
FIG. 10A is a cross-sectional view of the deflector of FIG. 10.

Coupled to the distal end 252 of each arm 248a, 248b of the deflector assembly 214 is the deflector plate 254 as seen, for example in FIG. 10 and FIG. 10A. The deflector plate 254 is preferably configured as a sidewall deflector, and the deflector 254 preferably includes an axially extending portion 254a that can project through the opening 231 at the proximal edge 232 of the annular wall 230. The arms 248a, 248b preferably locates the deflector plate 254 at a first position within the chamber 238 distally adjacent the outlet 228. The deflector plate 254 further preferably includes a central hole, and engaged therein is the closure element 244. With the deflector plate 254 located at its first position, the closure element 244 is preferably located in the outlet of the passageway 228 to prevent the flow of a fluid (liquid or gas) from the outlet of the passageway 224b. The closure element 244 preferably includes a closure button 256 having a preferably frustroconical tip with a partial bore 258. Disposed about the frustroconical tip and engaged with a flange of the closure button 256 is a biasing element 260, preferably a Belleville spring disc having a spring force ranging from about 50 lbs. (222 Newtons) to about 120 lbs. (534 Newtons). With the closure element 244 in its sealing position, the frustroconical tip is preferably disposed within the passageway 224 and the biasing element 260 engages a preferably counter sunk surface forming the outlet 228 to the distal portion 224b of the passageway 224.

The axial travel of the arms 248a, 248b locates the deflector plate 254 to at least a second position axially spaced from its first position and preferably axially spaced from the distal opening 242 to a location outside the chamber 238. With the deflector plate 254 in its second position, the closure element 244 is preferably spaced from the outlet 228 so as to permit any fluid (liquid or gas) supplied to the body 212 of the sprinkler 210 to discharge from the outlet 228. Liquid discharge from the outlet 228 can impact the axially displaced deflector plate 254 and therefore be distributed horizontally and vertically about an area beneath the sidewall sprinkler 210. To facilitate a distribution of fire fighting fluid in an area being protected by the sprinkler 210, the deflector plate 254 can include additional surfaces, a pattern of closed or open ended slits, slots, through holes, openings, cut-outs or any combination thereof to satisfy any one of a vertical or horizontal fluid distribution test.

Figure 7B:
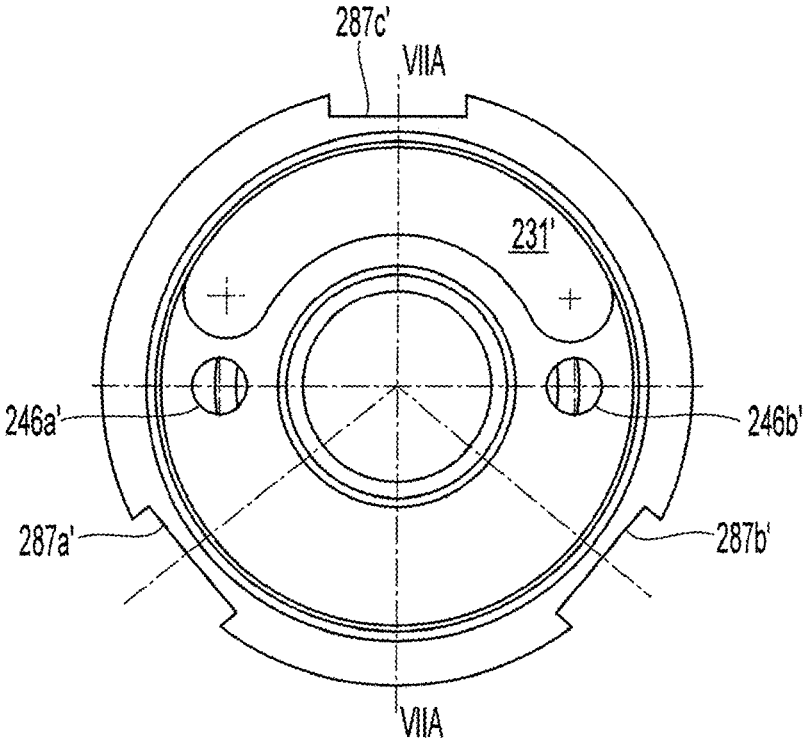
FIG. 7B is an end face of the body of FIG. 7A

Shown in FIGS. 7A and 7B is a preferred sidewall sprinkler body 212' having a preferred overall height of about two inches. The distal portion 222' preferably includes an annular wall 230' having a proximal edge 232' contiguous and more preferably integral with the proximal portion 220'. The annular wall 230 includes an outer surface 234' and an inner surface 236' to further define a chamber 238' distal of the outlet 228'. The body 212' is preferably constructed such that the chamber 238' is in communication with the passageway 224'. Moreover, the chamber preferably defines a chamber height $D_{epth}$ of about 0.29 inches and more preferably ranging from about 0.288 inches to about 0.292 inches. The inner surface 236' further preferably defines a chamber diameter $W_1$ of about 1.7 inches and preferably ranging from about 1.168 inches to about 1.172 inches. The annular wall 230 further includes a distal edge 240 defining a distal opening 242 in communication with the chamber 238. The annular wall 230 preferably defines a first wall thickness, and the distal edge of the annular wall 240 defines a wall thickness that is preferably less than the first wall thickness.

The chamber 238' is configured for housing internal components of the sprinkler 210' including the deflector assembly 214' and a closure element 244'. The deflector assembly is coupled to the body 212' and is more preferably suspended in a telescoping manner from the proximal edge 232' by the of arms 248a, 248b engaged in the through holes 246a', 246b'. Shown in FIG. 7E is a preferred arm 248' having an enlarged proximal end 250' for engaging the proximal edge 232' of the annular wall 230' so as to limit the distal and axial travel of the arms in the through holes 246a', 246b' and a distal end 252' for controlling the distance of the deflector 254' relative to the outlet 228'. The preferred arm 248' has an overall axial length of about one inch and more preferably is about 1.044 inches. The width of the arm 248' preferably varies along its length. In particular, the arm 248' is widest at a proximal portion and narrowest at a distal portion. More specifically, the preferred arm 248' includes a distal portion 252' having a diameter of about 0.068 inches, an intermediate portion 253' having a diameter of about 0.118 inches and a proximal portion 255' having a diameter of about 0.127 inches. The wider proximal portion eliminates or otherwise minimizes the radial movement of the arms 248a, 248b within the through hole so as to stabilize the deflector at its most distal and actuated position. The proximal edge 232' preferably includes an additional opening 231' to provide a sprinkler assembler/installer access or view to the chamber 238'. Preferably, the proximal edge 232' includes one or more substantially semi-circular openings 231' disposed about the distal portion 222' of the body 212'. More preferably, the semi-circular openings 231' are configured to provide overflow space for a preferred sidewall deflector 254'.

Figure 7C:
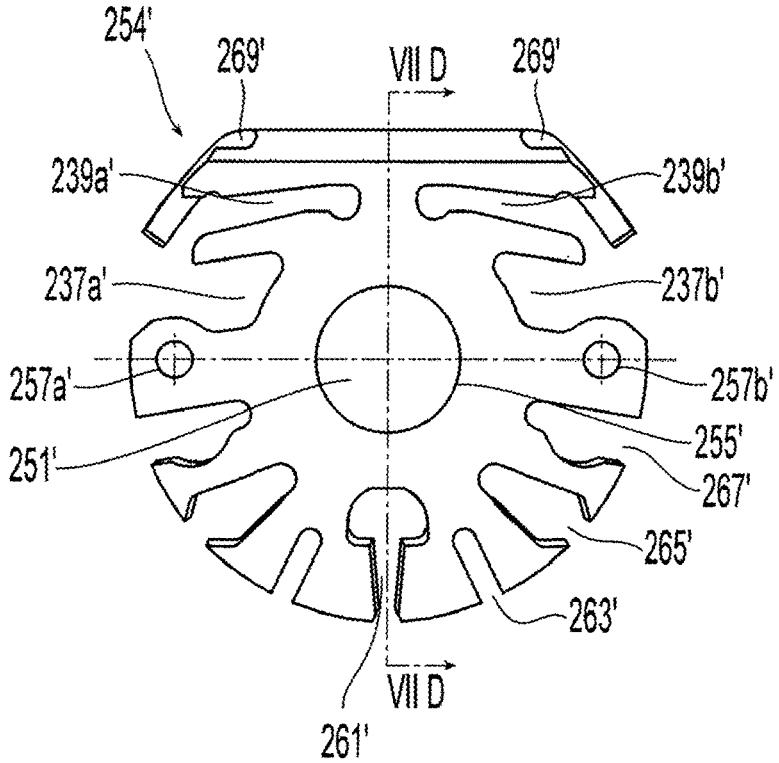
FIG. 7C is a deflector for use in the sprinkler of FIG. 7.
Figure 7D:
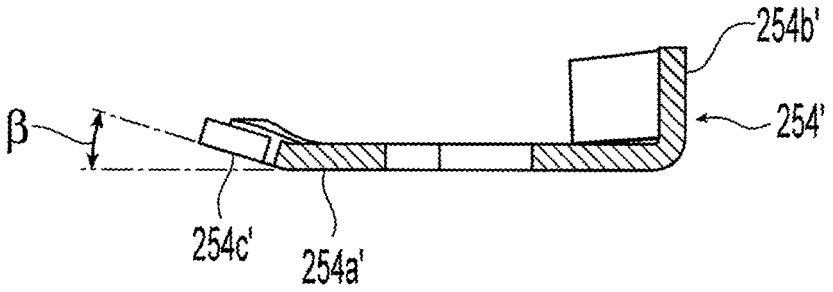
FIG. 7D is a cross-sectional view of the deflector of FIG. 7C.
Figure 7E:
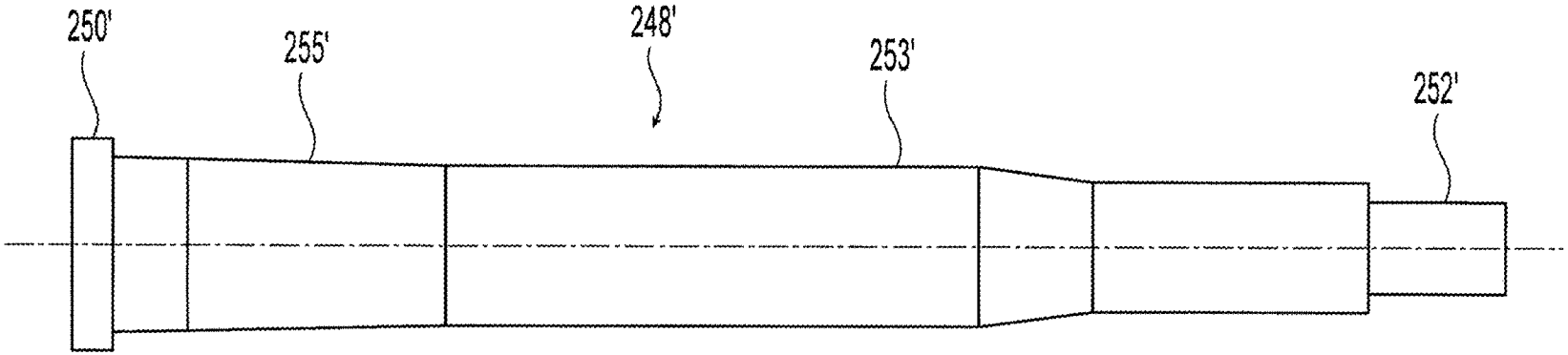
FIG. 7E is an arm for use in the deflector of FIG. 7.

Shown in FIGS. 7C and 7D are respective plan and cross-sectional views of a preferred deflector 254' for use in the sidewall sprinkler 210'. The preferred deflector includes a face portion 254a', a hood portion 254b', and a bent peripheral portion 254c'. When the deflector 254' is installed in the preferred sprinkler 210', the face portion 254a' is disposed substantially orthogonally to the sprinkler axis A2-A2, the bent peripheral portion 254c' extends at an angle β, preferably about seventeen degrees (17°) proximally from the face portion 254a'. The hood portion 254c' extends substantially orthogonally from the face to portion 254a' and when in the unactuated condition, the hood extends proximally through the opening 231' on the proximal edge 232'.

Figure 7F:
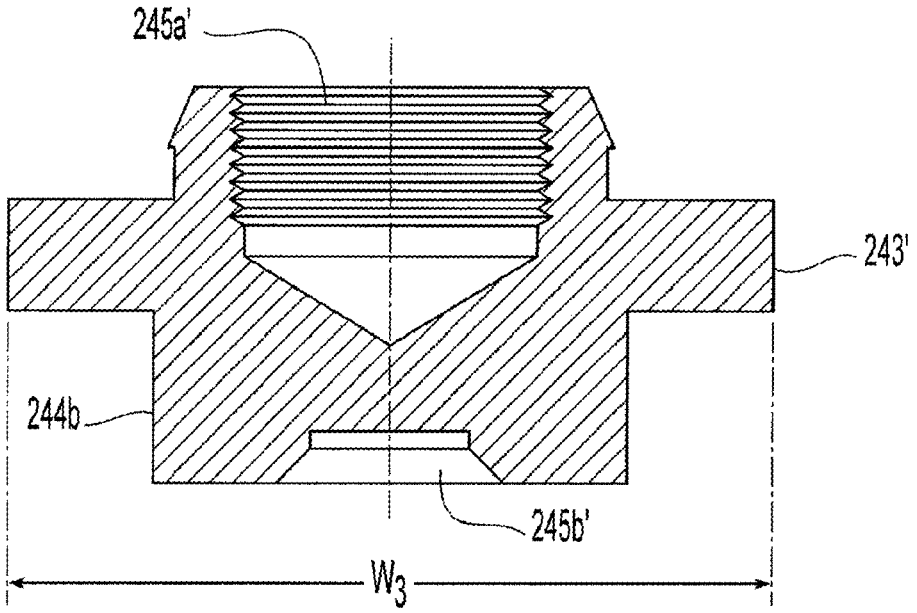
FIG. 7F-7G are two components of a button for use in the closure assembly in the sprinkler of FIG. 7.
Figure 7G:
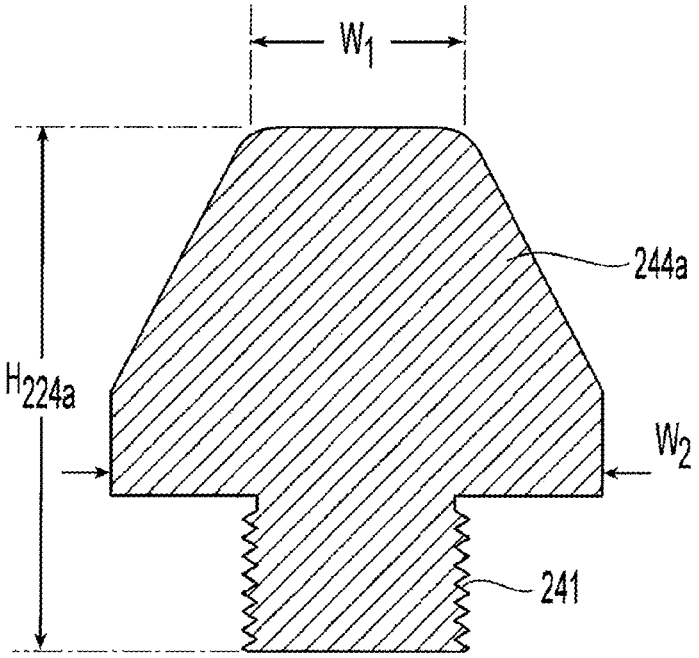

The face portion 254a' includes a central hole 251' for engagement with the button 244 and two through holes disposed about the central hole 257a', 257b' for engagement with the distal ends 252' of the arms 248'. Shown in FIGS. 7F-7G are first and second button portions 244a, and 244b forming a preferred button 244'. The first button portion 244a includes a conical portion that, in the unactuated position, seals the outlet 228'. The first button portion also includes a threaded end 241 for threaded engagement with a first threaded recess 245a' of the second button portion 244b. The threaded engagement of the first and second portions 244a, 244b allows for installation and/or securement of the biasing element 260' therebetween against the flange 243'. The second button portion includes another threaded recess 245b', for receipt of a set screw used to assemble and seat the deflector assembly in its unactuated portions in a manner as previously described above. The first button portion 244a preferably defines a height $H_{244a}$ of about 0.4 to about 0.5 inches and is preferably about 0.43 inches. The conical portion preferably has a base diameter $W_2$ of about 0.4 inches and is preferably about 0.410 inches, and further includes a narrow truncate portion $W_1$ of about 0.2 inches. The second button portion 244b preferably includes a flange diameter $W_3$ of about 0.45 inches.

Referring again to FIGS. 7C and 7D, the preferred deflector includes a plurality of slots of varying geometry symmetrically disposed about the face portion 254a' and the bent peripheral portion 254b'. More specifically, the face portion 254a' includes two pairs of open-ended slots 237a', 237b', 239a', 239b'. In which the slots 237a', 237b', 239a', 239b' vary in length and in width. Preferably, one slot pair 237a', 237b' narrows as it approaches the peripheral edge of the face portion and the other pair 239a' 239b' widens as it approaches the peripheral edge. The peripheral bent portion also includes a plurality of open-ended slots symmetrically disposed about the deflector axis VIID-VIID. One preferred slot 261' includes a slot that narrows at it approaches the peripheral edge of the portion 254b' and is substantially axially aligned with the deflector axis VIID-VIID. Disposed about the slot 261', are at least three other slot pairs 263', 265' and 267'. The slot pairs provide combinations of varying slot lengths and widths in which at least one pair 263' maintains a substantially constant width along its slot length, at least one pair 265' widens and then narrows as it approaches the peripheral edge, and a third pair 267' that broadens as it approaches the peripheral edge. The hood portion 254b', preferably includes at least one pair of slots 269' uniformly disposed about the deflector axis VIID-VIID. Any one of the plurality of slots can further include one or more radiused portions in combination with the one or more of the features described above, provided the sprinkler provides the desired fluid distribution performance, for example, in accordance with one or more horizontal or vertical water distribution tests under the standards.

The sprinkler 210 is preferably a thermally actuated sprinkler so as to permit the passage of fluid from the outlet 228 in the presence of a sufficient amount of heat. Accordingly, the sprinkler 210 includes a trigger assembly 262. The trigger assembly 262 preferably includes a bridge element 264 and a lever assembly 266. The bridge element 264 and lever assembly 266 can be constructed and configured in a manner substantially similar to the previously described embodiments of bridge elements and lever assemblies. In particular, a preferred sidewall sprinkler 210' having body 212' and deflector 254' is assembled in a manner substantially similar as described with respect to preferred pendent sprinkler 10'. More specifically, the sprinkler 10' preferably uses a plug 82' and set screw 45' with a cover plate assembly 16' as described above to load and seat the sprinkler 210'. Accordingly, the bridge element 264 preferably includes a surface for supporting the deflector assembly 214 in its first position and the closure element 244 in its sealed position engaged with the outlet 228. More preferably, the bridge element 264 includes a substantially planar surface to engage a portion of the closure element 244 which is preferably fixed within the central through hole of the deflector plate 254.

To locate the deflector assembly 214 in the first position and the closure element 244 in the sealed position, the bridge element 264 is appropriately axially located within the chamber 238. Accordingly the lever assembly 266, by a preferably pivoted engagement with the inner surface 236 of the annular wall 230, is configured to support the bridge element 264 in the desired location within the chamber 238. Preferably, the lever assembly 266 includes one or more lever members or lever members 268 diametrically disposed about the central axis A2-A2. The lever members 268 preferably include one end for engaging the inner surface 236 and another end for engaging the cover plate assembly 216. To facilitate the pivoted engagement between the annular wall 234 and the levers 268, the inner surface 236 preferably defines an annular shelf 270, and the engaging end of the lever member 268 preferably includes a flat for frictional engagement with the shelf 270. In the preferred body of FIG. 7A, the shelf 270' is configured so as to define an inner diameter within the chamber W2 of about 1.1 inches and more preferably ranging from about 1.098 inches to about 1.102 inches. Referring again to FIG. 7, the engagement of the lever members 268 with the cover plate assembly 216 preferably angle the lever member 268 to form a frame for directly and indirectly supporting the bridge element 264, closure element 244 and deflector assembly 214 against the substantially horizontal working pressure of fluid (liquid or gas). To support itself about the lever members 268, the bridge element 264 preferably includes a channel 272 to receive the end portion of the lever member 268 so as to be straddled about the diametrically opposed ends of the lever members. The bridge element 264 can define a length so as to bridge the lever members 268 at a location that locates the deflector assembly 214 in its first position and further locates the closure element 244 in its sealing position. Upon actuation of the sprinkler 210, the lever members 268 pivot about the points of engagement with the shelf 270, and thereby axially displacing the bridge element 264 so as to permit the axial translation of the deflector assembly 214 and the closure element 244.

The relative angular relation of the lever members 268 is preferably defined by the members' engagement with the cover plate assembly 216, which is preferably configured as the cover plate assembly 16' described above. The cover plate assembly 216 is also configured to conceal the components of the sprinkler 210 contained within the chamber 238 such as for example, the deflector plate 254 or the lever member 268. The cover plate assembly 216 can be configured in a manner substantially similar to any one of the previously described cover plate assemblies. Accordingly the cover plate assembly 216 can include openings to engage any number of lever member ends of the trigger assembly. For example, the cover plate member can include a first plate member 274 and a second plate member 276 coupled to the first plate member 274. The first plate member 274 preferably includes a substantially planar surface portion that is sized so as to substantially cover the opening 242 of the body 212. An out of plane, raised or lip portion 280 of the first plate member 274 is contiguous and more preferably integral with the planar surface portion. The raised or lip portion 280 preferably defines a substantially circular perimeter of the plate member 274. The lip portion 280 further has a diameter of a sufficient length so as to further define a circumference larger than the circumference of the distal edge 240 of the annular wall 230 forming the opening 242. Thus, where the engagement of the lever members 268 with the cover plate assembly 216 locate the first plate member 274 distally adjacent the opening 242 of the body 212, the lip portion 280 preferably overlaps and circumscribes the distal edge 240. The overlap of the lip portion 280 provides a parallel wall in combination with the distal edge 240 of the annular wall 230 to further limit radial access to the chamber 238. More preferably, the lip portion 280 presents a continuous outer surface to circumscribe the distal edge 240 of the body 212. Alternatively, the lip portion 280 may include periodic gaps or slots of a sufficient frequency to define the lip portion and prevent radial access to the chamber 238. Accordingly, the preferred embodiment of the first plate member 274 and the cover plate assembly 216 further enhances the concealed nature of the sprinkler 210 by further limiting access to the chamber 238.

The second plate member 276 is preferably coupled to the first plate member to further define one or more cover plate assembly openings 278 which engage the ends of the lever members 268. The first plate member 274 includes an opening 278a, and the second plate member 276 includes a plate opening 278b. In one preferred assembly, the opening 278a of the first plate member 274 is an elongated closed formed opening, and the opening 278b of the second plate member is an open ended slot. Upon the assembly and overlap of the first and second plate members 274, 276, the respective opening and slot 278a, 278b cooperate to form the preferred closed form elongated single opening 278 as seen in FIG. 7. The first and second plate members 274, 276 can include additional or alternatively dimensioned open or closed formed openings, cut-outs, slots, slits, voids, perforations or depressions as previously described with respect to other embodiments of the cover plate assembly to couple the plate members 274, 276 and further fully engage the lever assembly 266.

For example, the opening 278 is preferably dimensioned such that ends of the levers 268 engage the axial ends of the opening 278 so as to locate the lever members 268 within the chamber 238 to support the deflector and closure assemblies under load. Preferably, the plate engaging ends of the lever members 268 are configured so as to engage the plate assembly opening 278 in a substantially normal direction to the surface of the plate assembly 216. Thus, the end portion of the lever members preferably define an obtuse included angle with the remainder of the lever members 268 such as, for example, the included angle $\alpha$ previously described with respect to FIG. 1C. Moreover, the opening 278 is preferably located centrally to the cover plate assembly, thereby angling the lever members 268 relative to one another to form the supporting frame for the bridge element 264 and the deflector and closure assemblies as described above. More preferably, the opening 278 is located about the center of the cover plate assembly 216 and intersecting the longitudinal axis A2-A2 such that the ends of the lever members 268 are located within the axial flow path defined by the outlet 228 of the passageway 224.

The ends of the lever members 268 preferably occupy only a portion of the entire area of the opening 278, for example, 30 to 50 percent of the entire available spaced defined by the opening 278. Thus to fully occupy the opening 278 and maintain the concealed nature of the complete sprinkler assembly 210, the lever assembly 214 can further include a plug or retaining member 282 to horizontally space the ends of the lever member 268 into close engagement with the ends of the opening 278. The central plug 282 can be embodied as a small resilient member for installation into the plate assembly opening 278 after locating the plate assembly 216 about the distal portion of the body 212. Alternatively, the plug can be embodied as an enlarged retaining bar located between the lever members 268 prior to locating the plate assembly 216 about the distal portion of the body 212. Preferably, the retaining bar 282 is configured as the retaining member 82' described above providing support and access to a set screw engaged in the recess 245b of the button 244'.

The second plate member 276 is preferably thermally coupled to the first plate member 278. The first and second plate members 274, 276 are preferably coupled together by a thermally sensitive material as previously described. Accordingly, the trigger assembly 262 preferably incorporates or includes the cover plate assembly 216. Upon exposure to a sufficient level of heat, the thermally sensitive material melts thereby allowing the first and second plate members 274, 276 to separate, thus allowing the lever assembly to pivot and actuate the sprinkler 210. The first plate member 274 preferably defines a larger surface area than the second plate member 276. Where each of the first and second plate members 274, 276 or their assembly is substantially circular, the second plate member 276 is preferably located eccentrically relative to the first plate member 274 such that the center points of the first and second plate members 274, 276 are coaxially aligned along an axis skewed relative to the longitudinal axis A2-A2. Alternatively, each of the first and second plate members 274, 276 can define a center point, which can further be coaxially aligned in the cover plate assembly 216 and substantially parallel to the longitudinal axis A2-A2.

The assembled sprinkler 210 is preferably pressure rated to maintain a static fluid pressure of about 500 pounds per square inch (psi). In one preferred method of assembling the sprinkler 210, the body 212 is positioned in an upright position to allow gravity to position the closure and deflector assemblies 244, 214 into their initial sealed and first positions. With the closure element partially engaged in the passageway 224b and the deflector plate 254 in the retracted first position, the bridge element 264 can be lowered and its preferred central hole can be placed into engagement with the upward projection of the closure element 244, thereby exposing the channel 272 of the bridge element 274. The ends of the lever members 268 can then be positioned in the channel 272 and preferably wedged into a pivotable engagement with the annular shelf 270 formed along the inner surface 236 of the annular wall 230. The opposite end of the lever members 268 are then preferably brought into position for engagement with the cover plate assembly 216. The first and second plates are preferably arranged and thermally coupled together to form the preferably substantially circular cover plate assembly 216 with the central opening 278. The lever members 268 are preferably spaced apart by a retaining member 282. The retaining member 282 is preferably generally triangular in shape with two substantially converging surfaces configured to cradle the lever members 268. Extending between the converging surfaces is a planar surface for engagement with the channel 272 of the bridge element 264. The cover assembly 216 disposed over the distal end of the body 212 such that the opening is then brought into close tolerance engagement about the lever members 268 and the retaining member 282. Preferably, the gap clearance between the lever members, the plug and the edges forming the opening 278 is about 0.005 inches. In an alternative method, the ends of the lever members 268 are held close together without the use of a retaining member 282. Instead, the cover plate assembly 216 is disposed over the distal end of the body 212, and the opening 278 is brought into engagement with the lever members 268. With the ends of the lever members 268 disposed in the central opening 278, the central plug 282' is inserted between the lever member ends to bring the opening 278 and the ends of the lever members 268a, 268b into a close fit engagement. Further in the alternative, the cover plate assembly can have separate openings to separately engage each lever member 268 in a close fit arrangement to hold the lever members in the desired supporting position within the chamber 238.

The sprinkler 210 is preferably disposed within a mounting element or escutcheon 218 for flush mount installation against a wall surface. To install the sprinkler 210, the sprinkler 210 is preferably threaded into an appropriately sized tee-type or other pipe fitting that is preferably mounted along a branch supply line of a sprinkler system. To facilitate installation of the sprinkler 210, the outer surface of the 234 of the annular wall 230 preferably includes one or more tool engaging surfaces 287, as seen for example in FIG. 8, radially disposed about the outer surface 234. Preferably, the tool engaging surfaces 286 form the maximum gap width between the outer surface 234 of the annular wall 230 and the inner surface of the escutcheon 218. The maximum gap width preferably about 0.065 inches. A tool 288 having a plurality of planar projections 290 is preferably provided for engagement with the tool engagement surfaces 287. The projections 290 of the tool 288 can engage the surface 287 to thread the sprinkler 210 into an installed position or alternatively to unthread the sprinkler for removal. The tool 288 can further include a socket 292 for receiving a tool extension member, such as a socket handle for operating the tool 288 at a distance.

Preferably, the end face of the preferred body 210, shown for example, in FIG. 7B, include the tool engagement surfaces 287a', 287b', 287c' radially spaced so as to be able to orient the hood portion of the deflector 254b' upon installation of the assembled sprinkler 210'. Specifically, each the central axes of two engagement surfaces 287a', 287b' passing through the center point of the sprinkler discharge end face are located forty degrees (40°) relative to the axis along which the through holes 246a', 246b' are spaced such that the central axes are angularly spaced by 100°. The central axis of the third engagement face passes through the center point of the sprinkler end face perpendicular to the axis along which the through holes 46a, 46b are spaced so as to locate the third engagement face 287c' at an angle of about 130° relative to each of the first and second engagement surfaces 287a', 287b'. Because of the orientation of the engagement surfaces 287a', 287b', 287c' are oriented relative to the through holes 246a', 246b', the tool can be used, upon installation of the sprinkler 210' to orient or align the deflector 254' and more specifically the hood portion 254b', relative to, for example, the floor. More over, due to the angular relation of the engagement surfaces and the prongs on the tool, the tool 288 can only engage the end face of the sprinkler 210' in a single manner.

Figure 8:
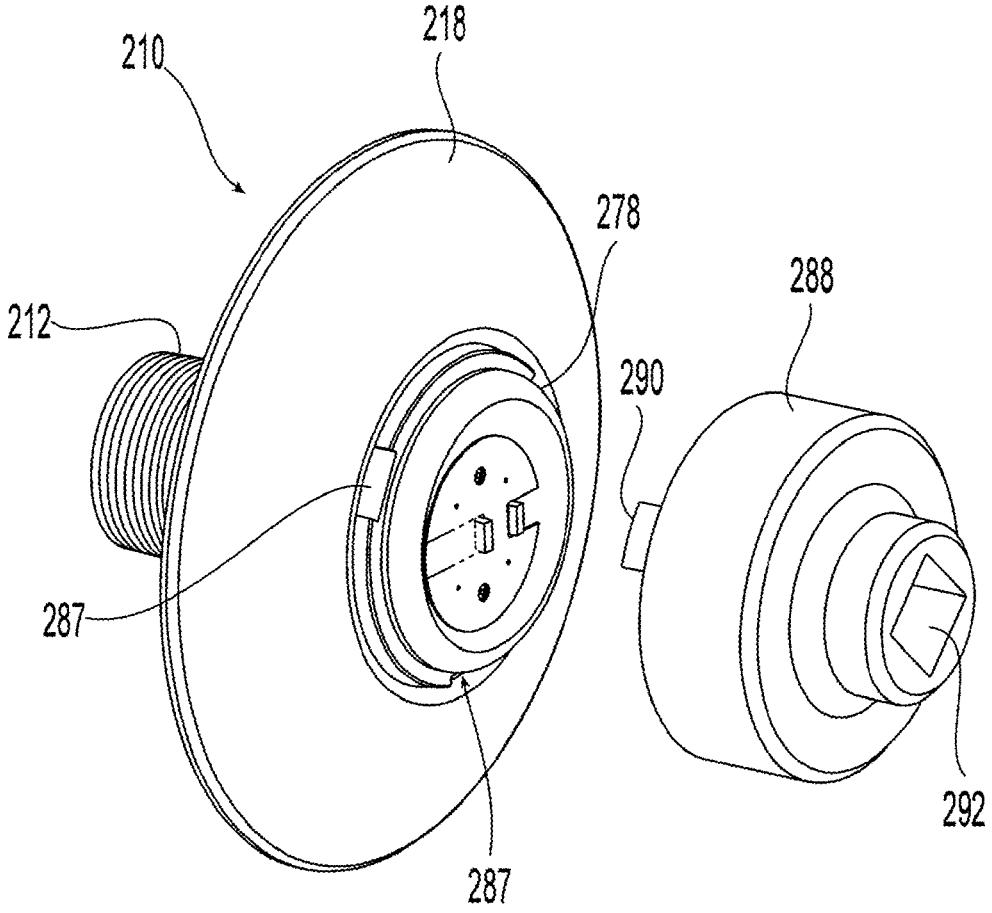
FIG. 8 is an exploded perspective view of the sprinkler of FIG. 7 and a tool for use with the sprinkler.
Figure 8A:
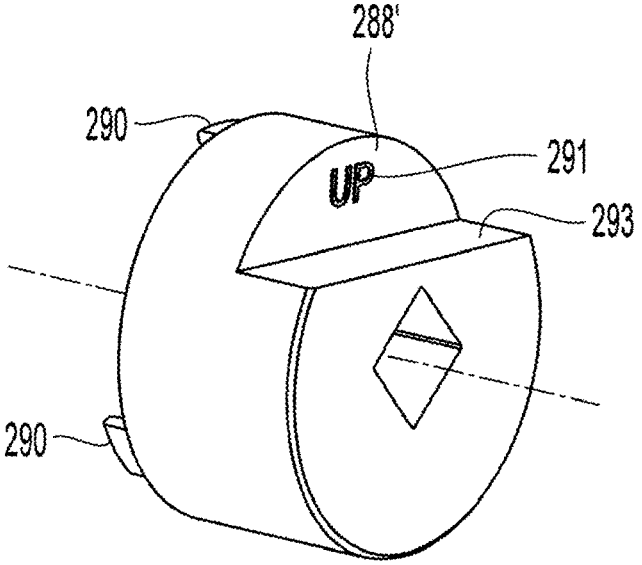
FIG. 8A-8B is a tool for use with the sprinkler of FIG. 7.
Figure 8B:
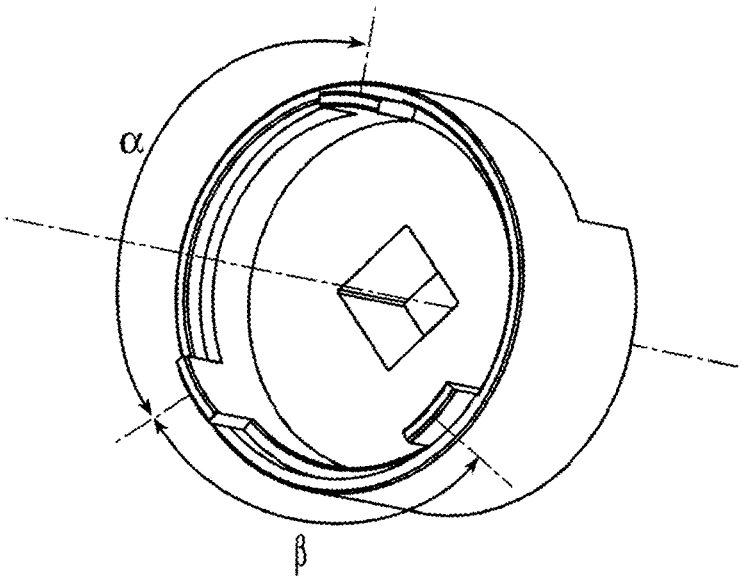

A preferred tool 288' is shown in FIGS. 8A and 8B. In addition to the engagement prongs 290, the preferred tool includes an indicator 291, such as for example, text "UP" to indicate to the installer the orientation of the deflector 254. Moreover the preferred tool, 288' includes a ledge 293 for support of a leveling device to verify, for example, that the hood portion 254b' of the deflector 254' is parallel to a flat ceiling or floor. The prongs 290 correspondingly define an angular relationship therebetween which preferably includes an angle β of about 100° and a of about 130°.

The completely assembled and installed sprinkler 210 is preferably configured to maintain a static pressure of fluid of about 500 pounds per square inch (psi). More specifically, the arrangement of the lever assembly 266 is configured to maintain the deflector assembly 214 in the first position and the closure element 244 in the sealed position within the outlet 228 under a static fluid pressure load of up to about 500 pounds per square inch (psi). The manner in which the lever assembly 266 provides sealing support is substantially similar to that which was previously described with regard to the lever assembly 66 of FIG. 1. Therefore, provided the lever members 268 are restrained from pivoting about their engagement points with the inner surface 236 of the annular wall 230, the arrangement of the lever members 268 provide a sufficient resultant reaction force through the bridge element 264 to independently maintain the initial and sealed positions of the deflector assembly 214 and the closure assembly 244. Accordingly, a separate screw member is not needed to engage the closure element 244 to seal the passageway.

Referring to FIG. 8, with the sprinkler body 212 installed and the proximal side of the escutcheon 218 mounted flush against a wall, the sprinkler assembly 210 presents a concealed institutional type sidewall sprinkler having minimally sized gaps, opening, voids or access points into which few foreign objects may be inserted without operating the sprinkler. In particular, traversing the profile of the sprinkler 210 from one point along the outer perimeter of the escutcheon 218 across the cover plate assembly 216 to a diametrically opposed point along the perimeter of the escutcheon, the profile presents no radial access point to the chamber 238 and the internal components of the sprinkler 210. Moreover, the openings 246a, 246b formed about the proximal edge 232 and the distal opening 242 formed by the distal edge 240 of the annular wall 230 cannot be easily accessed to gain entry to the chamber 238. The lower radial portion forming the through hole of the escutcheon 218 preferably engages the proximal edge 232 to seal off access to the openings 246a, 246b and any other opening disposed along the proximal edge 232. At the distal opening, the lip portion 280 of the cover plate assembly preferably substantially and more preferably completely surrounds or circumscribes the distal edge 240 thereby eliminating radial access to the distal opening 242.

The installed sprinkler 210 preferably operates by thermally activation of the trigger assembly 262. Operation of the trigger assembly 262 permits displacement of the deflector assembly 214 and the closure assembly 244 thereby allowing fluid, and preferably liquid, supplied to the inlet of the body 212 to be discharged from the outlet 228 of the passageway 224 and distributed upon impact with the deflector plate 254. More specifically, in the presence of a sufficient level of heat, the thermally sensitive material coupling the first and second plates 274, 276 of the cover plate assembly melts thereby permitting the second plate member 276 to separate from the first plate member 274. With the second plate member 276 removed, the cover plate assembly opening 278 is enlarged to the exposed first plate opening 278a. As a result first plate member 274 is freed from the snap fit engagement with the lever assembly 262, and therefore first plate member 274 is separable from the distal portion 222 of the body 212. Without the restraint of engagement with the first and second plate members 274, 276, the lever members 268 are free to pivot about their engagement point with the shelf 270 formed along the inner surface 236 of the annular wall 230. The pivot of the lever members 268, as described with respect to the sprinkler 10 of FIG. 1, further preferably frees the lever members from engagement with the bridge element 264, and the lever members can be separated from the sprinkler assembly. Without the rigid support of the lever members 268 and the bridge element 264, the deflector plate assembly 214 and the closure element 244 are axially translated to the second position under the load of the fluid pressure; fluid is permitted to flow through the passageway 224 and discharge out the outlet 228.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

[1. A concealed sidewall sprinkler having an unactuated state and an actuated state, the sprinkler comprising:

a sprinkler body having a proximal portion defining an inlet and a distal portion having an internal surface forming an outlet, the body defining an internal passageway between the inlet and the outlet extending along a longitudinal axis, the distal portion including an annular wall having an outer surface and an inner surface having an internal shelf to define a chamber distal and an opening of the chamber distal of the outlet;

a deflector assembly including a pair of arms and a deflector, the deflector assembly having a first position with the deflector disposed within the chamber and a second position with the deflector distal of the first position, the deflector including a face portion disposed perpendicular to the longitudinal axis and a hood portion extending substantially orthogonally to the face portion, the face portion including a central hole with two through holes disposed about the central hole, the pair of arms extending through the two holes to support the deflector in a telescopic manner;

a closure assembly disposed within the outlet and including a biasing element in sealing engagement with the inner surface forming the outlet when the deflector is in the first position; and a trigger assembly to support the deflector assembly in the first position, the trigger assembly including:

a thermally responsive plate assembly distal of the chamber opening to control the unactuated and actuated state;

a lever assembly including a pair of lever members diametrically disposed about the longitudinal axis with a first pair of diametrically opposed lever ends engaged with the shelf and a second pair of diametrically opposed lever ends engaged with the thermally responsive plate assembly;

a bridge element bridging the pair of lever members to support the deflector assembly in its first position, the bridge element defining a channel straddled about the diametrically opposed first ends of the pair of lever members, the bridge element having a first end and a second end with a plurality of outer planar surfaces about the channel extending from the first end to the second end of the bridge element, the plurality of planar surfaces including one entirely planar surface extending from the first end to the second end of the bridge element perpendicular to the longitudinal axis; and a set screw axially aligned along the longitudinal axis and threaded through the one entirely planar surface of the bridge element extending perpendicular to the longitudinal axis to abut the deflector assembly with the deflector in the first position.]

[2. The concealed sidewall sprinkler of claim 1, wherein the one entirely planar surface of the bridge element extending perpendicular to the longitudinal axis defines a bridge length, the bridge element defining a bridge height in the direction of the longitudinal axis, the bridge height to the bridge length defining an aspect ratio substantially less than 1.]

[3. The concealed sidewall sprinkler of claim 2, wherein the bridge element defines a bridge thickness in a direction transverse to each of the bridge height and bridge length, the bridge thickness to bridge length defining another aspect ratio substantially less than 1.]

[4. The concealed sidewall sprinkler of claim 1, wherein the plurality of outer planar surfaces of the bridge element include a pair of parallel planar surfaces extending from the first end to the second end of the bridge element and disposed about the one entirely planar surface extending perpendicular to the longitudinal axis.]

[5. The concealed sidewall sprinkler of claim 4, wherein the parallel planar surfaces are spaced apart to define a thickness of the bridge element such that within the chamber there is a gap between the shelf and at least one of the parallel planar surfaces.]

[6. The concealed sidewall sprinkler of claim 4, wherein the plurality of planar surfaces define a U-shaped cross-section of the bridge element.]

[7. The concealed sidewall sprinkler of claim 1, wherein the bridge element defines a point of contact between each of the first and second ends of the bridge element and the pair of lever members.]

[8. The concealed sidewall sprinkler of claim 1, wherein the thermally responsive plate assembly includes a central opening to access the set screw.]

[9. The concealed sidewall sprinkler of claim 8, wherein the thermally responsive plate assembly comprises two openings disposed about the longitudinal axis with the second pair of diametrically opposed lever ends occupy the two openings of the thermally responsive plate assembly.]

[10. The concealed sidewall sprinkler of claim 1, wherein the pair of lever members define an included angle therebetween of about 136 degrees.]

[11. The concealed sidewall sprinkler of claim 1, wherein each of the pair of arms of the deflector assembly have a length and a variable width along the length, including an enlarged proximal end to limit axial travel of the arms and a narrow distal portion extending through the through holes in the deflector face portion.]

[12. The concealed sidewall sprinkler of claim 11, wherein the distal portion of the body includes a plurality of openings, the arms sliding through two openings in the plurality of openings.]

[13. The concealed sidewall sprinkler of claim 11, wherein the hood extends through an opening in the plurality of openings of the distal portion when the deflector is in the first position.]

[14. The concealed sidewall sprinkler of claim 13, wherein the chamber includes an overflow space for a portion of the deflector when the deflector is in the first position.]

[15. The concealed sidewall sprinkler of claim 1, wherein the deflector assembly includes an element affixed within the central opening of the face portion of the deflector, the element having a blind bore abutted by the set screw to place the deflector in the first position.]

[16. The concealed sidewall sprinkler of claim 15, wherein the element comprises a button having a frustroconical tip disposed within the outlet when the deflector is in the first position.]

[17. The concealed sidewall sprinkler of claim 15, wherein the closure assembly includes the button with the biasing element disposed about the frustroconical tip.]

[18. The concealed sidewall sprinkler of claim 1, wherein the face portion of the deflector includes a bent peripheral portion and a plurality of slots of varying geometry symmetrically disposed about the face portion, the face portion including two pairs of open-ended slots that vary in length and in width, one slot pair narrows proximate a peripheral edge of the face portion and the other pair widens proximate the peripheral edge, the peripheral bent portion including a plurality of open-ended slots symmetrically disposed about the central opening and the hood portion includes at least one pair of slots.]

[19. The concealed sidewall sprinkler of claim 1, wherein the bridge element has contact with the lever members for transferring a load of the biasing element to the trigger assembly, the bridge element contact consisting of a first point of contact and a second point of contact, the first point of contact being between the first end of the bridge element and one end of the first pair of diametrically opposed lever ends and the second point of contact being between the second end of the bridge element and the other end of the first pair of diametrically opposed lever ends, the one entirely planar surface of the bridge element being perpendicular to the longitudinal axis between the set screw and each of the first and second ends.]

[20. The concealed sidewall sprinkler of claim 19, wherein the plurality of outer surfaces of the bridge element include walls disposed about the one planar surface to define the channel, the one entirely planar surface being disposed between the walls and between the set screw and each of the first and second ends.]

[21. The concealed sidewall sprinkler of claim 20, wherein the channel is U-shaped between the set screw and each of the first and second ends.]

[22. The concealed sidewall sprinkler of claim 20, wherein the channel is U-shaped over a length of the bridge element from the first end to the second end.]

[23. The concealed sidewall sprinkler of claim 1, wherein the face portion of the deflector includes an outer peripheral edge, the outer peripheral edge having a portion being continuous over a length that is greater than the diameter of the central hole, with the central hole of the face portion between the hood portion and the continuous portion of the outer peripheral edge.]

[24. The concealed sidewall sprinkler of claim 23, wherein the pair of arms consists of no more than two arms to support the deflector in the telescopic manner.]

[25. A sprinkler comprising:

a body having a proximal portion defining an opening and a distal portion defining an outlet disposed along a longitudinal axis, the body defining an internal passageway between the proximal opening and the outlet defining a first diameter, the distal portion including an annular wall having an outer surface and an inner surface to further define a chamber distal of the outlet;

a deflector assembly including a pair of arms and a deflector, the deflector assembly having a first position with the deflector disposed within the chamber and a second position with the deflector distal of the first position, the deflector including a face portion disposed perpendicular to the longitudinal axis and a hood portion extending substantially orthogonally to the face portion, the face portion including a central hole with two through holes disposed about the central hole, the pair of arms extending through the two holes to support the deflector in a telescopic manner; and a closure assembly including:

a closure element; and a trigger assembly including:

a lever assembly engaged with the inner surface of the annular wall to support the deflector assembly including two levers, each lever having a surface angled with respect to the longitudinal axis, each lever having a width with respect to the longitudinal axis;

a bridge element having a first outer edge and a second outer edge with an entirely planar surface between the first and second outer edges that is disposed perpendicular to the longitudinal axis, each outer edge engaging the surface of one of the two levers to provide a point of contact between the bridge element and the two levers for load transfer, the bridge element having a width with respect the longitudinal axis that is greater than the width of each lever; and a thermally responsive plate assembly, each of the two lever members having a first end engaged with the thermally responsive plate assembly and a second end engaged with the distal portion of the body so that the two lever members engage the bridge element such that the closure element is disposed adjacent the outlet of the body.]

[26. The sprinkler of claim 25, further comprising a set screw axially aligned along the longitudinal axis and threaded through the bridge element to abut the closure element, the entirely planar surface extending between the set screw and each of the first and second outer edges.]

[27. The sprinkler of claim 25, wherein the bridge element includes walls to define a channel, the entire planar surface extending between the walls.]

[28. The sprinkler of claim 25, wherein the pair of arms consists of no more than two arms to support the deflector in the telescopic manner and the face portion of the deflector includes an outer peripheral edge, the outer peripheral edge having a portion being continuous over a length that is greater than the diameter of the central hole, with the central hole of the face portion between the hood portion and the continuous portion of the outer peripheral edge.]

[29. A sprinkler comprising:

a body having a proximal portion defining an opening and a distal portion defining an outlet disposed along a longitudinal axis, the body defining an internal passageway between the proximal opening and the outlet defining a first diameter, the distal portion including an annular wall having an outer surface and an inner surface to further define a chamber distal of the outlet;

a deflector assembly including a deflector distal of the outlet disposed within the chamber; and a closure assembly including: a closure element and a trigger assembly, the trigger assembly including:

a thermally responsive plate assembly;

a lever assembly engaged with the inner surface of the annular wall to support the deflector assembly including two lever members each having a surface angled with respect to the longitudinal axis, each of the two lever members having a first end engaged with the plate assembly and second end engaged with the distal portion of the body; and a bridge element to support the deflector assembly within the chamber, the bridge element having a first end and a second end defining a length of the bridge element to bridge the two lever members and define a point of contact between the bridge element and the two lever members, wherein the bridge element includes a planar surface and a pair of walls about the planar surface to define a channel straddled about the two lever members, the surface including a central opening between the first and second end, the planar surface being disposed perpendicular to the longitudinal axis, wherein the planar surface includes an entirely planar surface between the central opening and each of the first and second ends.]

[30. The sprinkler of claim 29, further comprising a set screw axially aligned along the longitudinal axis and threaded through the central opening of the planar surface to abut the deflector assembly with the deflector in the first position.]

[31. The sprinkler of claim 29, wherein the entire planar surface extends between the walls.]

[32. The sprinkler of claim 29, the deflector including a face portion disposed perpendicular to the longitudinal axis and a hood portion extending substantially orthogonally to the face portion, the face portion including a central hole with two through holes disposed about the central hole, the deflector assembly including a pair of arms with the deflector assembly having a first position with the deflector disposed within the chamber and a second position with the deflector distal of the first position, the pair of arms extending through the two holes to support the deflector in a telescopic manner, wherein the face portion of the deflector includes an outer peripheral edge, the outer peripheral edge having a portion being continuous over a length that is greater than the diameter of the central hole, with the central hole of the face portion between the hood portion and the continuous portion of the outer peripheral edge.]

[33. A sidewall sprinkler comprising:

a sprinkler body having a proximal portion defining an inlet and a distal portion having an internal surface forming an outlet, the body defining an internal passageway between the inlet and the outlet extending along a longitudinal axis, the distal portion including an annular wall having an outer surface and an inner surface having an internal shelf to define a chamber distal and an opening of the chamber distal of the outlet;

a deflector assembly including a deflector, the deflector assembly having a first position with the deflector disposed within the chamber and a second position with the deflector distal of the first position, the deflector including a face portion disposed perpendicular to the longitudinal axis and a hood portion extending substantially orthogonally to the face portion, the face portion including a central hole with two through holes disposed about the central hole, the deflector assembly including no more than two arms extending through the two holes to support the deflector in a telescopic manner;

a closure assembly including a biasing element placed in sealing engagement with the internal surface forming the outlet of the sprinkler body when the deflector assembly is in the first position; and a trigger assembly to support the deflector assembly in the first position, the trigger assembly including:

a thermally responsive plate assembly distal of the chamber opening to control operation of the sprinkler between an unactuated and an actuated state of the sidewall sprinkler;

a lever assembly including a first lever member and a second lever member diametrically disposed from one another about the longitudinal axis, each lever member having with a first end engaged with the shelf and a second end engaged with the thermally responsive plate assembly in the unactuated state;

a bridge element having a first end and a second end with a planar surface and a pair of parallel walls extending between the first and second end to define a channel straddled about the first and second lever members to bridge the first and second lever members for support of the deflector assembly in its first position, each of the first end and the second end of the bridge element being in point of contact with the lever assembly, the planar surface including a central opening between the first and second end, the planar surface being imperforate between the walls and between the central opening and each of the first and second ends; and a set screw and an intermediate member, the set screw being threaded through the central opening of the bridge element to abut the intermediate member in the unactuated state of the sprinkler and support the deflector assembly in its first position and place the biasing element in sealing engagement with the internal surface forming the outlet of the sprinkler body.]

[34. The sidewall sprinkler of claim 33, wherein the intermediate member is a closure button with the biasing element disposed about the closure button, the closure button having a partial bore engaged by the set screw in the unactuated state of the sprinkler.]

*35. A sprinkler comprising:*

*a sprinkler body comprising:*

*an internal passageway having an inlet and an outlet extending along a longitudinal axis; and*

*an annular wall having an outer surface and an inner surface to further define a chamber in communication with the internal passageway, a distal edge of the annular wall further defining an opening distal of the outlet in communication with the chamber;*

*a deflector plate coupled with the sprinkler body, the deflector plate having a first position distal of the outlet and disposed within the chamber and a second position distal of the distal opening;*

*a closure assembly including a closure element engaged with the deflector plate such that with the deflector plate in the first position, the closure element is disposed within the outlet of the passageway; and*

*a trigger assembly including:*

*a lever assembly comprising a first lever member and a second lever member each engaged with the inner surface of the annular wall to support the deflector assembly in the first position; and*

*a thermally rated plate assembly comprising a first plate member comprising a first center point and a second plate member comprising a second center point, the first plate member having a planar surface portion that is sized so as to cover a majority of the distal opening, the first plate member comprising a first projection and a first depression, the second plate member comprising a second projection and a second depression, the first projection and the first depression are each offset from the first center point and the second projection and the second depression are each offset from the second center point to engage the first plate member with the second plate member, and a lip portion framing the planar surface portion, the plate assembly being engaged with the lever assembly such that the lip portion extends towards the inlet of the passageway beyond the distal edge of the annular wall.*

*36. The sprinkler of claim 35, comprising:*

*the sprinkler body has a proximal portion and a distal portion, the proximal portion has an outer surface that includes a threaded end fitting, the distal portion comprising the annular wall.*

*37. The sprinkler of claim 35, comprising:*

*the closure element is a button, the closure assembly comprising a spring coupled with the button.*

*38. The sprinkler of claim 35, comprising:*

*the sprinkler has a K-factor greater than or equal to 3.0 $(gpm/psi)^{1/2}$ and less than or equal to 5.8 $(gpm/psi)^{1/2}$.*

*39. The sprinkler of claim 35, comprising:*

*the sprinkler has a thermal rating greater than or equal to 140 degrees Fahrenheit and less than or equal to 212 degrees Fahrenheit.*

*40. The sprinkler of claim 35, comprising:*

*the sprinkler has a response time index (RTI) less than or equal to 50 $(m\text{-}s)^{1/2}$.*

*41. The sprinkler of claim 35, comprising:*

*an escutcheon coupled with the sprinkler body.*

*42. The sprinkler of claim 35, comprising:*

*the trigger assembly includes a bridge element coupled with the first lever member and the second lever member of the lever assembly.*

*43. The sprinkler of claim 35, comprising:*

*the sprinkler body has a circular cross-section.*

*44. The sprinkler of claim 35, comprising:*

*the deflector plate is a pendent deflector.*

*45. The sprinkler of claim 35, comprising:*

*a plurality of arms coupled with the deflector plate.*

*46. The sprinkler of claim 35, comprising:*

*the closure element has a frustroconical tip.*

*47. The sprinkler of claim 35, comprising:*

*the deflector includes a pattern of closed or open ended slits.*

*48. The sprinkler of claim 35, comprising:*

*the first lever member and the second lever member are at an angle to the longitudinal axis.*

* * * * *